(12) United States Patent
Terada et al.

(10) Patent No.: US 9,807,411 B2
(45) Date of Patent: Oct. 31, 2017

(54) IMAGE CODING APPARATUS, IMAGE DECODING APPARATUS, IMAGE PROCESSING SYSTEM, IMAGE CODING METHOD, AND IMAGE DECODING METHOD

(71) Applicant: Panasonic Intellectual Property Management Co., Ltd., Osaka (JP)

(72) Inventors: Kengo Terada, Osaka (JP); Hisao Sasai, Osaka (JP); Satoshi Yoshikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 256 days.

(21) Appl. No.: 14/656,509

(22) Filed: Mar. 12, 2015

(65) Prior Publication Data

US 2015/0271356 A1 Sep. 24, 2015

Related U.S. Application Data

(60) Provisional application No. 61/954,877, filed on Mar. 18, 2014.

(30) Foreign Application Priority Data

Oct. 29, 2014 (JP) .................................. 2014-220796

(51) Int. Cl.
*H04N 7/12* (2006.01)
*H04N 11/02* (2006.01)
(Continued)

(52) U.S. Cl.
CPC ......... *H04N 19/50* (2014.11); *H04N 5/23229* (2013.01); *H04N 19/573* (2014.11); *H04N 19/58* (2014.11)

(58) Field of Classification Search
CPC .... H04N 19/50; H04N 5/23229; H04N 19/58; H04N 19/573
(Continued)

(56) References Cited

U.S. PATENT DOCUMENTS

| 6,381,275 B1 | 4/2002 | Fukuhara et al. | |
|---|---|---|---|
| 2011/0164684 A1* | 7/2011 | Sato | H04N 19/56 375/240.16 |
| 2013/0101038 A1* | 4/2013 | Shimizu | H04N 19/00569 375/240.12 |

FOREIGN PATENT DOCUMENTS

JP 10-023423 1/1998

OTHER PUBLICATIONS

Benjamin Bross et al, "High Efficiency Video Coding (HEVC) text specification draft 10 (for FDIS & Last Call)" Jan. 14-23, 2013.

* cited by examiner

*Primary Examiner* — Jared Walker
(74) *Attorney, Agent, or Firm* — Greenblum & Bernstein, P.L.C.

(57) ABSTRACT

An image coding apparatus is an image coding apparatus which encodes a plurality of to-be-displayed images forming video by using inter prediction. The image coding apparatus includes an obtaining unit that obtains a reference-specific image which is an image different from the plurality of to-be-displayed images or different from a plurality of reconfigured images obtained by reconfiguration of the plurality of to-be-displayed images and which is an image used as an image that is specific to reference for the inter prediction, and an encoding unit that encodes one or more to-be-displayed images among the plurality of to-be-displayed images by referring to the reference-specific image as a reference image for the inter prediction.

18 Claims, 41 Drawing Sheets

(51) Int. Cl.
    *H04N 11/04* (2006.01)
    *H04N 19/50* (2014.01)
    *H04N 19/573* (2014.01)
    *H04N 19/58* (2014.01)
    *H04N 5/232* (2006.01)

(58) Field of Classification Search
    USPC .................................................. 375/240.01
    See application file for complete search history.

FIG. 29

| |
|---|
| VIDEO STREAM (PID = 0x1011 MAIN VIDEO) |
| AUDIO STREAM (PID = 0x1100) |
| AUDIO STREAM (PID = 0x1101) |
| PRESENTATION GRAPHICS STREAM (PID = 0x1200) |
| PRESENTATION GRAPHICS STREAM (PID = 0x1201) |
| INTERACTIVE GRAPHICS STREAM (PID = 0x1400) |
| VIDEO STREAM (PID = 0x1B00 SUB VIDEO) |
| VIDEO STREAM (PID = 0x1B01 SUB VIDEO) |

FIG. 35

| PID | STREAM ATTRIBUTE INFORMATION | |
|---|---|---|
| 0x1011 | VIDEO STREAM ATTRIBUTE INFORMATION | CODEC |
| 0x1100 | AUDIO STREAM ATTRIBUTE INFORMATION | RESOLUTION |
| 0x1101 | AUDIO STREAM ATTRIBUTE INFORMATION | ASPECT RATIO |
| 0x1200 | PRESENTATION GRAPHICS STREAM ATTRIBUTE INFORMATION | FRAME RATE |
| 0x1201 | PRESENTATION GRAPHICS STREAM ATTRIBUTE INFORMATION | CODEC |
| 0x1B00 | VIDEO STREAM ATTRIBUTE INFORMATION | NUMBER OF CHANNELS |
| | | LANGUAGE |
| | | SAMPLING FREQUENCY |

STREAM ATTRIBUTE INFORMATION

FIG. 40

| SUPPORTED STANDARD | DRIVING FREQUENCY |
|---|---|
| MPEG-4 AVC | 500 MHz |
| MPEG-2 | 350 MHz |
| ... | ... |

IMAGE CODING APPARATUS, IMAGE DECODING APPARATUS, IMAGE PROCESSING SYSTEM, IMAGE CODING METHOD, AND IMAGE DECODING METHOD

BACKGROUND

1. Technical Field

The present disclosure relates to an image coding apparatus and the like which encode a plurality of to-be-displayed images forming video by using inter prediction.

2. Description of the Related Art

A technique relating to an image coding method which encodes an image (including a moving image) or an image decoding method which decodes an image is described in Joint Collaborative Team on Video Coding (JCT-VC) of ITU-T SG16 WP3 and ISO/IEC JTC1/SC29/WG11 12th Meeting: Geneva, CH, 14-23 Jan. 2013 JCTVC-L1003_v34.doc, High Efficiency Video Coding (HEVC) text specification draft 10 (for FDIS & Last Call) http://phenix.it-sudparis.eu/jct/doc_end_user/documents/12_Geneva/wg11/JCTVC-L1003-v34.zip.

Further, a technique relating to an image coding method which uses a background image is disclosed in Japanese Unexamined Patent Application Publication No. 10-23423.

However, an image coding apparatus and the like of the related art may not possibly be able to refer to an appropriate reference image for inter prediction (inter-frame prediction).

SUMMARY

One non-limiting and exemplary embodiment provides an image coding apparatus and the like which are capable of reference to an appropriate reference image for inter prediction.

In one general aspect, the techniques disclosed here feature an image coding apparatus which encodes a plurality of to-be-displayed images forming video by using inter prediction. The image coding apparatus includes an obtaining unit that obtains a reference-specific image which is an image different from the plurality of to-be-displayed images or different from a plurality of reconfigured images obtained by reconfiguration of the plurality of to-be-displayed images and which is an image used as an image that is specific to reference for the inter prediction, and an encoding unit that encodes one or more to-be-displayed images among the plurality of to-be-displayed images by referring to the reference-specific image as a reference image for the inter prediction.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 29 is a diagram illustrating a structure of multiplexed data;

FIG. 35 is a diagram illustrating an internal structure of stream attribute information;

FIG. 40 is a diagram illustrating an example of a lookup table in which a video data standard and a driving frequency are associated with each other;

DETAILED DESCRIPTION

Underlying Knowledge of Present Disclosure

Figure 1:
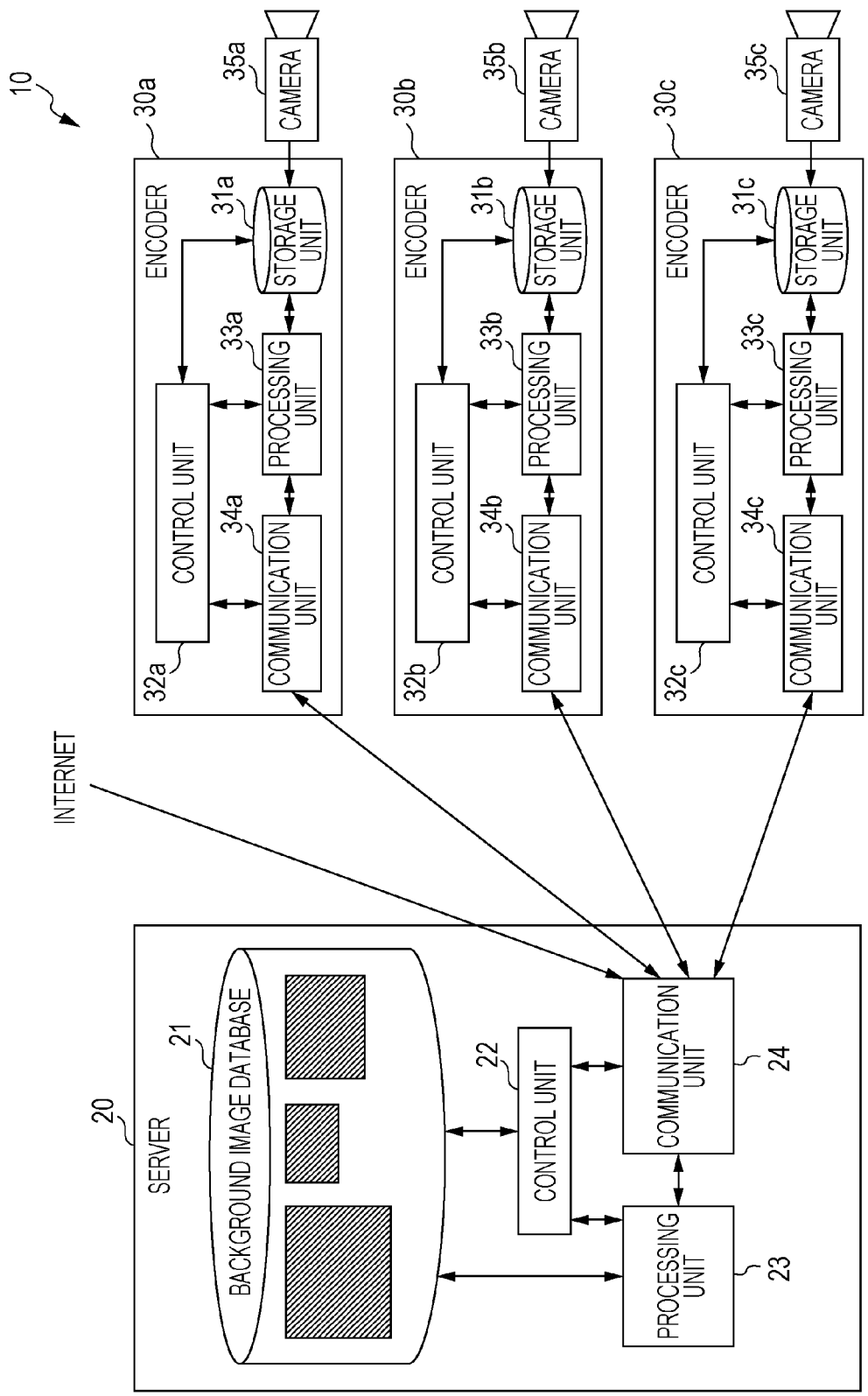
FIG. 1 is a diagram illustrating a configuration of an image processing system according to a first embodiment.

The inventor has found issues regarding the image coding method which encodes an image or the image decoding method which decodes an image, which are described in the "Background" section. The issues are specifically described below.

With the recent marked technological advances of digital video devices, the opportunities for compressing and encoding video signals (a plurality of pictures arranged in chronological order) input from a video camera, a television tuner, or the like and recording the resulting video signals onto a recording medium such as a digital versatile disc (DVD) or a hard disk are increasing. An image coding standard, called H.264/Advanced Video Coding (AVC) (MPEG-4 AVC), is available, and the next-generation standard, called High Efficiency Video Coding (HEVC) (see Joint Collaborative Team on Video Coding (JCT-VC) of ITU-T SG16 WP3 and ISO/IEC JTC1/SC29/WG11 12th Meeting: Geneva, CH, 14-23 Jan. 2013 JCTVC-L1003_v34.doc, High Efficiency Video Coding (HEVC) text specification draft 10 (for FDIS & Last Call) http://phenix.it-sudparis.eu/jct/doc_end_user/documents/12_Geneva/wg11/JCTVC-L1003-v34.zip (hereinafter referred to as "Non-Patent Literature 1"), is being examined.

Meanwhile, technology for improving coding efficiency by saving a background image over a long time period and by using the saved background image as a reference image for inter prediction is disclosed in Japanese Unexamined Patent Application Publication No. 10-23423 (hereinafter referred to as "Patent Literature 1").

The HEVC standard (see Non-Patent Literature 1) has a mechanism called a long-term reference image to which the technology described in Patent Literature 1 is applicable. A decoded image designated as a long-term reference image is saved to a frame memory over a long time period. Accordingly, it is possible to provide a long-term reference to the decoded image designated as a long-term reference image in the subsequent decoding iterations.

In some cases, an appropriate reference image may not necessarily be included in video. In such cases, an appropriate reference image is difficult to refer to for inter prediction. Thus, coding efficiency may be reduced.

For example, even if the technology described in Non-Patent Literature 1 and Patent Literature 1 is used in the encoding of an image captured using a camera capable of pan, tilt, and zoom operations, coding efficiency may not be improved. Specifically, the pan, tilt, or zoom operation may cause a significant change in the background. For this reason, even if a background image is saved as a long-term reference image, an image to be encoded on which the pan, tilt, or zoom operation has been performed may not match the background image. Accordingly, the accuracy of prediction will not be improved and coding efficiency will not be improved.

Accordingly, in some aspects, the present disclosure provides an image coding apparatus and the like which are capable of reference to an appropriate reference image for inter prediction.

For example, an image coding apparatus according to an aspect of the present disclosure is an image coding apparatus which encodes a plurality of to-be-displayed images forming video by using inter prediction. The image coding apparatus includes an obtaining unit that obtains a reference-specific image which is an image different from the plurality of to-be-displayed images or different from a plurality of reconfigured images obtained by reconfiguration of the plurality of to-be-displayed images and which is an image used as an image that is specific to reference for the inter prediction, and an encoding unit that encodes one or more to-be-displayed images among the plurality of to-be-displayed images by referring to the reference-specific image as a reference image for the inter prediction.

With the configuration described above, the image coding apparatus can refer to a reference-specific image different from a to-be-displayed image or the like for inter prediction. Thus, the image coding apparatus can refer to an appropriate reference image for inter prediction.

Further, for example, the obtaining unit may obtain, as the reference-specific image, a reference-specific image having a larger size than each of the plurality of to-be-displayed images.

With the configuration described above, the image coding apparatus can encode an image by referring to a reference-specific image including a background portion corresponding to, for example, a pan, tilt, or zoom operation or the like.

Further, for example, the obtaining unit may obtain, as the reference-specific image, a reference-specific image formed by integrating a plurality of captured images that are a plurality of images obtained through an image capturing operation.

With the configuration described above, the image coding apparatus can refer to a reference-specific image formed by integrating, for example, a plurality of images obtained through pan, tilt, and zoom operations or the like or a plurality of images obtained by a plurality of cameras. Thus, the image coding apparatus can refer to a more appropriate reference image.

Further, for example, the obtaining unit may obtain the reference-specific image before an initial to-be-displayed image in coding order among the plurality of to-be-displayed images is encoded.

With the configuration described above, the image coding apparatus can make preparations for encoding video in advance, and can perform smooth video encoding.

Further, for example, the obtaining unit may obtain part or all of the reference-specific image by receiving part or all of the reference-specific image from an image management apparatus, and the encoding unit may encode the one or more to-be-displayed images by referring to the reference-specific image, part or all of which has been obtained.

With the configuration described above, the image coding apparatus can obtain an appropriate reference-specific image for inter prediction from an image management apparatus.

Further, for example, the obtaining unit may obtain, as the reference-specific image, each of a plurality of reference-specific images including a first reference-specific image corresponding to a first image capture condition and a second reference-specific image corresponding to a second image capture condition, and the encoding unit may encode the one or more to-be-displayed images by referring to the first reference-specific image as the reference-specific image in a case where the video has been captured in the first image capture condition, or encode the one or more to-be-displayed images by referring to the second reference-specific image as the reference-specific image in a case where the video has been captured in the second image capture condition.

With the configuration described above, the image coding apparatus can switch between a plurality of reference-specific images in accordance with the image capture condition of the video.

Further, for example, the obtaining unit may further update the reference-specific image by using one or more reconfigured images among the plurality of reconfigured images obtained by reconfiguration of the plurality of to-be-displayed images, and the encoding unit may encode the one or more to-be-displayed images by referring to the updated reference-specific image.

With the configuration described above, the image coding apparatus can appropriately update a reference-specific image in accordance with the video.

Further, for example, when encoding an image to be encoded among the one or more to-be-displayed images, the encoding unit may transform the reference-specific image so that the reference-specific image corresponds to the image to be encoded, and refer to, as the reference image, a reference-specific image obtained as a result of transforming the reference-specific image.

With the configuration described above, the image coding apparatus can refer to the transformed reference-specific image in accordance with an image to be encoded. Thus, the image coding apparatus can refer to a more appropriate reference image for inter prediction.

Further, for example, the encoding unit may perform scaling of the reference-specific image so that a subject in the reference-specific image has a size corresponding to a size of a subject in the image to be encoded, and refer to, as the reference image, a reference-specific image subjected to the scaling.

With the configuration described above, the image coding apparatus can refer to the reference-specific image subjected to scaling in accordance with an image to be encoded. Thus, the image coding apparatus can refer to a more appropriate reference image for inter prediction.

Further, for example, the encoding unit may perform scaling of the reference-specific image by using image capture information on each of the reference-specific image and the image to be encoded or by using a position of a feature point in each of the reference-specific image and the image to be encoded.

With the configuration described above, the image coding apparatus can perform appropriate scaling of a reference-specific image in accordance with image capture information or the like.

Further, for example, the encoding unit may perform scaling of the reference-specific image in accordance with precision of motion vectors used in the inter prediction.

With the configuration described above, the image coding apparatus can perform scaling of a reference-specific image so that, for example, information on a fractional pixel pointed by a motion vector is maintained.

Further, for example, the encoding unit may further encode a transform parameter that is a parameter used to transform the reference-specific image.

With the configuration described above, an image decoding apparatus can transform a reference-specific image in a manner similar to that for the image coding apparatus.

Further, for example, the encoding unit may further encode an overall vector indicating a position of an area in the reference-specific image which corresponds to an image to be encoded among the one or more to-be-displayed images.

With the configuration described above, the image coding apparatus can encode information indicating an area in the reference-specific image which is used for inter prediction. Thus, an image decoding apparatus can also use the corresponding area for inter prediction.

Further, for example, the encoding unit may calculate the overall vector by using image capture information on each of the reference-specific image and the image to be encoded or by using a position of a feature point in each of the reference-specific image and the image to be encoded, and encode the calculated overall vector.

With the configuration described above, the image coding apparatus can calculate an area in the reference-specific image which is used for inter prediction.

Further, for example, the encoding unit may encode the one or more to-be-displayed images, and generate a coded sequence including the one or more to-be-displayed images, separately from a coded sequence including the reference-specific image.

With the configuration described above, the image coding apparatus can obtain a reference-specific image at appropriate timing separately from the video.

Further, for example, the encoding unit may further encode the reference-specific image as a non-display image.

With the configuration described above, the image coding apparatus can encode a reference-specific image so as to be distinguished from a to-be-displayed image.

For example, an image decoding apparatus according to another aspect of the present disclosure may be an image decoding apparatus which decodes a plurality of to-be-displayed images forming video by using inter prediction. The image decoding apparatus includes an obtaining unit that obtains a reference-specific image which is an image different from the plurality of to-be-displayed images or different from a plurality of reconfigured images obtained by reconfiguration of the plurality of to-be-displayed images and which is an image used as an image that is specific to reference for the inter prediction; and a decoding unit that decodes one or more to-be-displayed images among the plurality of to-be-displayed images by referring to the reference-specific image as a reference image for the inter prediction.

With the configuration described above, the image decoding apparatus can refer to a reference-specific image different from a to-be-displayed image or the like for inter prediction. Thus, the image decoding apparatus can refer to an appropriate reference image for inter prediction.

For example, an image processing system according to another aspect of the present disclosure may be an image processing system which encodes and decodes a plurality of to-be-displayed images forming video by using inter prediction. The image processing system includes an image management apparatus that obtains a reference-specific image which is an image different from the plurality of to-be-displayed images or different from a plurality of reconfigured images obtained by reconfiguration of the plurality of to-be-displayed images and which is an image used as an image that is specific to reference for the inter prediction; an image coding apparatus that encodes the plurality of to-be-displayed images by using the inter prediction; and an image decoding apparatus that decodes the plurality of to-be-displayed images by using the inter prediction. The image coding apparatus includes a first obtaining unit that obtains the reference-specific image from the image management apparatus, and an encoding unit that encodes one or more to-be-displayed images among the plurality of to-be-displayed images by referring to the reference-specific image obtained by the first obtaining unit as a reference image for the inter prediction. The image decoding apparatus includes a second obtaining unit that obtains the reference-specific image from the image management apparatus, and a decoding unit that decodes one or more to-be-displayed images among the plurality of to-be-displayed images by referring to the reference-specific image obtained by the second obtaining unit as a reference image for the inter prediction.

With the configuration described above, the image coding apparatus and the image decoding apparatus in the image processing system can refer to a reference-specific image different from a to-be-displayed image or the like for inter prediction. Thus, the image coding apparatus and the image decoding apparatus in the image processing system can refer to an appropriate reference image for inter prediction.

It should be noted that these general or specific aspects may be implemented using a system, an apparatus, a method, an integrated circuit, a computer program, or a non-transitory computer-readable recording medium such as a compact disc read-only memory (CD-ROM), or may be implemented using any combination of a system, an apparatus, a method, an integrated circuit, a computer program, or a recording medium.

Embodiments will be specifically described hereinafter with reference to the drawings. It should be noted that the following embodiments illustrate general or specific examples. Numerical values, shapes, materials, elements, arranged positions and connection forms of the elements, steps, the order of the steps, and so forth illustrated in the following embodiments are merely examples, and are not intended to limit the present disclosure. Among elements described in the following embodiments, an element that is not included in any of the independent claims which represent the most generic concept of the present disclosure is described as an optional element.

In the following, a decoded image and a decoded block may represent a reconfigured image and a reconfigured block, respectively. Note that a decoded image of an image x represents a decoded version of the image x. Furthermore, a reconfigured image of an image x represents an image obtained by reconfiguration of the image x.

First Embodiment

Overall Configuration

FIG. 1 is a diagram illustrating a configuration of an image processing system according to a first embodiment. An image processing system 10 illustrated in FIG. 1 includes, for example, a server 20, encoders 30*a*, 30*b*, and 30*c*, and cameras 35*a*, 35*b*, and 35*c*. While the three encoders 30*a*, 30*b*, and 30*c* are illustrated in FIG. 1, one encoder may be used, or two or more than three encoders may be used. Also, one camera may be used, or two or more than three cameras may be used.

The server 20 includes a background image database 21, a control unit 22, a processing unit 23, and a communication unit 24. The background image database 21 is a database for accumulating background images. The control unit 22 controls the operation of the individual elements of the server 20. The processing unit 23 performs information processing. The operation of the server 20 is basically performed by the processing unit 23. The communication unit 24 communicates with the encoders 30*a*, 30*b*, and 30*c* and so forth. The communication unit 24 may communicate with an external device via the Internet.

The server 20 may further include a storage unit. The background image database 21 may be included in the storage unit of the server 20.

The encoder 30*a* includes a storage unit 31*a*, a control unit 32*a*, a processing unit 33*a*, and a communication unit 34*a*. The storage unit 31*a* stores images such as an image from the camera 35*a* and an encoded image. The control unit 32*a* controls the operation of the individual elements of the encoder 30*a*. The processing unit 33*a* performs information processing. The operation of the encoder 30*a* is basically performed by the processing unit 33*a*. In particular, the processing unit 33*a* encodes an image input from the camera 35*a*. The communication unit 34*a* communicates with the server 20.

The encoder 30*b* includes a storage unit 31*b*, a control unit 32*b*, a processing unit 33*b*, and a communication unit 34*b*. The encoder 30*c* includes a storage unit 31*c*, a control unit 32*c*, a processing unit 33*c*, and a communication unit 34*c*. These elements are similar to the respective elements of the encoder 30*a*. The encoder 30*a* encodes an image obtained from the camera 35*a*, the encoder 30*b* encodes an image obtained from the camera 35*b*, and the encoder 30*c* encodes an image obtained from the camera 35*c*.

For example, the encoder 30*a* encodes an image input from the camera 35*a*, and accumulates the encoded input image in the server 20. Specifically, an image captured using the camera 35*a* is input to the encoder 30*a* as an input image. The encoder 30*a* encodes the input image using the processing unit 33*a*, and transmits the encoded input image to the server 20.

The server 20 transmits a background image in the background image database 21 to the encoder 30*a*. The encoder 30*a* encodes the input image by using the background image transmitted from the server 20. Further, the server 20 obtains various pieces of information from the Internet.

Here, the configuration of the encoder 30*a*, the operation of the encoder 30*a*, and the operation performed between the server 20 and the encoder 30*a* are mainly illustrated.

The configuration of the encoder 30*b*, the operation of the encoder 30*b*, and the operation performed between the server 20 and the encoder 30*b* are also similar to the configuration of the encoder 30a, the operation of the encoder 30a, and the operation performed between the server 20 and the encoder 30a, respectively. The configuration of the encoder 30c, the operation of the encoder 30c, and the operation performed between the server 20 and the encoder 30c are also similar to the configuration of the encoder 30a, the operation of the encoder 30a, and the operation performed between the server 20 and the encoder 30a, respectively.

Operation (Overall Operation)

Figure 2:
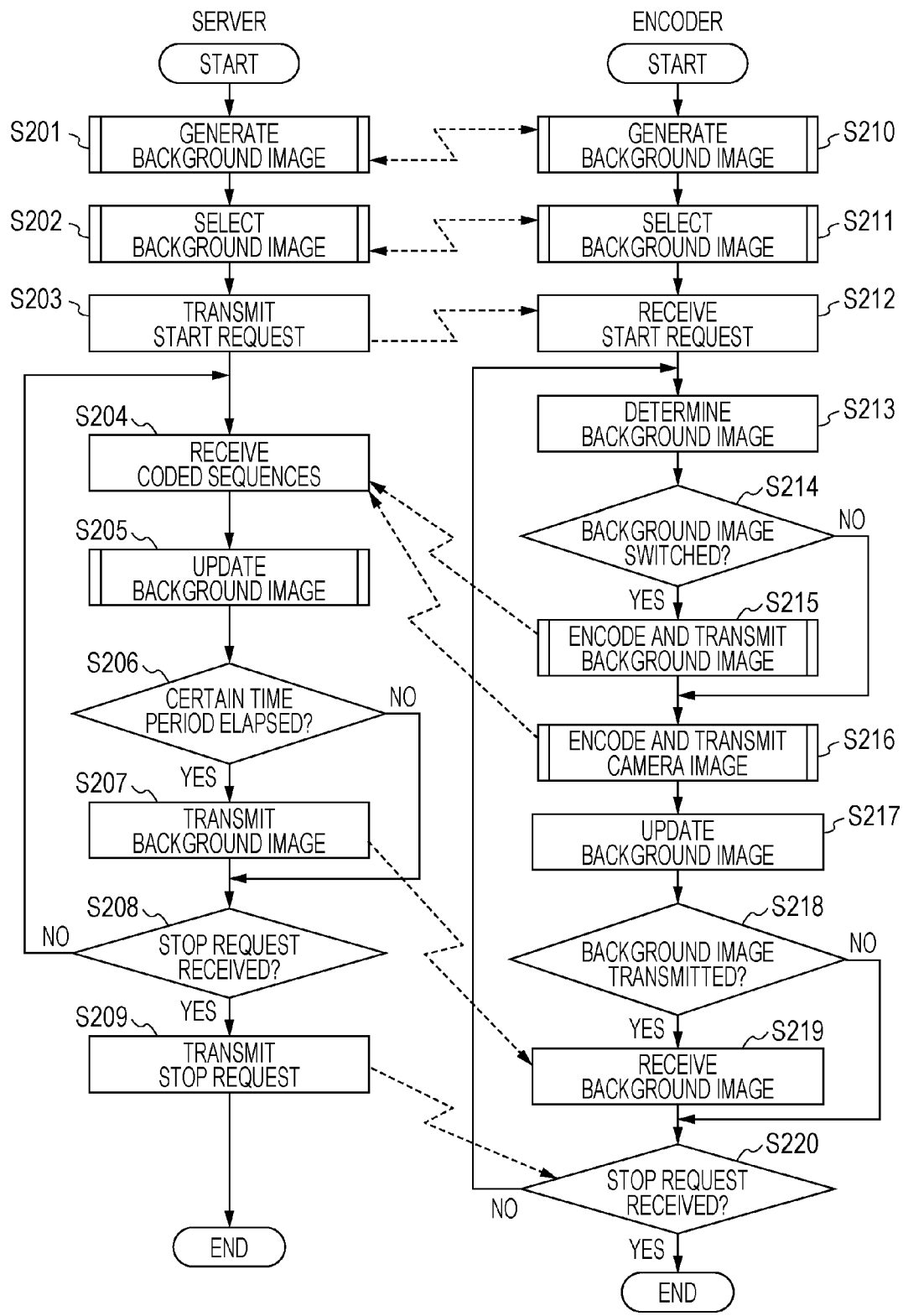
FIG. 2 is a diagram illustrating the flow of a process performed by the image processing system according to the first embodiment.

Next, the flow of the overall encoding process will be described with reference to FIG. 2. FIG. 2 is a diagram illustrating the flow of a process performed by the image processing system 10 illustrated in FIG. 1.

First, the server 20 and the encoder 30a perform data transmission and reception to generate a background image (S201 and S210). Then, the server 20 and the encoder 30a select a plurality of background images to be used for encoding (S202 and S211). The details are described below.

Then, the server 20 transmits a start request to start an encoding operation to the encoder 30a (S203). The encoder 30a receives the start request (S212).

Then, the encoder 30a determines a background image to be used for encoding (S213). Here, the encoder 30a determines one of the plurality of background images selected in the selection process (S211) as the background image to be used. Specifically, the encoder 30a determines a background image by using time-of-day information indicating the time of day at which the image capturing operation was performed. Examples of the time of day at which the image capturing operation was performed include the current time of day at which an encoding operation is performed. For example, the encoder 30a uses a first background image at time t, and a second background image at time t+1.

Then, if the background image determined in the determination process (S213) is a background image switched from the preceding background image, the encoder 30a encodes the background image, and transmits a coded sequence of background images to the server 20 (S214 and S215).

Then, the encoder 30a encodes a camera image by referring to the background image. Then, the encoder 30a transmits a coded sequence of camera images to the server 20 (S216). The details are described below.

The server 20 receives the coded sequence of background images and the coded sequence of camera images from the encoder 30a (S204). The server 20 concatenates these coded sequences into, for example, a sequence illustrated in FIG. 3, and saves the resulting sequence to a memory (the storage unit) in the server 20.

Figure 3:
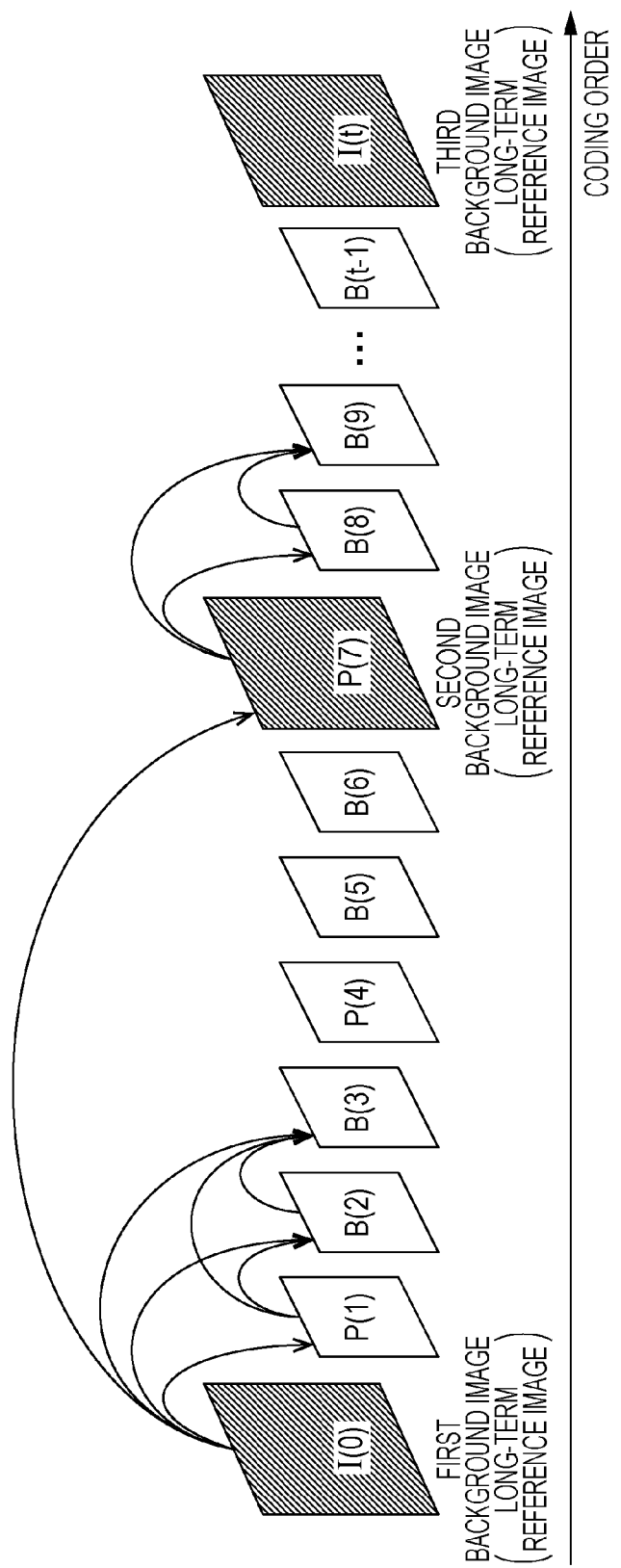
FIG. 3 is a diagram illustrating a coded sequence according to the first embodiment.

In FIG. 3, I(x) denotes an image to be intra-frame coded (intra prediction), P(x) denotes an image to be coded with unidirectional reference (unidirectional inter prediction), and B(x) denotes an image to be coded with bidirectional reference (bidirectional inter prediction). The sign "x" in brackets represents the order in which coding is performed (coding order). In FIG. 3, an arrow pointing between images represents a reference relationship. For example, P(1) is encoded using I(0) as a reference image, and B(3) is encoded using I(0), P(1), and B(2) as reference images.

Further, I(0), P(7), and I(t) are background images. The background images are referred to over a long time period, and are thus encoded as long-term reference images.

Then, the encoder 30a updates the used background image (S217). In this case, the encoder 30a updates the background image by using a camera image obtained by decoding camera images included in the coded sequence generated in the encoding process (S216). For example, a portion of the background may be hidden by a moving object which is included in the background image, and not all the background may be included in the background image. Thus, the encoder 30a updates the background image by using the camera image.

Specifically, for example, a moving object moves to different locations rather than staying at a single location. It is thus possible to identify the pixel values of the background by using the average values of pixels in a plurality of camera images. Accordingly, the encoder 30a calculates, for each individual pixel, an average of the pixel values between the used background image and the decoded camera image. Then, the encoder 30a updates the background image by using the averages calculated for the individual pixels, enabling pseudo-removal of a moving object from the background image.

The background changes with time. Thus, the background image may be updated so as to keep track of the change. For example, the background image may be updated in accordance with the background that becomes darker with the passage of time at night. Here, the background image may also be updated using the decoded camera image. Specifically, as described above, the averages calculated for the individual pixels may be used for the pixel values of the background image.

Then, the server 20 updates the background image (S205). Here, unlike the update process (S217) performed by the encoder 30a, the server 20 updates a background image in the background image database 21 by using a camera image. If a certain time period has elapsed since the last time the background image was transmitted to the encoder 30a (YES in S206), the server 20 transmits the background image acquired at the current time to the encoder 30a (S207). If a background image is transmitted from the server 20 (YES in S218), the encoder 30a receives the background image transmitted from the server 20 (S219).

The server 20 repeatedly performs the process described above (S204 to S207) until a stop request to stop the encoding operation is received from the user (NO in S208). Upon receipt of the stop request (YES in S208), the server 20 transmits the stop request to the encoder 30a (S209), and then ends the process. The encoder 30a repeatedly performs the process described above (S213 to S219) until a stop request to stop the encoding operation is received from the server 20 (NO in S220). Upon receipt of the stop request (YES in S220), the encoder 30a ends the process.

Operation (Background Image Generation)

Figure 4:
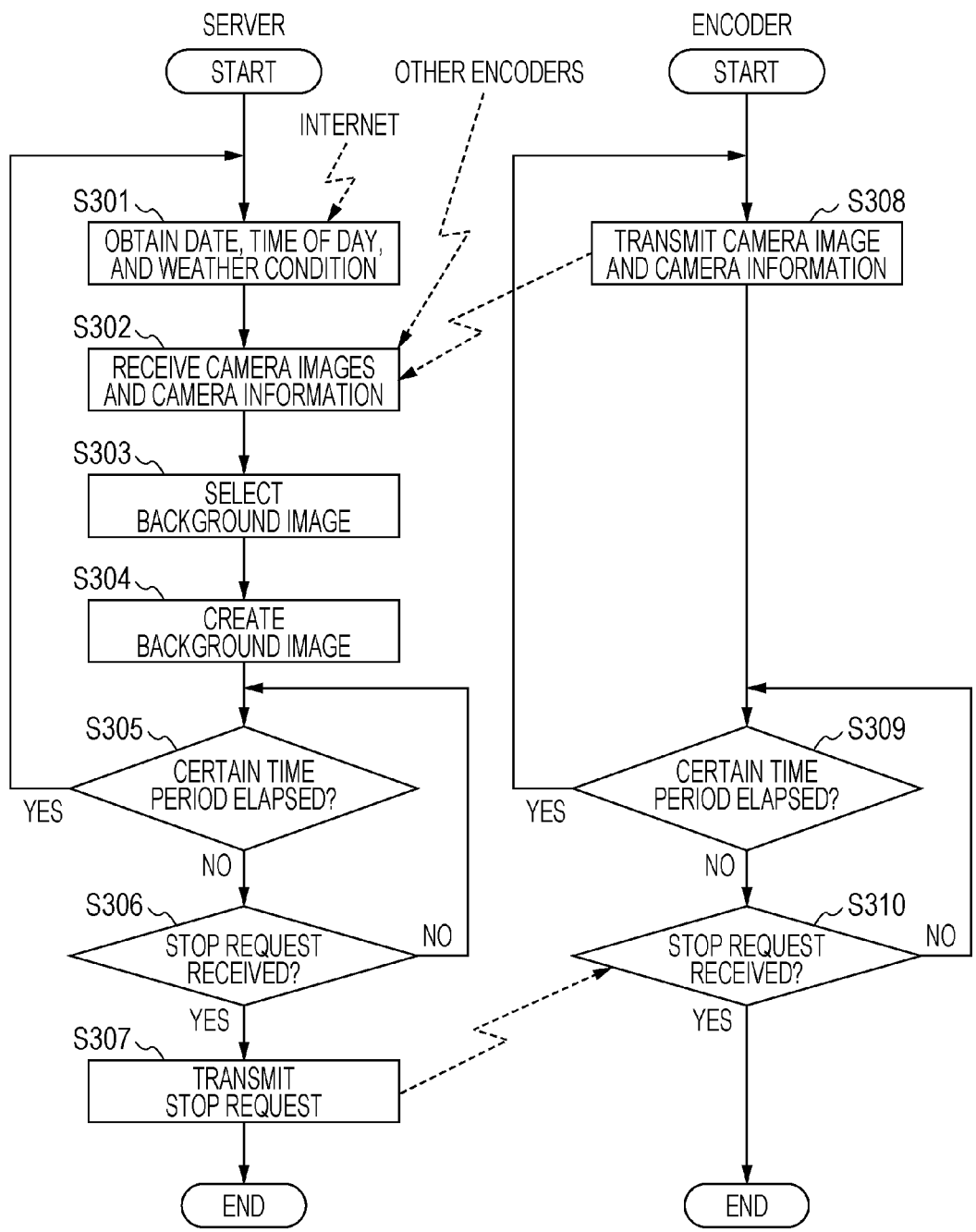
FIG. 4 is a diagram illustrating the flow of a background image generation process according to the first embodiment.

Next, the flow of the background image generation process (S201 and S210) will be described with reference to FIG. 4. FIG. 4 is a diagram illustrating the flow of the generation process (S201 and S210) illustrated in FIG. 2.

First, the server 20 obtains the date, time of day, and weather (climate) condition from the Internet (S301). The server 20 further obtains camera images and camera information from the encoders 30a, 30b, and 30c (S302 and S308). The camera information indicates control data such as a camera installation location, a pan/tilt angle (an angle corresponding to at least one of pan and tilt), and a zoom magnification. The camera information is also represented as image capture information.

Then, the server 20 selects a background image to be created, by using the date, the time of day, and the weather conditions of the camera installation locations, the camera images, and the camera information (S303). More specifically, the server 20 selects, as the background image to be created, a single background image from the background image database 21 by using the plurality of items described above as search keys. Alternatively, the server 20 may select, as the background image to be created, the background image that best matches the camera images by performing image matching.

Then, the server 20 creates a background image by using camera information corresponding to the plurality of camera images and by using image feature points in each of the plurality of camera images (S304). Here, the server 20 creates a background image having a larger size than each camera image, such as a panoramic image.

Then, the server 20 repeatedly performs the process described above (S301 to S304) at certain time intervals until a stop request to stop creating a background image is received from the user. Upon receipt of the stop request, the server 20 transmits the stop request to the encoder 30a, and ends the process (S305, S306, and S307). The encoder 30a repeatedly performs the transmission process (S308) at certain time intervals until a stop request to stop creating a background image is received from the server 20. Upon receipt of the stop request, the encoder 30a ends the process (S309 and S310).

Figure 5:
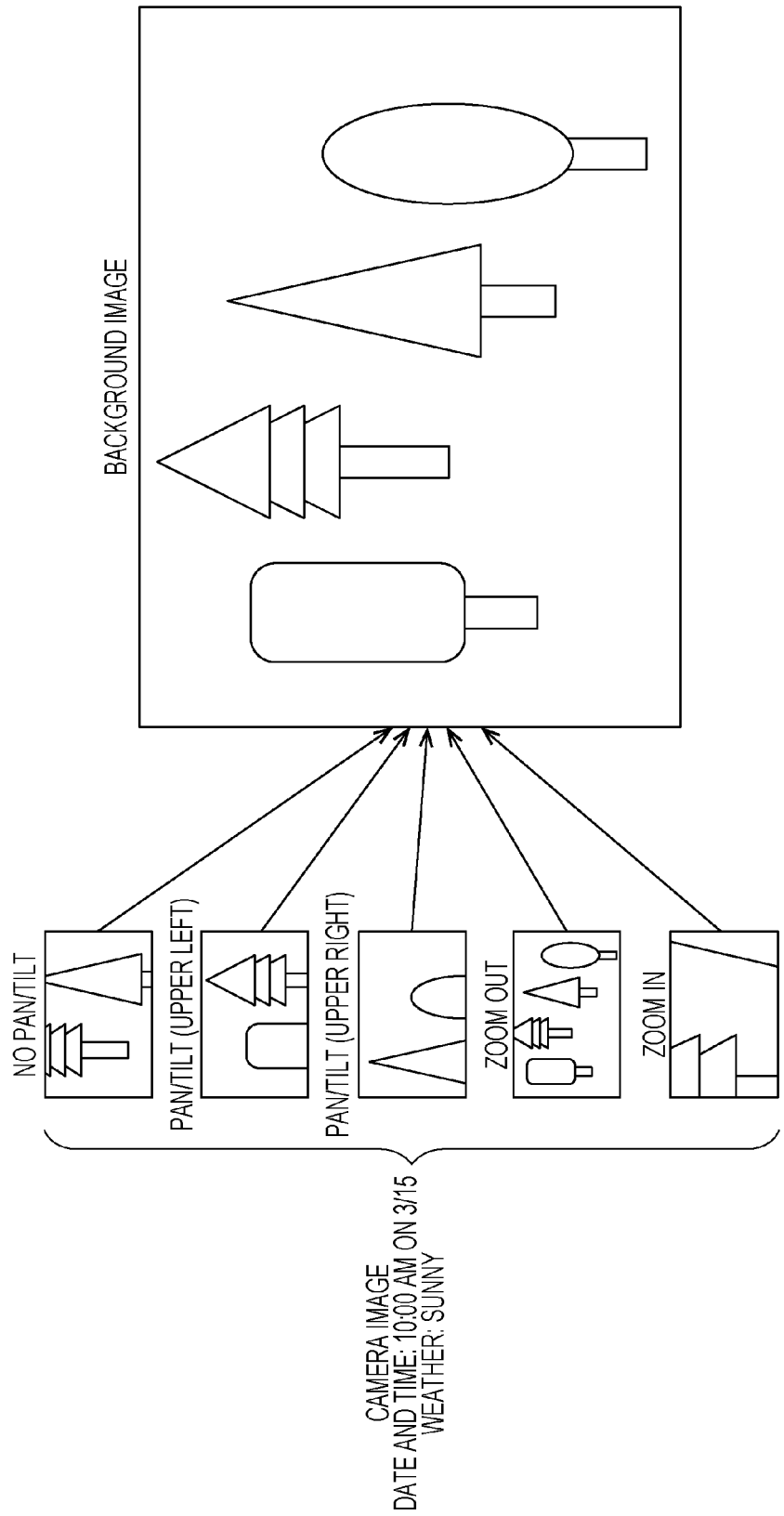
FIG. 5 is a diagram illustrating a background image according to the first embodiment.
Figure 6:
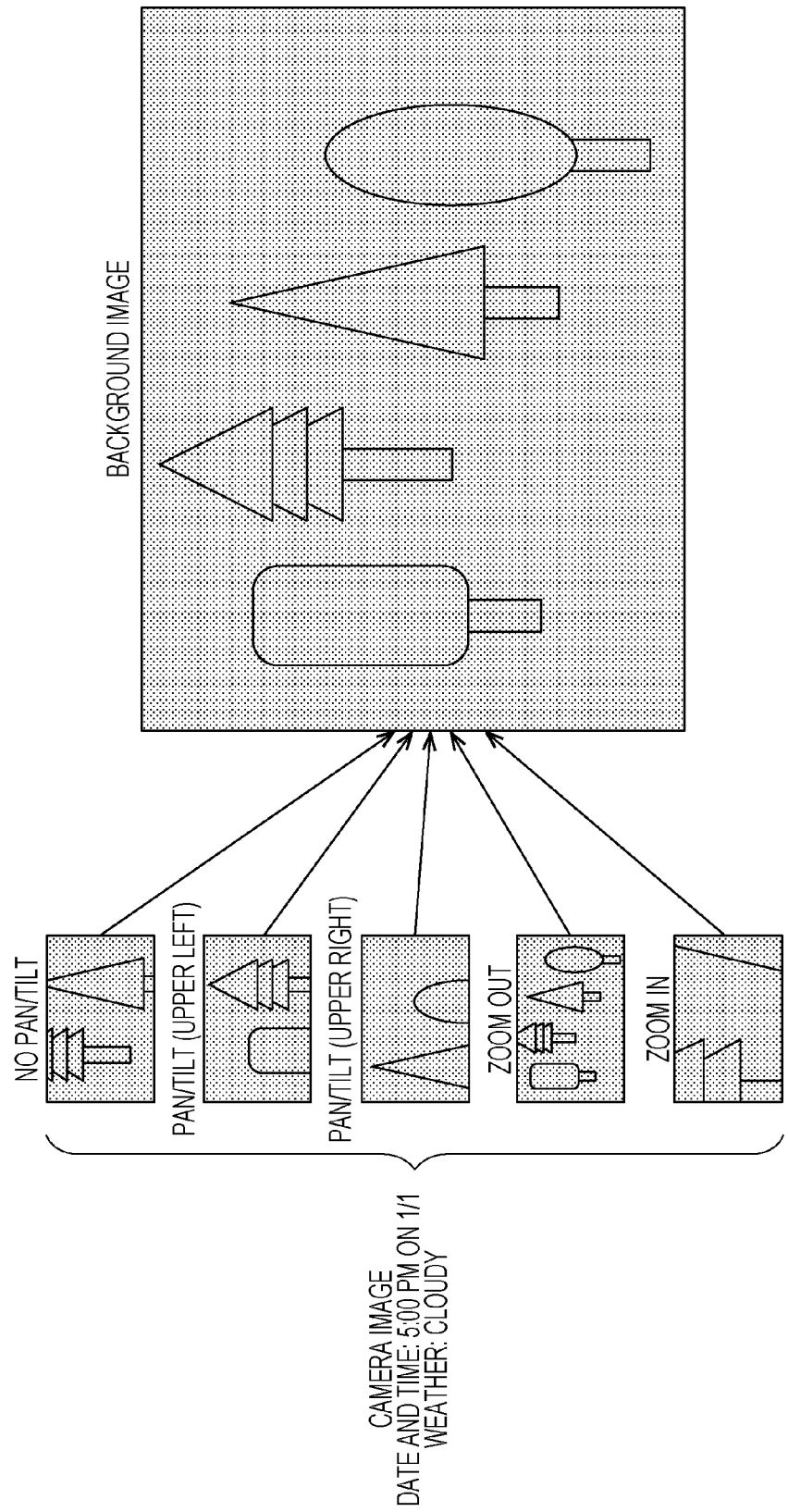
FIG. 6 is a diagram illustrating another background image according to the first embodiment.

Through the operation described above, a background image having a large size is generated from a plurality of images obtained using the pan, tilt, and zoom operations and the like of the camera 35a. FIG. 5 and FIG. 6 illustrate examples. For example, as in FIG. 5, a plurality of camera images are obtained using the pan, tilt, and zoom operations and the like at 10:00 am on a sunny morning on March 15. Further, a large background image is generated from the obtained camera images.

More specifically, a background image like a panoramic image is generated from a plurality of images obtained using the pan and tilt operations. A sharp background image having a higher resolution is further generated from an image obtained using the zoom operation.

The resolution of the background image may be adjusted to that of the most zoomed-in image. The images other than the most zoomed-in image may be subjected to an enlargement process to adjust the resolution. The server 20 may roughly estimate the respective positions of the plurality of camera images with respect to the background image by using the pan/tilt angle or the zoom magnification, and may combine the plurality of images with high accuracy by using the image feature points to create a background image.

The server 20 further generates another background image from camera images captured under another weather condition at another date and time, as in FIG. 6. That is, the server 20 creates a plurality of background images in accordance with a plurality of conditions.

Operation (Background Image Selection)

Figure 7:
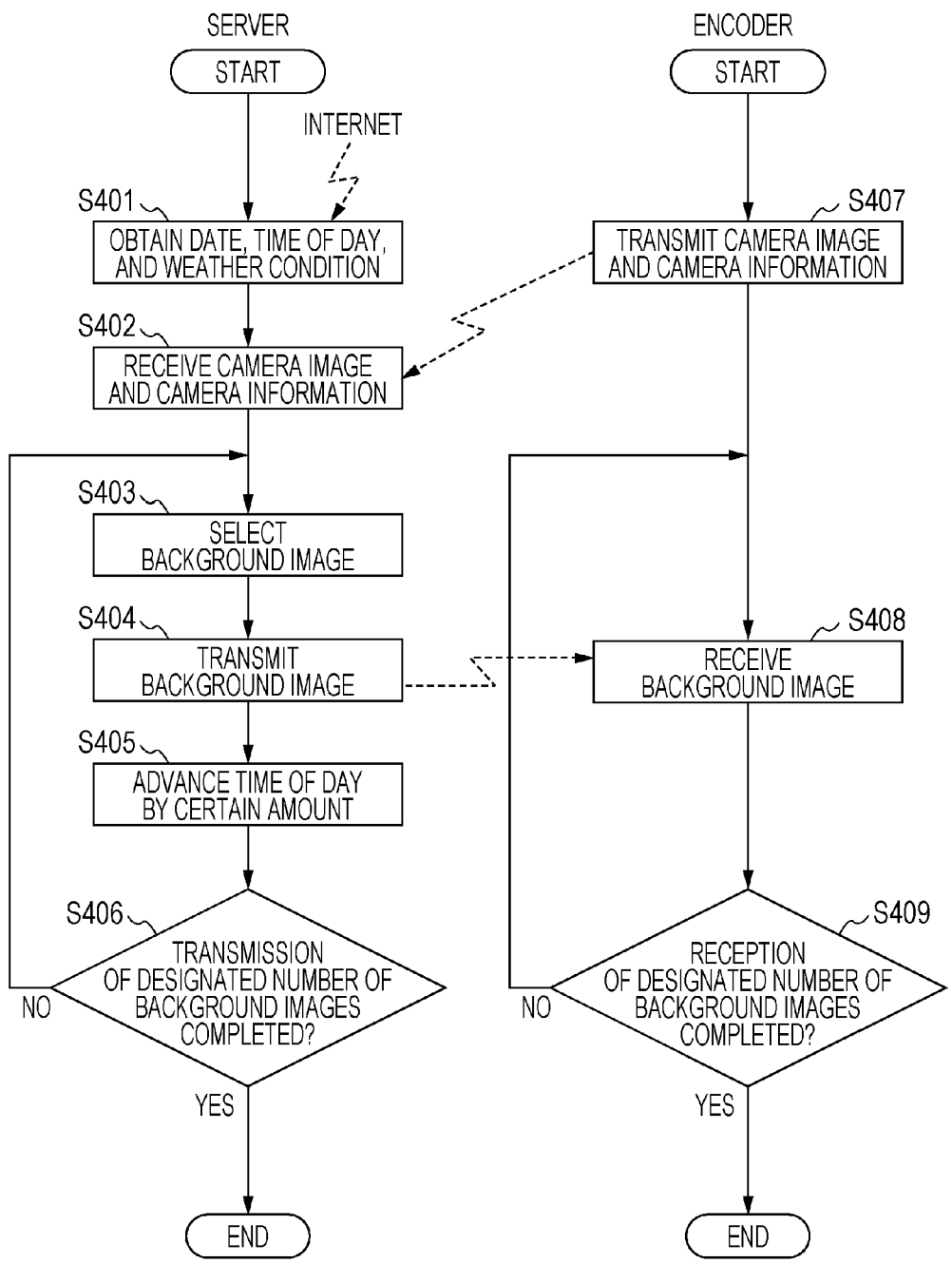
FIG. 7 is a diagram illustrating the flow of a background image selection process according to the first embodiment.

Next, the flow of the background image selection process (S202 and S211) will be described with reference to FIG. 7. FIG. 7 is a diagram illustrating the flow of the selection process (S202 and S211) illustrated in FIG. 2.

First, the server 20 obtains the date, the time of day, and the weather condition from the Internet (S401). The server 20 further obtains a camera image and camera information from the encoder 30a (S402 and S407).

Then, the server 20 selects the best matching background image using the date, the time of day, the weather condition of the camera installation location, the camera image, and the camera information (the pan/tilt angle and the zoom magnification) (S403). The server 20 may select a background image by using the camera image by performing image matching. Then, the server 20 transmits the selected background image to the encoder 30a (S404). The encoder 30a receives the background image transmitted from the server 20 (S408).

Then, the server 20 advances the time of day, which is used in the background image selection process (S403), by a certain amount (S405). Then, the background image selection process (S403), the background image transmission process (S404), the background image reception process (S408), and the process for changing the time of day (S405) are repeatedly performed until the transmission and reception of a designated number of background images are completed (S406 and S409).

Accordingly, the encoder 30a receives a plurality of background images corresponding to the time t, the time $t+\alpha$, the time $t+\alpha\times 2$, ..., and the time $t+\alpha\times m$ among the plurality of background images that match the weather condition of the camera installation location, the camera image, and the camera information.

Operation (Background Image Update)

Figure 8:
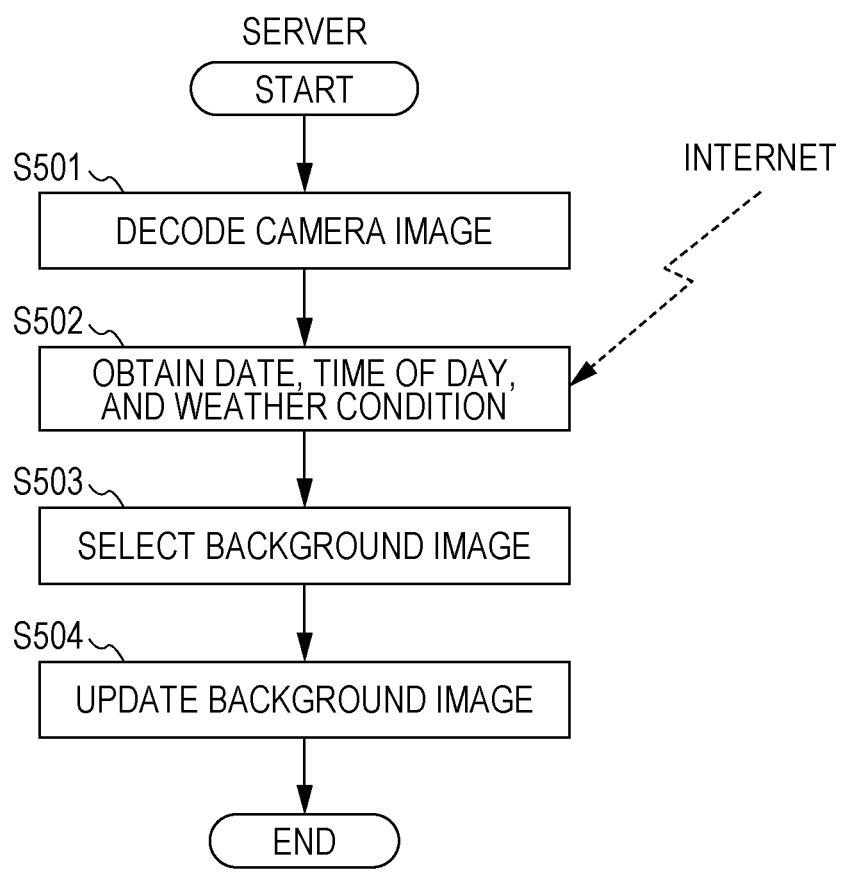
FIG. 8 is a diagram illustrating the flow of a background image update process according to the first embodiment.

Next, the flow of the background image update process (S205) performed by the server 20 will be described with reference to FIG. 8. FIG. 8 is a diagram illustrating the flow of the update process (S205) illustrated in FIG. 2.

First, the server 20 decodes the encoded camera images in the coded sequence to obtain decoded camera images (S501).

Then, the server 20 obtains the date, the time of day, and the weather condition from the Internet (S502). The server 20 selects a background image by using the information obtained from the Internet, the decoded camera images, and the camera information (S503).

The server 20 updates a background image in a similar way to that in the background image creation process (S304) by using the camera information and image feature points in the camera images (S504). In the update process, specifically, the server 20 may update the pixel values of the background image by using the average of the pixel values of an existing background image and the pixel values of a new camera image, or may update the pixel values of the background image by a weighted average.

Further, the server 20 may recognize a subject (object) in a camera image, and update only a background portion other than the area of the subject. In this case, the server 20 may recognize a moving subject, and update only a background portion other than the area of the moving subject.

Encoding Configuration

Figure 9:
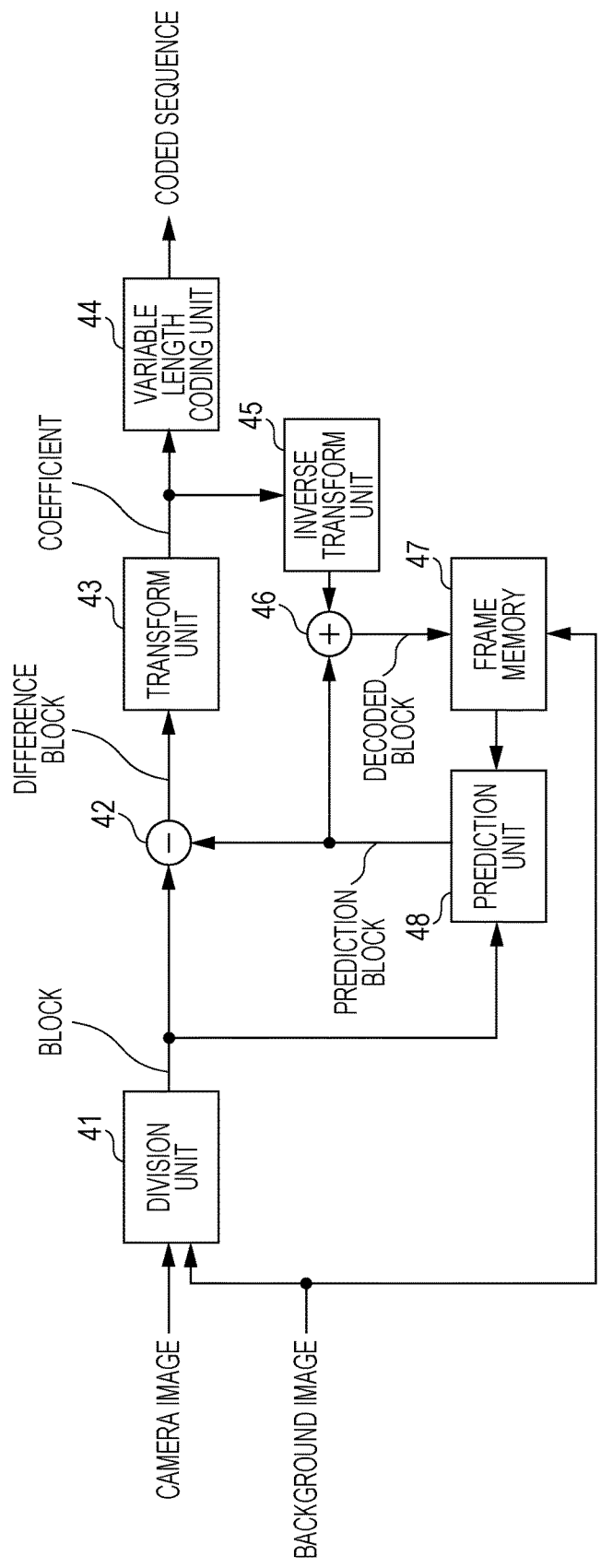
FIG. 9 is a diagram mainly illustrating a configuration of a processing unit of an encoder according to the first embodiment.

FIG. 9 is a diagram mainly illustrating a configuration of the processing unit 33a of the encoder 30a illustrated in FIG. 1. The processing unit 33a includes a division unit 41, a subtraction unit 42, a transform unit 43, a variable length coding unit 44, an inverse transform unit 45, an addition unit 46, a frame memory 47, and a prediction unit 48. The frame memory 47 may be included in the storage unit 31a.

The division unit 41 divides a camera image or a background image into a plurality of blocks. The subtraction unit 42 subtracts a prediction block from the blocks obtained by division, and outputs residual blocks. The transform unit 43 performs a frequency transform on the residual blocks, and outputs coefficients. The variable length coding unit 44 performs variable length coding on the coefficients. The inverse transform unit 45 performs an inverse frequency transform on the coefficients, and outputs residual blocks.

The addition unit 46 adds the prediction block and the residual blocks together to generate decoded blocks (reconfigured blocks). The frame memory 47 stores an image made up of the decoded blocks. The frame memory 47 may store a background image directly without the intervention of the division unit 41 or the like. The prediction unit 48 generates a prediction block by using the blocks obtained by division and the image stored in the frame memory 47.

Operation (Encoding)

Figure 10:
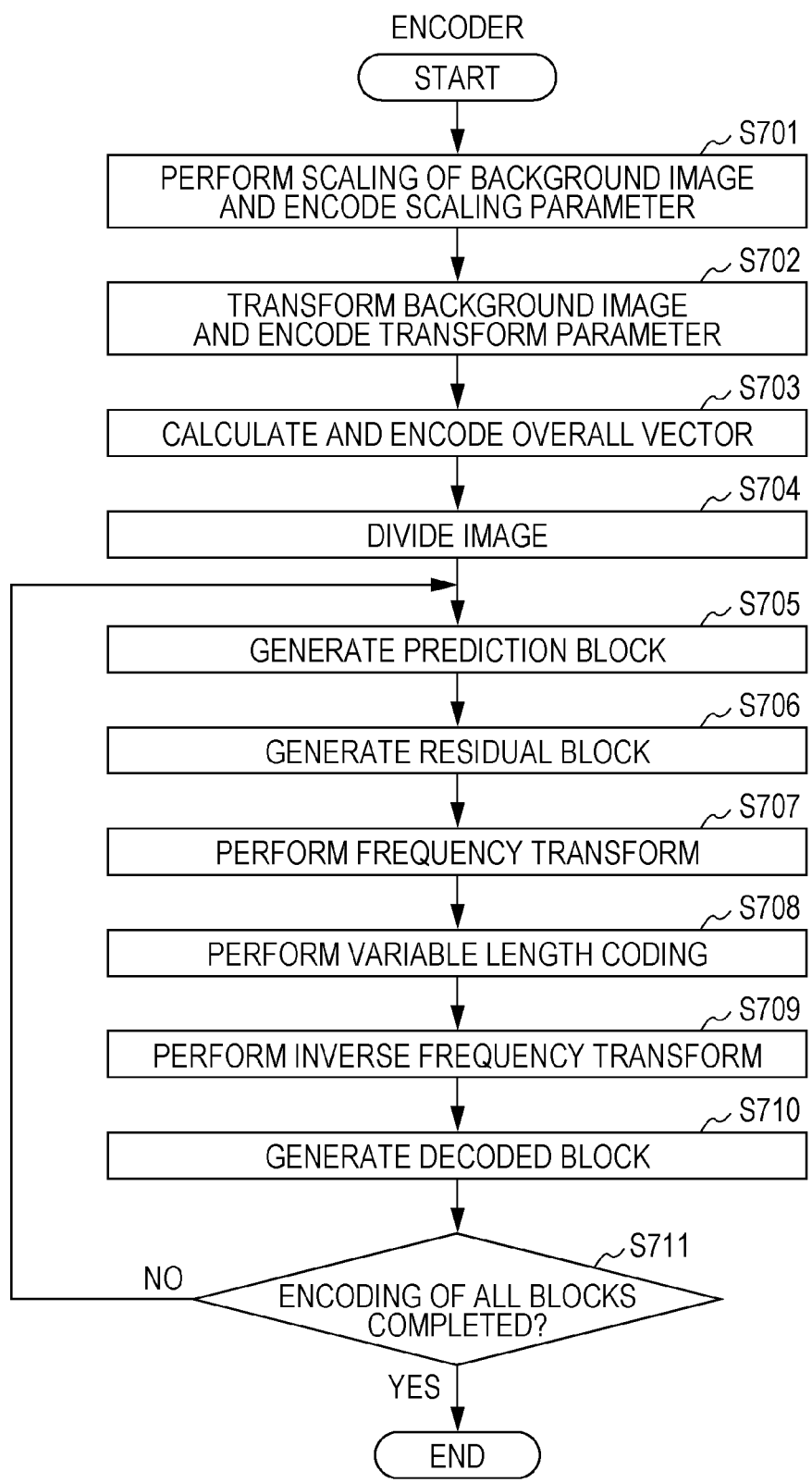
FIG. 10 is a diagram illustrating the flow of an encoding process according to the first embodiment.

Next, the flow of the camera image encoding process (S216) performed by the encoder 30a will be described with reference to FIG. 10. FIG. 10 is a diagram illustrating the flow of the encoding process (S216) illustrated in FIG. 2.

First, the encoder 30a performs scaling of the background image, and encodes a scaling parameter used in the scaling process (S701). Here, the encoder 30a performs scaling of the background image so that the resolution of the background image matches the resolution of the camera image acquired at the current time (the image to be encoded).

Figure 11:
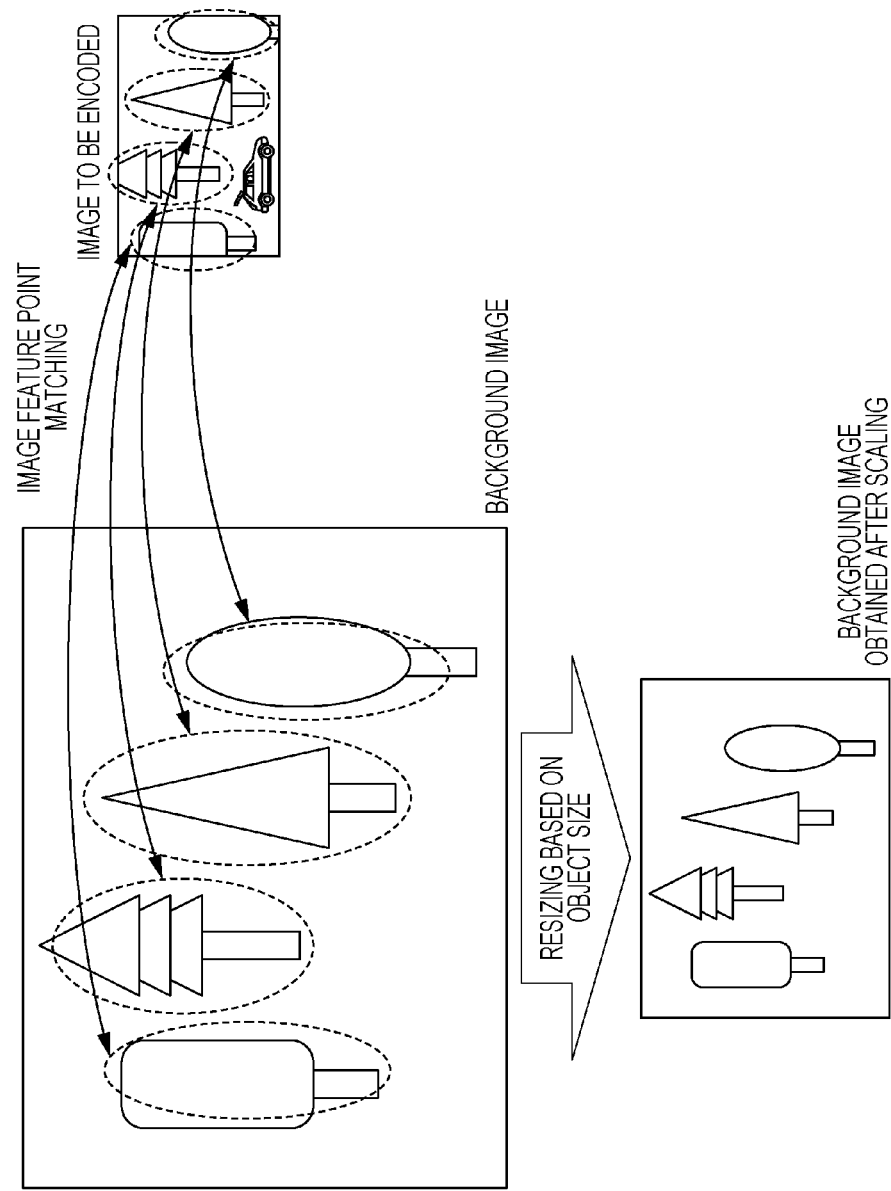
FIG. 11 is a diagram illustrating a scaling process according to the first embodiment.

An example of the scaling process is illustrated in FIG. 11. FIG. 11 is a diagram illustrating the scaling process (S701) illustrated in FIG. 10.

For example, the resolution of the background image corresponds to the resolution of the most zoomed-in image. Thus, the resolution of the background image is basically higher than the resolution of the image to be encoded. The encoder 30a performs scaling of the background image so that the background image can be used as a reference image for the image to be encoded, in order to make the resolution of background image match the resolution of the image to be encoded.

For example, the encoder 30a performs matching of image feature points by using either SIFT (Scale-Invariant Feature Transform) or SURF (Speeded Up Robust Features), both of which are used for image recognition and the like in scaling, and resizes the background image so that the size of the subject in the background image is equal to the size of the subject in the image to be encoded.

Then, the encoder 30a performs a transform process (image processing) on the background image, and encodes a transform parameter used in this transform process (S702). Accordingly, the encoder 30a makes the background image match the camera image acquired at the current time.

Figure 12:
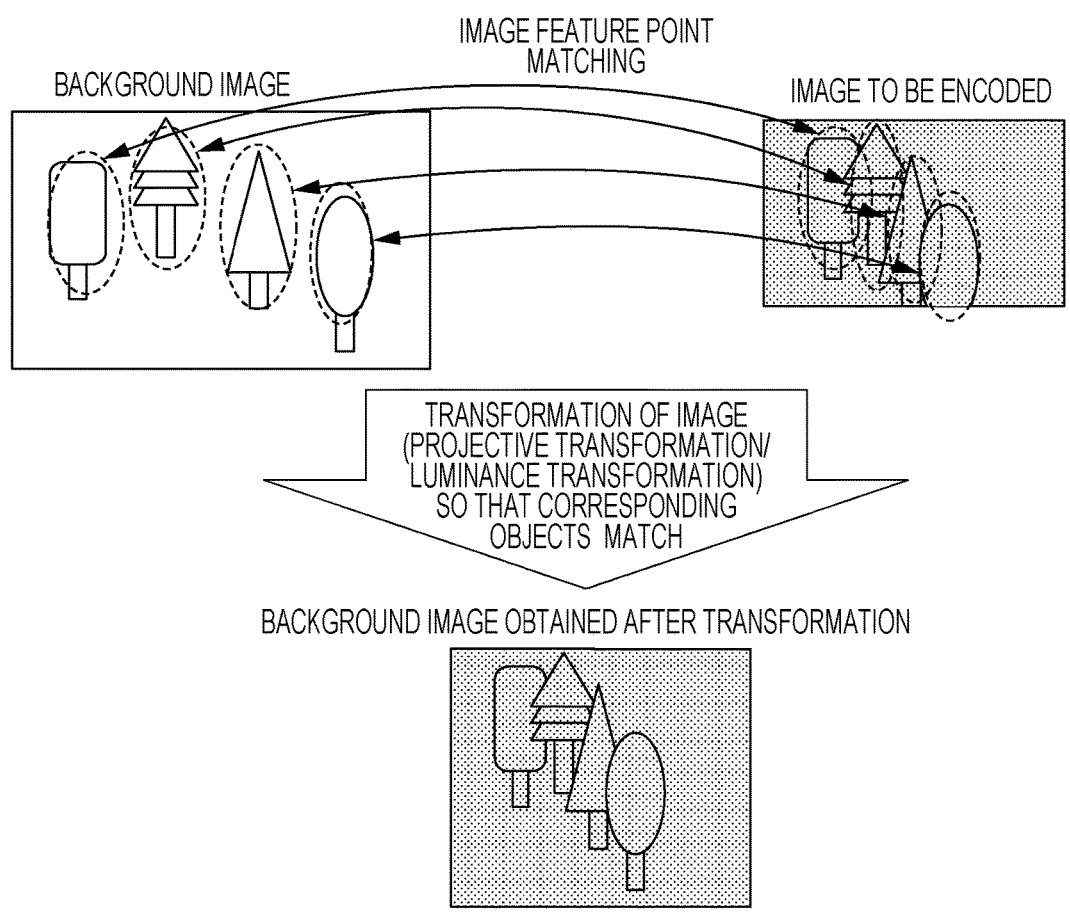
FIG. 12 is a diagram illustrating a transform process according to the first embodiment.

An example of the transform process is illustrated in FIG. 12. FIG. 12 is a diagram illustrating the transform process (S702) illustrated in FIG. 10.

The angle of a single background image in which a plurality of camera images which are obtained from the plurality of cameras 35a, 35b, and 35c are integrated may not necessarily match the angle of the image to be encoded which are obtained from the camera 35a. In addition, the overall luminance of the background image and the overall luminance of the image to be encoded may differ depending on the weather or lighting conditions. To address the above-described situations, the encoder 30a performs projective transformation, luminance transformation, and the like on the background image so that the subject in the background image matches the subject in the image to be encoded.

Similarly to the scaling process (S701), the encoder 30a performs matching of image feature points by using either SIFT or SURF, and calculates a transform parameter.

Then, the encoder 30a calculates an overall vector, and encodes the calculated overall vector (S703). The overall vector represents a shift between the background image and the image to be encoded. In other words, the overall vector represents the relative position of the image to be encoded with respect to the background image.

Figure 13:
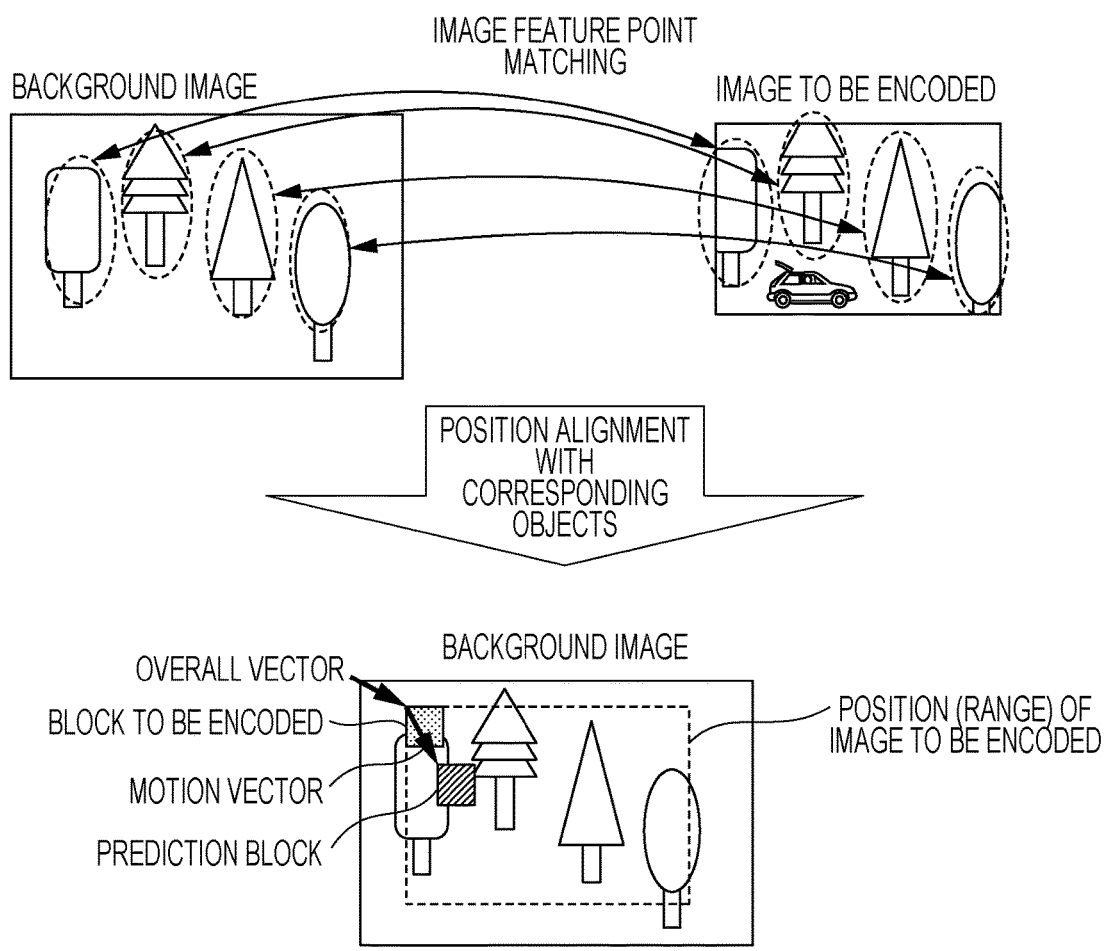
FIG. 13 is a diagram illustrating an overall vector according to the first embodiment.

An example of the overall vector is illustrated in FIG. 13. FIG. 13 is a diagram illustrating an overall vector calculated in the calculation process (S703) illustrated in FIG. 10.

A background image is generated from a plurality of camera images obtained using the pan and tilt operations. The background image has thus basically a larger image size than the image to be encoded. The encoder 30a calculates a shift between the background image and the image to be encoded as an overall vector. Then, the encoder 30a encodes the motion vectors of the individual blocks by using the overall vector as a base to reduce the amount of code for the motion vectors.

For example, the same motion vector may be encoded in each block of the image to be encoded. The use of the overall vector reduces the amount of code used in this case.

Similarly to the scaling process (S701), the encoder 30a performs matching of image feature points by using either SIFT or SURF to calculate the overall vector.

Then, in the encoder 30a, the division unit 41 divides the image to be encoded into a plurality of blocks (S704). The prediction unit 48 generates a prediction block for the block being processed (S705). The subtraction unit 42 generates a residual block between the prediction block and a code block (S706). Then, the transform unit 43 performs a frequency transform on the residual block to generate a transform coefficient (S707).

Then, in the encoder 30a, the variable length coding unit 44 performs variable length coding on the transform coefficient (S708). The inverse transform unit 45 performs an inverse frequency transform on the transform coefficient (S709). The addition unit 46 adds the block obtained using the inverse frequency transform and the prediction block together to generate a decoded block (S710).

Note that the prediction unit 48 generates a prediction block by referring to a background image, a decoded image (reference image), or a decoded block in the same image. Further, the encoder 30a encodes, as a motion vector, the difference between the vector used for the generation of the prediction block and the overall vector by using the overall vector calculated in the calculation process (S703) as a base. As in the example illustrated in FIG. 13, a vector obtained by adding the overall vector to the motion vector to be encoded is used as a vector for the generation of a prediction block.

The encoder 30a repeatedly performs the block encoding process (S705 to S710) until the encoding of all the blocks is completed (S711).

Advantages

In the first embodiment, as described above, a wide-range and high-resolution background image is used. Accordingly, coding efficiency can be improved, particularly, in a case where the camera 35a performs a pan, tilt, or zoom operation.

More specifically, the image processing system 10 generates a background image in advance from a plurality of images captured by the camera 35a or the like through a pan, tilt, or zoom operation. The image processing system 10 uses the generated background image as a reference image to encode a camera image.

Accordingly, the background portion in the camera image to be encoded is likely to be included in the background image even if the pan, tilt, or zoom operation has been performed. Thus, the image processing system 10 can assign a large amount of code to a moving object in the camera image to be encoded.

Furthermore, by performing an image capturing operation in advance, it is possible to prepare a background image not including a moving object. Accordingly, a higher quality background image can be used.

In addition, the image processing system 10 can update the background image by using a decoded image (reconfigured image) of an image which has already been encoded, thereby updating the background image so that the background image matches the current camera image. That is, the image processing system 10 can make the background image close to the image to be encoded, and can improve the accuracy of prediction.

For example, in a case where a background image includes a moving object, a portion of the background is hidden. Accordingly, not all the background may be included in the single background image. The image processing system 10 updates the background image by using a plurality of camera images, enabling a background image not including a portion of the background to be compensated for by a camera image including the portion of the background. Furthermore, the background may change with time. For example, in a case where the background becomes darker with the passage of time at night, the background image may be updated.

In addition, by updating a background image, the image processing system 10 can rapidly keep track of a change in the background in a case where, for example, the layout of chairs changes. Also, by updating a background image by using a decoded image, the image processing system 10 can reduce the number of times background images are transmitted and received between the server 20 and the encoder 30a.

In the image processing system 10, the background image update process may be shared between the encoder 30a and a decoder. Thus, an updated background image may not necessarily be included in a coded sequence. Accordingly, the overall amount of code is reduced.

In addition, the encoder 30a updates a background image, which may eliminate the need for the server 20 to hold a large number of various background images. Accordingly, the capacity of the memory (storage unit) in the server 20 can be reduced.

In addition, the image processing system 10 generates a background image by using a plurality of images obtained by a plurality of cameras. Thus, a background image indicating all the background can be created even if a portion of the background is hidden by a moving object. Specifically, in a case where an image obtained by the camera 35a does not show the background behind a person, an image obtained by the camera 35b may show the background behind the person. In this case, the image processing system 10 may generate a background image including the background behind the person by using the image obtained by the camera 35b.

In addition, the image processing system 10 may create a plurality of background images corresponding to a plurality of image capture conditions (a plurality of seasons, a plurality of times of day, and a plurality of weather conditions). For example, the image processing system 10 adaptively switches between the background images in accordance with the image capture condition. Accordingly, coding efficiency is improved.

Specifically, the image processing system 10 switches the background image to be created, in accordance with, as illustrated in FIG. 5 and FIG. 6, the time of day or the weather condition. Further, as illustrated in the flow in FIG. 7, the image processing system 10 selects the most appropriate background image from the image capture conditions and camera images at the time when the encoding operation was performed. Accordingly, the image processing system 10 can make the background image close to the image to be encoded. The image processing system 10 can thus reduce prediction errors.

Furthermore, a background image may change in accordance with the season, the time of day, or the weather condition. For example, the background around 5:00 pm in the winter is dark, whereas the background around 5:00 pm in the summer is not so dark. In addition, the background changes in accordance with the weather condition such as sunny, cloudy, rainy, or snowy. The image processing system 10 switches between a plurality of background images depending on the image capture conditions at the time when the encoding operation was performed (at the time when the image capturing operation was performed), enabling an improvement in coding efficiency.

In addition, the image processing system 10 transforms the background image in the manner illustrated in FIG. 12, and uses the transformed background image as a reference image. This makes the background image close to the image to be encoded, and reduces prediction errors. This can also reduce the capacity of the frame memory 47 to store background images.

As a result of the preparation of a large number of background images, prediction errors may be reduced without each background image being transformed. In this case, the frame memory 47 requires a large capacity. The amount of processing involved in the selection of a background image is also large. In addition, background images are transmitted and received between the server 20 and the encoder 30a or the like in accordance with the switching between background images. The amount of communication is thus large. Also, background images are encoded in accordance with the switching between background images. Thus, the amount of processing for encoding is large and the amount of code for a coded sequence is also large.

By transforming a background image, it is possible to reduce the capacity of the frame memory 47, the amount of processing, the amount of communication, and the amount of code.

In addition, saving background images to the server 20 may result in the frame memory 47 of the encoder 30a not requiring a large capacity. That is, the encoders 30a, 30b, and 30c can share background images on the server 20. By collecting individual camera images on the server 20, it is possible to reduce the influence of object movement and to generate a wide-range and high-resolution background image.

In addition, the server 20 transmits a plurality of background images to the encoder 30a in advance. The encoder 30a switches the background image to be used among the plurality of background images transmitted in advance from the server 20, in accordance with the time of day. Accordingly, the amount of communication between the server 20 and the encoder 30a is reduced during the encoding operation, and the communication load is distributed.

In the first embodiment, a background image is created in advance before encoding. The timing at which a background image is created is not limited to that described above. A background image may not necessarily be created in advance. In this case, the encoder 30a creates (updates) a background image while encoding camera images (S217). The server 20 creates (updates) a background image in the background image database 21 in accordance with the creation (update) of a background image by the encoder 30a (S205).

Accordingly, the image processing system 10 can immediately encode the camera images without creating a background image in advance. Thus, encoding delay can be suppressed.

Both or either of camera information and camera images may be used for the creation, selection, and update of a background image.

For example, the server 20 or the encoder 30*a* may designate a corresponding position of a camera image in a background image in accordance with only camera information (the pan/tilt angle and the zoom magnification). In some cases, high-accuracy background image creation, selection, and update based on only camera information may be possible. Such processes may be performed on a camera image for which a background image creation, selection, and update process is difficult to perform with image feature points, by using camera information.

Conversely, the processes described above may be performed only using image feature points in a camera image. In this case, camera information such as the pan/tilt angle and the zoom magnification may not necessarily be obtained from the camera 35*a*. Accordingly, the configuration is simplified and the amount of communication is reduced. The server 20 or the encoder 30*a* may also perform a background image creation, selection, and update process only by using image feature points in a camera image regardless of the magnitude of the error included in camera information such as the pan/tilt angle and the zoom magnification.

In addition, the server 20 transmits a background image to the encoder 30*a*. The server 20 may not necessarily transmit the background image in its entirety. The server 20 may transmit only a portion of the background image that will be used by the encoder 30*a*. For example, the server 20 may transmit only a portion of the background image to the encoder 30*a* in accordance with the movable pan and tilt range (the possible image capture range) of the camera 35*a* and the possible zoom magnification of the camera 35*a*.

Accordingly, the amount of communication between the server 20 and the encoder 30*a* can be reduced, and the capacity of the frame memory 47 of the encoder 30*a* can be reduced.

In addition, the encoder 30*a* performs scaling of a background image so that, as illustrated in FIG. 11, the size of the subject in the background image matches the size of the subject in the image to be encoded. The encoder 30*a* may change the scaling ratio so as to match the precision allowed for motion vectors. An example will be described with reference to FIG. 14 and FIG. 15.

Figure 14:
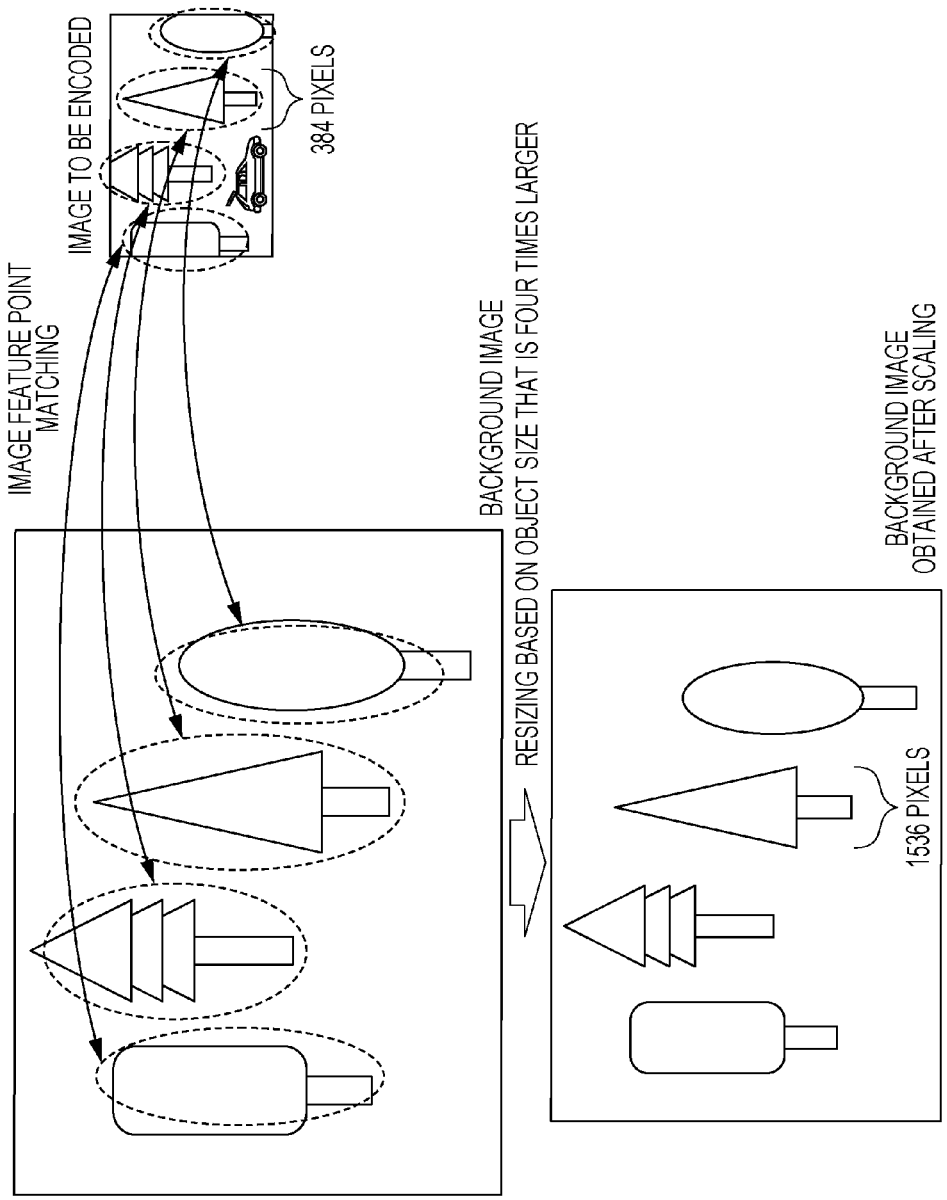
FIG. 14 is a diagram illustrating a modification of the scaling process according to the first embodiment.

FIG. 14 is a diagram illustrating a modification of the scaling process illustrated in FIG. 11. Specifically, FIG. 14 illustrates an example of the scaling process in a case where up to quarter-pixel precision is allowed for motion vectors, as specified in HEVC (see Non-Patent Literature 1). In this case, the encoder 30*a* performs scaling of a background image so that the subject in the background image has vertical and horizontal sizes four times larger than those of the subject in the image to be encoded.

Specifically, when the second tree from the right in the image to be encoded illustrated in FIG. 14 has a width of 384 pixels, scaling is performed so that the same subject in the background image, i.e., the second tree from the right, has a width of 1536 pixels (384 pixels×4). In the prediction block generation process, the encoder 30*a* refers to the individual pixels in the background image at intervals of four pixels.

Figure 15:
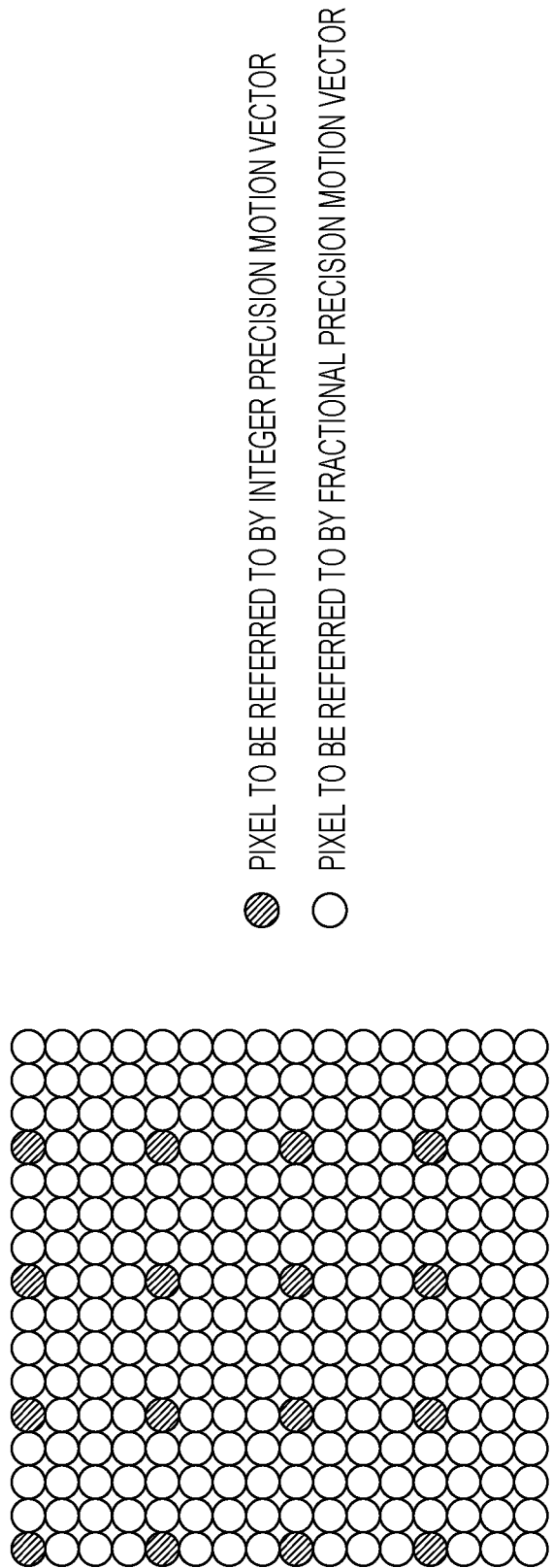
FIG. 15 is a diagram illustrating integer pixel precision and fractional pixel precision according to the first embodiment.

FIG. 15 is a diagram illustrating integer pixel precision and fractional pixel precision in the first embodiment. FIG. 15 illustrates individual pixels in a background image subjected to scaling. FIG. 15 further illustrates pixels to be referred to by integer-pixel-precision motion vectors and pixels to be referred to by fractional-pixel-precision motion vectors.

In HEVC (see Non-Patent Literature 1), when a fractional-pixel-precision motion vector is used, an integer-pixel-precision pixel value is subjected to a filtering process to estimate a fractional-pixel-precision pixel value. This method causes an error between the estimated pixel value and the original pixel value.

In the example illustrated in FIG. 14, by contrast, the encoder 30*a* generates a fractional-pixel-precision pixel value by using a high-resolution background image generated from a camera image obtained through a zoom-in operation. Thus, an error is less likely to occur between the generated pixel value and the original pixel value. The encoder 30*a* can therefore reduce prediction errors.

Note that the encoder 30*a* may switch between the scaling process illustrated in FIG. 11 and the scaling process illustrated in FIG. 14. For example, the encoder 30*a* may use the scaling process illustrated in FIG. 11 so that a smaller image size than the image size used in the scaling process illustrated in FIG. 14 is used, in order to reduce the capacity of the frame memory 47. The encoder 30*a* may use the scaling process illustrated in FIG. 14 so that prediction accuracy with fractional pixel precision is increased, in order to reduce prediction errors (in order to improve coding efficiency).

The encoder 30*a* may perform processes, such as performing scaling of the background image, transforming the background image, and calculating the overall vector, by using image feature points, or may perform the processes described above by using camera information such as the pan/tilt angle and the zoom magnification. For example, the encoder 30*a* may perform the processes described above on an image on which it is difficult to perform the processes described above by using image feature points, by using camera information. Alternatively, for the purpose of a simplified configuration of the camera 35*a*, the encoder 30*a* may perform the processes described above by using only image feature points.

Further, the absolute value sum of pixel differences instead of image feature points may be used for matching between images. It is assumed that two images whose absolute value sum of pixel differences is the smallest best match each other. Thus, a simplified matching process is achieved, resulting in parallel processing being performed by a single instruction multiple data (SIMD) arithmetic unit.

In the example illustrated in FIG. 5 and FIG. 6, furthermore, a background image is created from a plurality of camera images. The server 20 may generate a single background image not only by using an image obtained from the same camera 35*a* but also by using a plurality of images obtained from the different cameras 35*b* and 35*c*. For example, the server 20 may perform projective transformation on an image captured at a different angle by the different camera 35*b*, and may use the image subjected to the projective transformation to generate a background image for the camera 35*a*. Accordingly, the server 20 can obtain a background portion hidden by the moving object, and can obtain a background image with reduced influence of object movement.

FIG. 3 illustrates an example configuration of a coded sequence including images. In FIG. 3, a first background image, a second background image, and a third background image may be the same. For example, the encoder 30*a* may periodically insert a background image that is a long-term reference image into the coded sequence so that a decoded image is correctly displayed even if the video is reproduced from the middle and the decoding operation starts from the middle of the coded sequence.

Accordingly, for example, when an image after I(t) is displayed, a decoder can start the decoding operation from I(t). Thus, the number of decoding processing steps can be reduced, and the display delay can also be suppressed.

In FIG. 3, furthermore, a single coded sequence includes camera images and background images. Alternatively, as in FIG. 16, the encoder 30a may separately generate a coded sequence including camera images and a coded sequence including background images. This makes image sizes uniform in a single coded sequence. Thus, the encoding process and the decoding process are simplified. In addition, the encoder 30a can separately provide a coded sequence of background images to a decoder before the decoder decodes camera images. Accordingly, the communication load for the delivery of coded sequences can be distributed.

In the foregoing description, the encoder 30a encodes background images, and creates a coded sequence including the encoded background images. The coded sequence created by the encoder 30a may not necessarily include encoded background images. The coded sequence may include only encoded camera images. In this case, background images are separately transmitted to the decoder. In the transmission of background images, a background image encoded with high efficiency may be transmitted, or the pixel values of a background image may be transmitted.

In the transmission of background images from the server 20 to the encoder 30a, furthermore, the pixel values of a background image may be transmitted, or a coded sequence obtained by the encoding of a background image by using HEVC (see Non-Patent Literature 1) or Joint Photographic Experts Group (JPEG) may be transmitted. Further, the encoder 30a encodes a background image in the encoding process (S215). The encoder 30a may skip the background image encoding and transmission process (S215) by using the coded sequence received from the server 20 as encoded background images.

Figure 16:
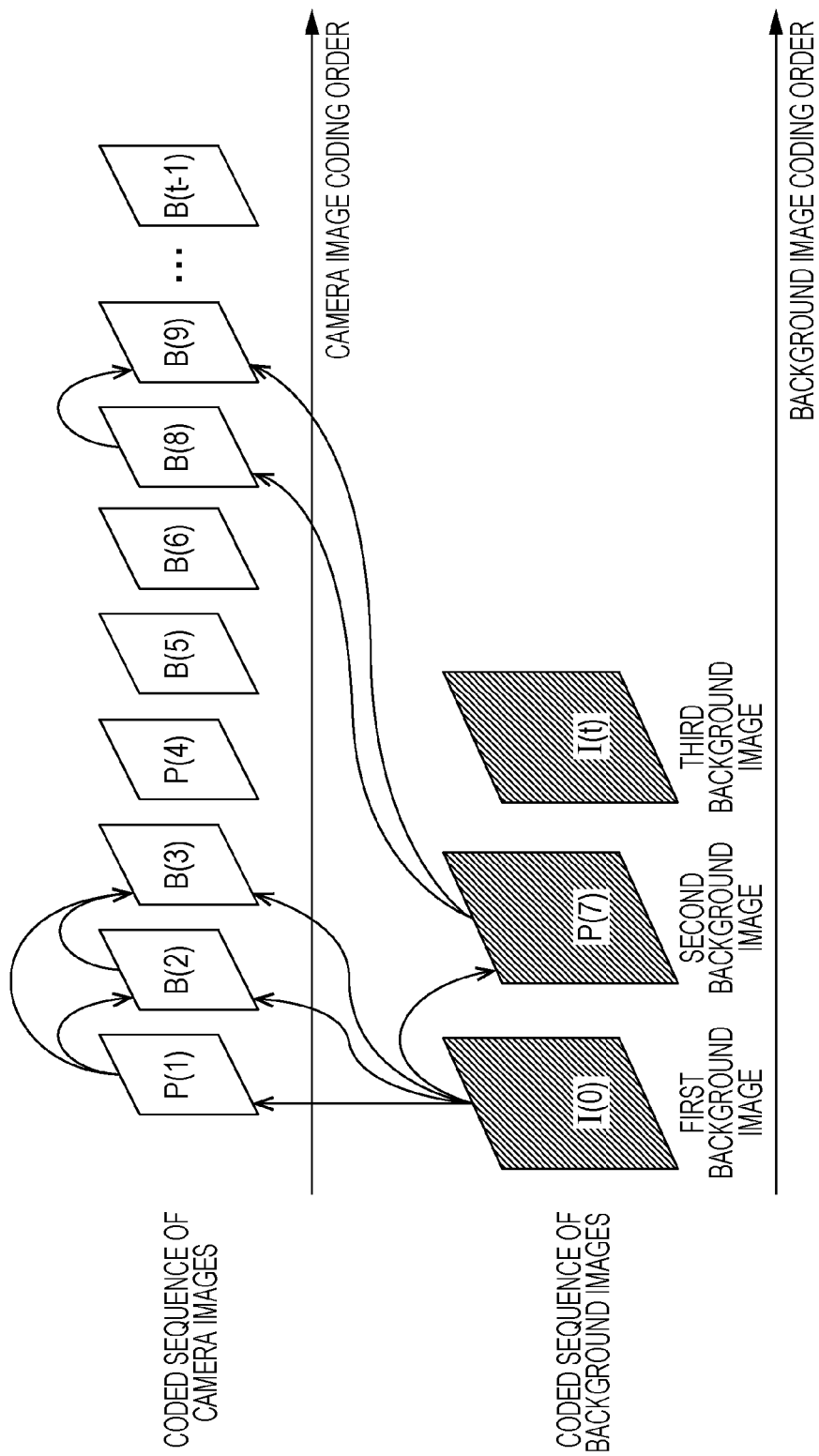
FIG. 16 is a diagram illustrating a modification of the coded sequence according to the first embodiment.

The server 20 may generate the coded sequence illustrated in FIG. 3, or may generate the coded sequences illustrated in FIG. 16. The encoder 30a may generate the coded sequence illustrated in FIG. 3, or may generate the coded sequences illustrated in FIG. 16. Further, a single coded sequence, as illustrated in FIG. 3, may be separated into a plurality of coded sequences as illustrated in FIG. 16. The server 20 or the encoder 30a may transmit a coded sequence or coded sequences to the decoder, or may store the coded sequence or coded sequences into a recording medium. Further, a plurality of coded sequences, as illustrated in FIG. 16, may be output to separate communication media, recording media, or the like.

As used herein, the term "background" refers to a subject that does not move over a certain time period. For example, a person who does not move for a while or a parking vehicle may be included in the "background".

In addition, the processes described in the first embodiment may be executed by software. The software may be, for example, downloaded and distributed. The software may also be recorded on a recording medium such as a CD-ROM and distributed. This also applies to the other embodiments disclosed herein.

Second Embodiment

Overall Configuration

Figure 17:
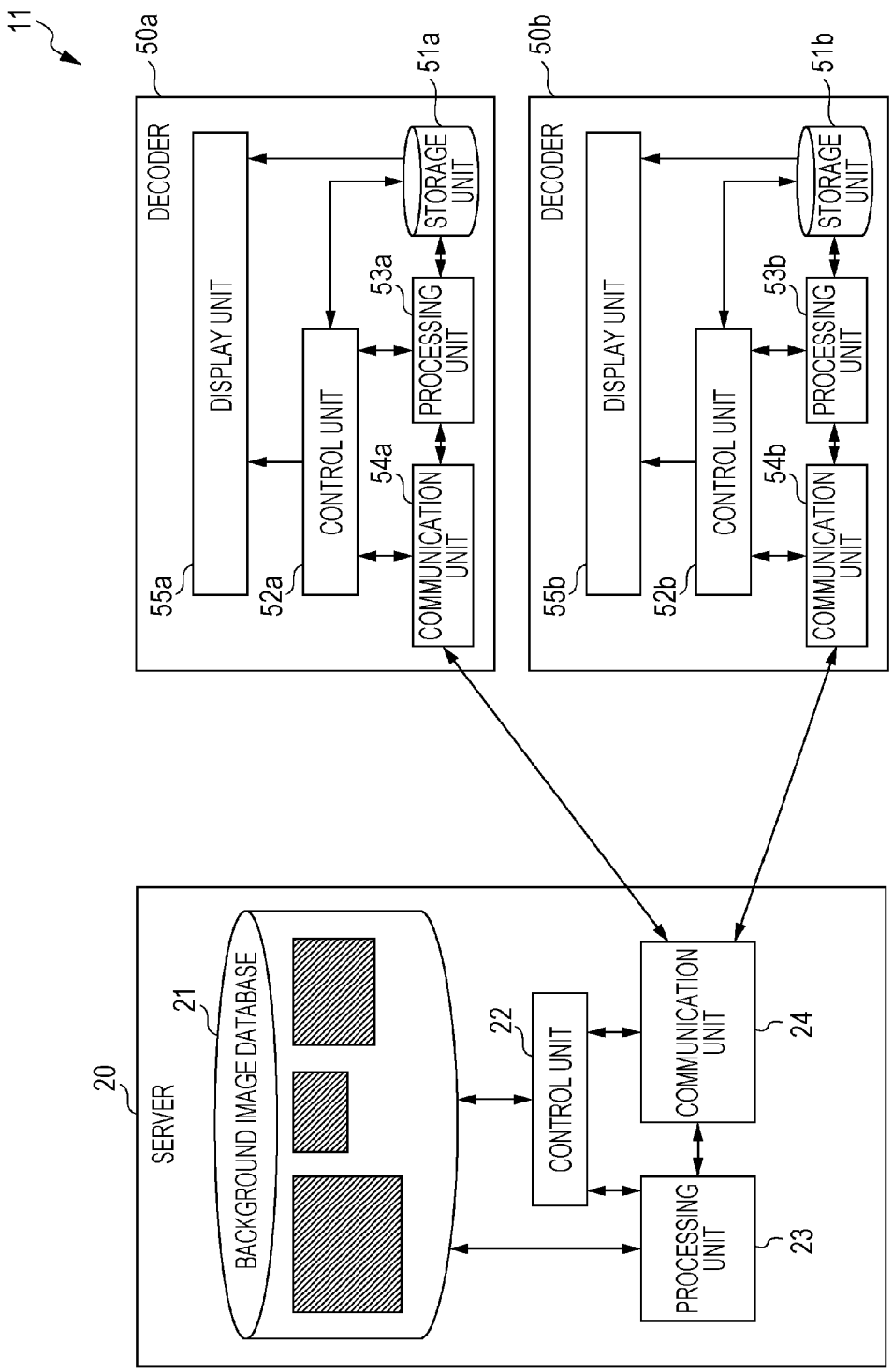
FIG. 17 is a diagram illustrating a configuration of an image processing system according to a second embodiment.

FIG. 17 is a diagram illustrating a configuration of an image processing system according to a second embodiment. An image processing system 11 illustrated in FIG. 17 includes, for example, a server 20, and decoders 50a and 50b. While FIG. 17 illustrates the two decoders 50a and 50b, one or more than two decoders may be used.

The server 20 includes a background image database 21, a control unit 22, a processing unit 23, and a communication unit 24. These elements are similar to those in the first embodiment. In the second embodiment, the communication unit 24 communicates with the decoders 50a and 50b and so forth.

The decoder 50a includes a storage unit 51a, a control unit 52a, a processing unit 53a, a communication unit 54a, and a display unit 55a. The storage unit 51a stores images such as an encoded image and a decoded image. The control unit 52a controls the operation of the individual elements of the decoder 50a. The processing unit 53a performs information processing. The operation of the decoder 50a is basically performed by the processing unit 53a. In particular, the processing unit 53a decodes an image from the server 20. The communication unit 54a communicates with the server 20.

The display unit 55a displays the decoded image. The display unit 55a may be a display device located outside the decoder 50a. For example, the control unit 52a may display the decoded image on an external display device.

The decoder 50b includes a storage unit 51b, a control unit 52b, a processing unit 53b, a communication unit 54b, and a display unit 55b. These elements are similar to the respective elements of the decoder 50a.

For example, the server 20 transmits an image encoded by using a background image in the background image database 21 to the decoder 50a. The decoder 50a decodes the encoded image, and displays the decoded image on the display unit 55a.

Here, the configuration of the decoder 50a, the operation of the decoder 50a, and the operation performed between the server 20 and the decoder 50a are mainly illustrated. The configuration of the decoder 50b, the operation of the decoder 50b, and the operation performed between the server 20 and the decoder 50b are also similar to the configuration of the decoder 50a, the operation of the decoder 50a, and the operation performed between the server 20 and the decoder 50a, respectively.

Operation (Overall Operation)

Figure 18:
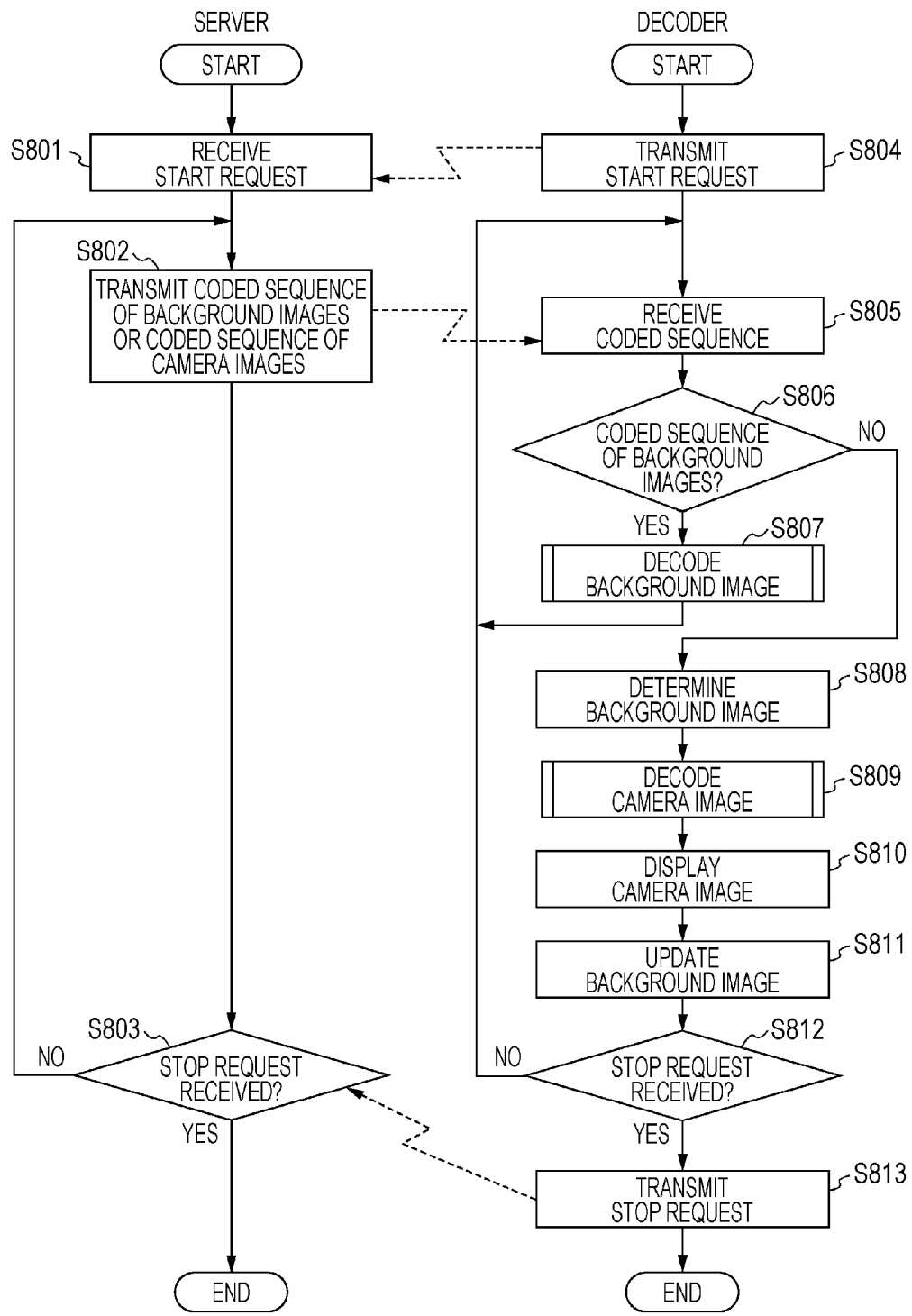
FIG. 18 is a diagram illustrating the flow of a process performed by the image processing system according to the second embodiment.

Next, the flow of the overall decoding process will be described with reference to FIG. 18. FIG. 18 is a diagram illustrating the flow of a process performed by the image processing system 11 illustrated in FIG. 17.

First, the decoder 50a transmits a request to start a decoding operation to the server 20 (S804). The server 20 receives the request to start a decoding operation (S801).

Then, the server 20 transmits a coded sequence of background images or a coded sequence of camera images to the decoder 50a (S802). The decoder 50a receives the coded sequence (S805).

Then, the decoder 50a determines whether or not the coded sequence received from the server 20 is a coded sequence of background images (S806). If the coded sequence received from the server 20 is a coded sequence of background images (YES in S806), the decoder 50a decodes a background image included in the coded sequence, which has been encoded (S807). The background images are images used only for the reference from other images, and are not displayed.

If the coded sequence received from the server 20 is not a coded sequence of background images (NO in S806), the coded sequence received from the server 20 is a coded sequence of camera images. In this case, the decoder 50a determines a background image to be used for the decoding of a camera image (S808). Specifically, the decoder 50a determines a background image by using time-of-day information on a camera image to be decoded. For example, the decoder 50a determines a first background image as the background image to be used for the camera image acquired at time t, and determines a second background image as the background image to be used for the camera image acquired at time t+1.

Then, the decoder 50a decodes an encoded camera image included in the coded sequence (S809). Then, the decoder 50a displays the decoded camera image (S810).

Then, the decoder 50a updates the used background image (S811). Here, the background image is updated using the camera image decoded in the decoding process (S809). In some cases, for example, a portion of the background may be hidden by a moving object included in the background image, and the background image may not include all of the background. Thus, the decoder 50a updates the background image by using the camera image.

Specifically, for example, a moving object moves to different locations rather than staying at a single location. It is thus possible to identify the pixel values of the background by using the average values of pixels in a plurality of camera images. Accordingly, the decoder 50a calculates, for each individual pixel, an average of the pixel values between the used background image and the decoded camera image. Then, the decoder 50a updates the background image by using the averages calculated for the individual pixels, enabling pseudo-removal of a moving object from the background image.

The background changes with time. Thus, the background image may be updated so as to keep track of the change. For example, the background image may be updated in accordance with the background that becomes darker with the passage of time at night. Here, the background image may also be updated using the decoded camera image. Specifically, as described above, the averages calculated for the individual pixels may be used for the pixel values of the background image.

The background image update process is performed in a similar way to that for the encoder 30a or the like. This makes an updated background image obtained on the encoding side and an updated background image obtained on the decoding side match, resulting in the mismatch between reference images for the encoding side and decoding side being suppressed.

The decoder 50a repeatedly performs the process described above (S805 to S811) until a stop request to stop the decoding operation is received from the user (NO in S812). Upon receipt of the stop request (YES in S812), the decoder 50a transmits the stop request to the server 20, and the process ends (S813). The server 20 repeatedly performs the process for transmitting a coded sequence of background images or a coded sequence of camera images (S802) until a stop request to stop the decoding operation is received from the decoder 50a (NO in S803). Upon receipt of the stop request (YES in S803), the server 20 ends the process.

Decoding Configuration

Figure 19:
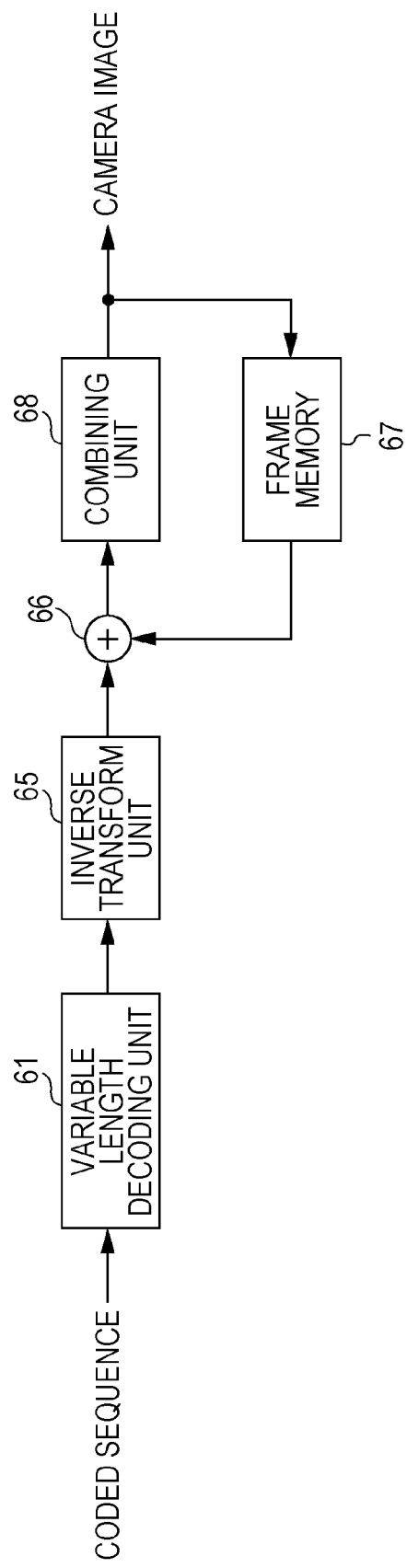
FIG. 19 is a diagram mainly illustrating a configuration of a processing unit of a decoder according to the second embodiment.

FIG. 19 is a diagram mainly illustrating a configuration of the processing unit 53a of the decoder 50a illustrated in FIG. 17. The processing unit 53a includes a variable length decoding unit 61, an inverse transform unit 65, an addition unit 66, a frame memory 67, and a combining unit 68. The frame memory 67 may be included in the storage unit 51a.

The variable length decoding unit 61 performs variable length decoding on a coded sequence, and outputs coefficients. The inverse transform unit 65 performs an inverse frequency transform on the coefficients, and outputs a residual block indicating a difference between the block being processed and a prediction block. The addition unit 66 adds the residual block and the prediction block together to reconfigure the block being processed to generate a decoded block. The combining unit 68 combines a plurality of decoded blocks to obtain a camera image, and outputs the camera image. The frame memory 67 stores the camera image output from the combining unit 68.

Operation (Decoding)

Figure 20:
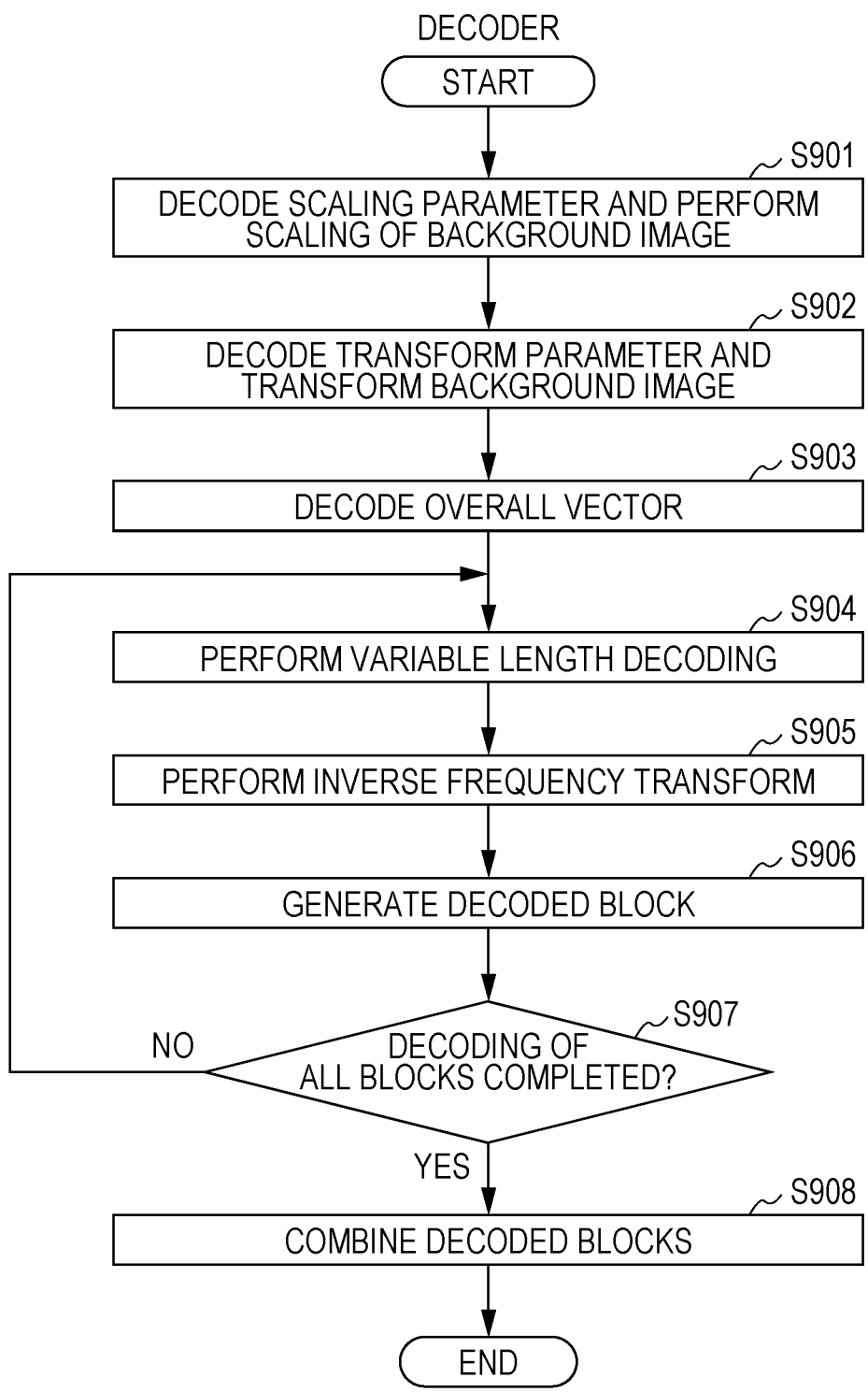
FIG. 20 is a diagram illustrating the flow of a decoding process according to the second embodiment.

Next, the flow of the camera image decoding process (S809) performed by the decoder 50a will be described with reference to FIG. 20. FIG. 20 is a diagram illustrating the flow of the decoding process (S809) illustrated in FIG. 18.

First, the decoder 50a decodes a scaling parameter, and performs scaling of a background image in accordance with the decoded scaling parameter (S901). For example, the decoder 50a performs scaling of the background image in the manner illustrated in FIG. 11 to obtain a background image subjected to scaling.

Then, the decoder 50a decodes a transform parameter, and transforms the background image in accordance with the decoded transform parameter (S902). For example, the decoder 50a transforms the background image in the manner illustrated in FIG. 12, and obtains the transformed background image.

Then, the decoder 50a decodes an overall vector, and obtains the overall vector illustrated in FIG. 13 (S903).

Then, the variable length decoding unit 61 in the decoder 50a performs variable length decoding on the coded sequence (S904). The inverse transform unit 65 performs an inverse frequency transform on coefficients obtained as a result of variable length decoding (S905). The addition unit 66 adds a block obtained as a result of the inverse frequency transform and a prediction block together to generate a decoded block (S906).

The decoder 50a repeatedly performs the process described above (S904 to S906) until the decoding of all the blocks is completed (NO in S907). After the decoding of all the blocks is completed (YES in S907), the combining unit 68 combines all the blocks to obtain a decoded image (S908).

When a prediction block is generated, a background image, a decoded image (reference image), or a decoded block in the same image is referred to. Further, similarly to the first embodiment, the decoder 50a uses the overall vector as a base. The decoder 50a uses a vector obtained by adding the overall vector to a decoded motion vector as a vector for the generation of a prediction block (see FIG. 13).

Advantages

In the second embodiment, as described above, the image processing system 11 uses a wide-range and high-resolution background image. Accordingly, the image processing system 11 can decode an image encoded with high coding efficiency. In particular, the image processing system 11 can appropriately decode an image obtained through a pan, tilt, or zoom operation.

In addition, by updating a background image by using a decoded camera image, the image processing system 11 can update the background image in accordance with the current camera image. Thus, the image processing system 11 can make the background image close to the image to be decoded, and can improve the accuracy of prediction.

For example, in a case where a background image includes a moving object, a portion of the background is hidden. Accordingly, not all the background may be included in a single background image. The image processing system 11 updates the background image by using a plurality of camera images, enabling a background image not including a portion of the background to be compensated for by a camera image including the portion of the background. Furthermore, the background may change with time. For example, in a case where the background becomes darker with the passage of time at night, the background image may be updated.

In addition, by updating a background image, the image processing system 11 can rapidly keep track of a change in the background in a case where, for example, the layout of chairs changes. By updating a background image by using a decoded image, furthermore, the image processing system 11 can reduce the number of times background images are transmitted and received between the server 20 and the decoder 50*a*.

In the image processing system 11, the background image update process may be shared between the encoder (for example, the encoder 30*a* in the first embodiment) and the decoder 50*a*. Thus, an updated background image may not necessarily be included in a coded sequence. Accordingly, the overall amount of code is reduced.

In addition, the decoder 50*a* updates a background image, which may eliminate the need for the server 20 to hold a large number of various background images. Accordingly, the capacity of the memory (storage unit) in the server 20 can be reduced.

In addition, the image processing system 11 transforms the background image in the manner illustrated in FIG. 12, and uses the transformed background image as a reference image. This makes the background image close to the image to be decoded, and reduces prediction errors. This can also reduce the capacity of the frame memory 67 to store background images.

As a result of the preparation of a large number of background images, prediction errors may be reduced without each background image being transformed. In this case, the frame memory 67 requires a large capacity. The amount of processing involved in the selection of a background image is also large. Additionally, background images are inserted into a coded sequence in accordance with switching. Thus, the amount of code is large, and the amount of communication is also large.

By transforming a background image, it is possible to reduce the capacity of the frame memory 67, the amount of processing, the amount of communication, and the amount of code.

In addition, saving background images to the server 20 may result in the frame memory 67 of the decoder 50*a* not requiring a large capacity. That is, the decoders 50*a* and 50*b* can share background images on the server 20.

In addition, the server 20 transmits a plurality of background images to the decoder 50*a* in advance. The decoder 50*a* switches the background image to be used among the plurality of background images transmitted in advance from the server 20 in accordance with the time of day. Accordingly, the amount of communication between the server 20 and the decoder 50*a* is reduced during the decoding operation, and the communication load is distributed.

In the determination process (S806), the decoder 50*a* determines whether the coded sequence received from the server 20 is a coded sequence of background images or a coded sequence of camera images. In the determination process, the decoder 50*a* may use a non-display flag indicating whether or not to display a decoded image. The non-display flag is used when, for example, a reference image is deleted during the editing of a moving image or the like and an image is not correctly decoded.

In the second embodiment, the non-display flag may designate an image used only for reference, such as a background image, as an image not to be displayed. The decoder 50*a* may determine that an image designated as an image not to be displayed is a background image. The image processing system 11 uses an existing non-display flag instead of using any additional flag, enabling suppression of an increase in the amount of code. It will be understood that the image processing system 11 may use a new flag indicating a background image.

In addition, the decoder 50*a* performs scaling of a background image so that, as illustrated in FIG. 11, the size of the subject in the background image matches the size of the subject in the image to be encoded (the image to be decoded). The decoder 50*a* may also vary the scaling ratio so as to match the precision allowed for motion vectors. An example will be described with reference to FIG. 14 and FIG. 15.

FIG. 14 is a diagram illustrating a modification of the scaling process illustrated in FIG. 11. Specifically, FIG. 14 illustrates an example of the scaling process in a case where up to quarter-pixel precision is allowed for motion vectors, as specified in HEVC (see Non-Patent Literature 1). In this case, the decoder 50*a* performs scaling of a background image so that the subject in the background image has vertical and horizontal sizes four times larger than those of the subject in the image to be encoded (the image to be decoded).

Specifically, when the second tree from the right in the image to be encoded (the image to be decoded) illustrated in FIG. 14 has a width of 384 pixels, scaling is performed so that, as a result of scaling, the same subject in the background image, i.e., the second tree from the right, has a width of 1536 pixels (384 pixels×4). In the prediction block generation process, the decoder 50*a* refers to the individual pixels in the background image at intervals of four pixels.

FIG. 15 is a diagram illustrating integer pixel precision and fractional pixel precision in the second embodiment. FIG. 15 illustrates individual pixels in a background image subjected to scaling. FIG. 15 further illustrates pixels to be referred to by integer-pixel-precision motion vectors and pixels to be referred to by fractional-pixel-precision motion vectors.

In HEVC (see Non-Patent Literature 1), when a fractional-pixel-precision motion vector is used, an integer-pixel-precision pixel value is subjected to a filtering process to estimate a fractional-pixel-precision pixel value. This method causes an error between the estimated pixel value and the original pixel value.

In the example illustrated in FIG. 14, by contrast, the decoder 50*a* generates a fractional-pixel-precision pixel value by using a high-resolution background image generated from a camera image obtained through a zoom-in operation. Thus, an error is less likely to occur between the generated pixel value and the original pixel value. The decoder 50*a* can therefore reduce prediction errors.

Note that the decoder 50*a* may switch between the scaling process illustrated in FIG. 11 and the scaling process illustrated in FIG. 14. For example, the decoder 50*a* may use the scaling process illustrated in FIG. 11 so that a smaller image size than the image size used in the scaling process illustrated in FIG. 14 is used, in order to reduce the capacity of the frame memory 67. The decoder 50*a* may use the scaling process illustrated in FIG. 14 so that prediction accuracy with fractional pixel precision is increased, in order to reduce prediction errors (in order to improve coding efficiency).

FIG. 3 illustrates an example configuration of a coded sequence including images. In FIG. 3, a first background image, a second background image, and a third background image may be the same. For example, even if the video is reproduced from the middle and the decoding operation starts from the middle of the coded sequence, a background image that is a long-term reference image may be periodically inserted into the coded sequence so that a decoded image is correctly displayed. Accordingly, for example, when an image after I(t) is displayed, the decoder 50a can start the decoding operation from I(t). Thus, the number of decoding processing steps is reduced, and the display delay is also suppressed.

In FIG. 3, furthermore, a single coded sequence includes both camera images and background images. Alternatively, as in FIG. 16, a coded sequence including camera images and a coded sequence including background images may be separately generated. This makes image sizes uniform in a single coded sequence. Thus, the encoding process and the decoding process are simplified. In addition, the decoder 50a can separately obtain a coded sequence of background images before decoding a coded sequence of camera images. Accordingly, the communication load for the delivery of coded sequences can be distributed.

In the following description, encoded background images are included in a coded sequence. Background images may not necessarily be included in a coded sequence. That is, a coded sequence may include only encoded camera images. In this case, background images are separately transmitted to the decoder 50a. In the transmission of background images, a background image encoded with high efficiency may be transmitted, or the pixel values of a background image may be transmitted.

The decoder 50a may obtain the coded sequence illustrated in FIG. 3 or the coded sequences illustrated in FIG. 16 from the server 20. The decoder 50a may obtain the coded sequence illustrated in FIG. 3 or the coded sequences illustrated in FIG. 16 from an encoder (such as the encoder 30a). The decoder 50a may also obtain the coded sequence illustrated in FIG. 3 or the coded sequences illustrated in FIG. 16 from a recording medium. The decoder 50a may obtain a plurality of coded sequences, as illustrated in FIG. 16, from separate communication media, recording media, or the like.

As used herein, the term "background" refers to a subject that does not move over a certain time period. For example, a person who does not move for a while or a parking vehicle may be included in the "background".

Third Embodiment

In a third embodiment, a characteristic configuration and a characteristic operation of the image processing system illustrated in the first embodiment and the second embodiment are illustrated. The configuration and operation illustrated in the third embodiment basically correspond to the configuration and operation illustrated in the first embodiment and the second embodiment.

Figure 21:
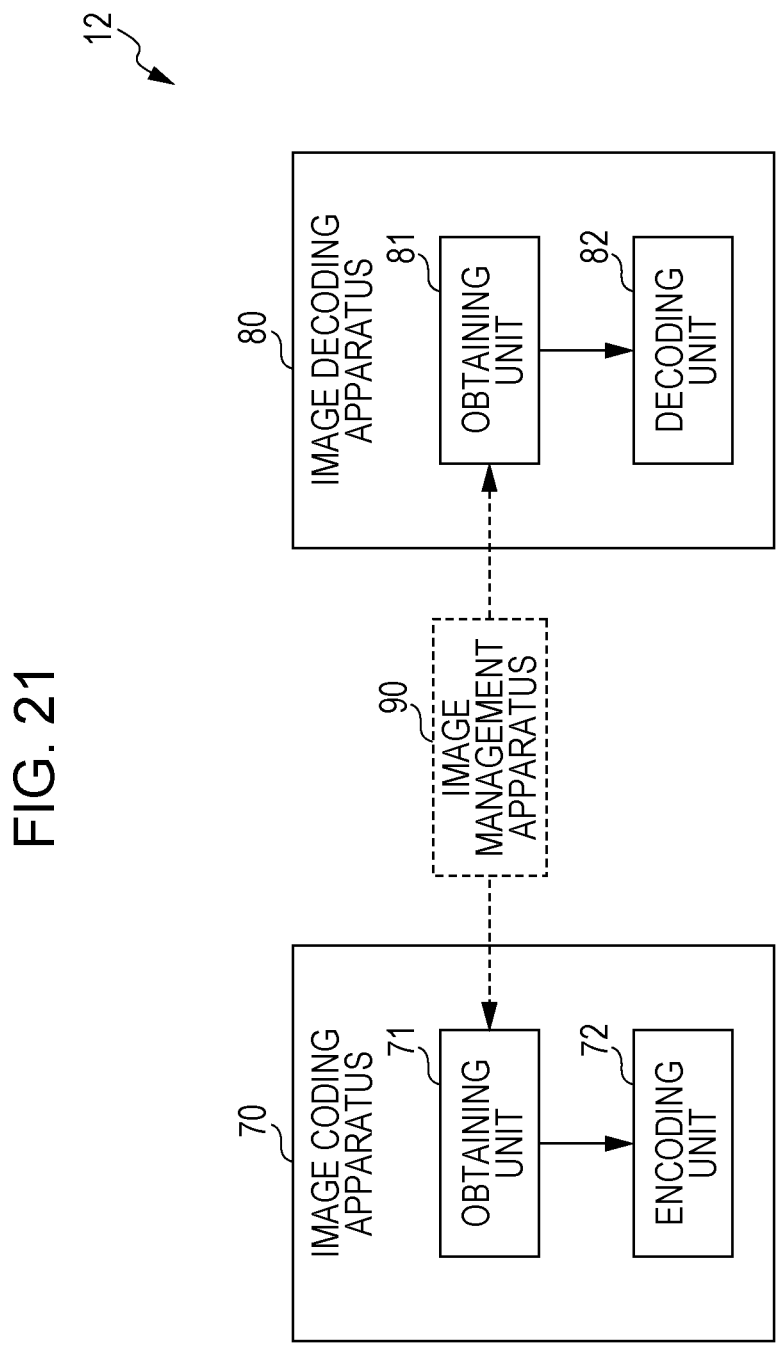
FIG. 21 is a diagram illustrating a configuration of an image processing system according to a third embodiment.

FIG. 21 is a diagram illustrating a configuration of an image processing system according to the third embodiment. An image processing system 12 illustrated in FIG. 21 includes an image coding apparatus 70, an image decoding apparatus 80, and an image management apparatus 90. The image coding apparatus 70 includes an obtaining unit 71 and an encoding unit 72. The image decoding apparatus 80 includes an obtaining unit 81 and a decoding unit 82.

The image coding apparatus 70 encodes a plurality of to-be-displayed images forming video by using inter prediction. The obtaining unit 71 obtains a reference-specific image. The encoding unit 72 refers to the reference-specific image as a reference image for inter prediction, and encodes one or more to-be-displayed images among the plurality of to-be-displayed images forming the video.

The reference-specific image is an image that is different from a plurality of to-be-displayed images or different from a plurality of reconfigured images of the plurality of to-be-displayed images, and is an image used as an image that is specific to reference for inter prediction. The reference-specific image is, for example, a background image illustrated in the first embodiment and the second embodiment. The to-be-displayed images are, for example, camera images illustrated in the first embodiment and the second embodiment.

The image decoding apparatus 80 decodes a plurality of to-be-displayed images forming video by using inter prediction. The obtaining unit 81 obtains a reference-specific image. The decoding unit 82 refers to the reference-specific image as a reference image for inter prediction, and decodes one or more to-be-displayed images among the plurality of to-be-displayed images forming the video.

The image management apparatus 90 is an arbitrary element of the image processing system 12. The image management apparatus 90 obtains a reference-specific image. The obtaining unit 71 of the image coding apparatus 70 may obtain, from the image management apparatus 90, the reference-specific image obtained by the image management apparatus 90. Similarly, the obtaining unit 81 of the image decoding apparatus 80 may obtain, from the image management apparatus 90, the reference-specific image obtained by the image management apparatus 90.

The image coding apparatus 70 corresponds to the encoder 30a illustrated in the first embodiment or the like. The obtaining unit 71 and the encoding unit 72 of the image coding apparatus 70 correspond to the processing unit 33a illustrated in the first embodiment or the like. The image decoding apparatus 80 corresponds to the decoder 50a illustrated in the second embodiment or the like. The obtaining unit 81 and the decoding unit 82 of the image decoding apparatus 80 correspond to the processing unit 53a or the like illustrated in the second embodiment. The image management apparatus 90 corresponds to the server 20 illustrated in the first embodiment and the second embodiment.

Figure 22:
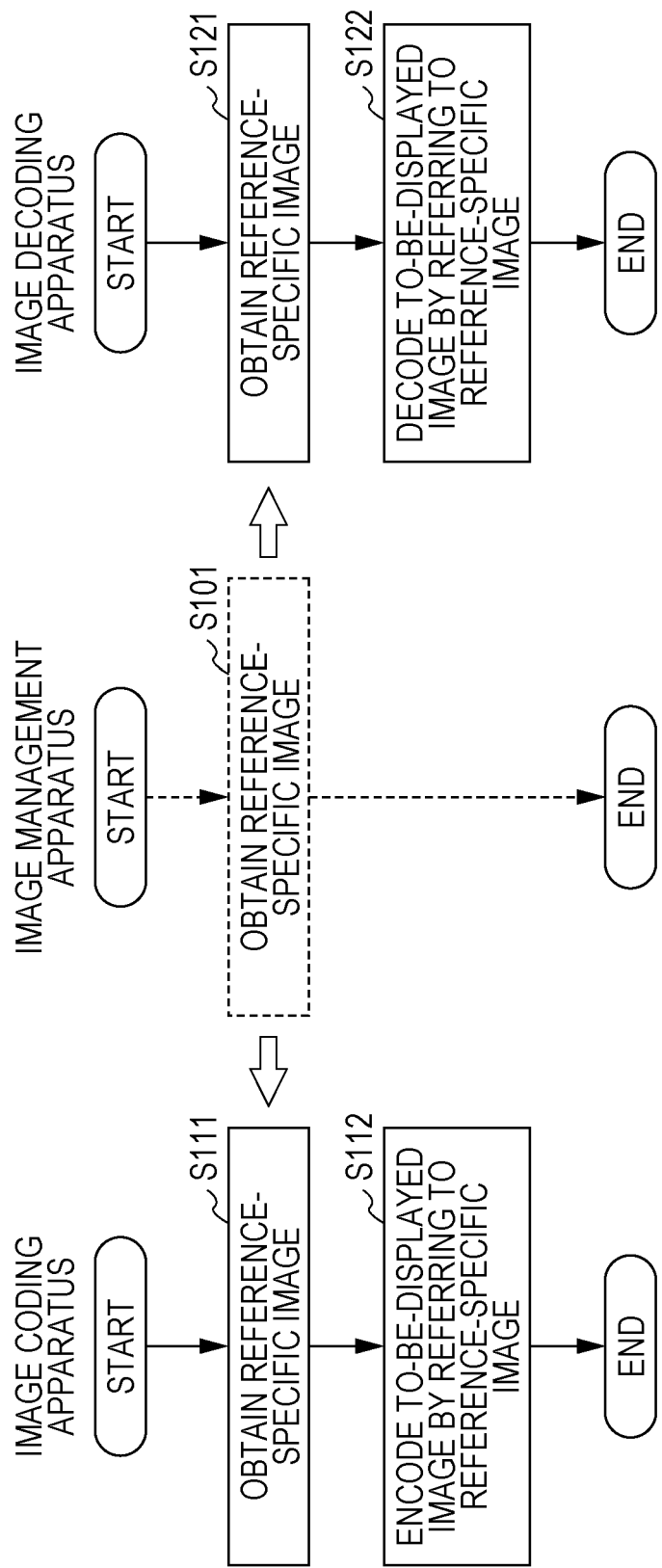
FIG. 22 is a diagram illustrating the process flow of the operation of the image processing system according to the third embodiment.

FIG. 22 is a diagram illustrating the process flow of the operation of the image processing system 12 illustrated in FIG. 21.

In the image coding apparatus 70, first, the obtaining unit 71 obtains a reference-specific image (S111). The obtaining unit 71 may obtain a reference-specific image from the image management apparatus 90. In this case, the image management apparatus 90 initially obtains a reference-specific image (S101). Then, the obtaining unit 71 obtains, from the image management apparatus 90, the reference-specific image obtained by the image management apparatus 90.

Then, the encoding unit 72 in the image coding apparatus 70 encodes one or more to-be-displayed images among a plurality of to-be-displayed images forming video, by referring to the reference-specific image as a reference image for inter prediction (S112).

In the image decoding apparatus 80, first, the obtaining unit 81 obtains a reference-specific image (S121). The obtaining unit 81 may obtain a reference-specific image from the image management apparatus 90. In this case, the image management apparatus 90 initially obtains a reference-specific image (S101). Then, the obtaining unit 81 obtains, from the image management apparatus 90, the reference-specific image obtained by the image management apparatus 90.

Then, the decoding unit 82 in the image decoding apparatus 80 decodes one or more to-be-displayed images among a plurality of to-be-displayed images forming video, by referring to the reference-specific image as a reference image for inter prediction (S122).

Thus, the image coding apparatus 70 and the image decoding apparatus 80 can refer to a reference-specific image different from a to-be-displayed image or the like for inter prediction. Accordingly, the image coding apparatus 70 and the image decoding apparatus 80 can refer to an appropriate reference image for inter prediction.

The reference-specific image may have a larger size than each of the plurality of to-be-displayed images. That is, the reference-specific image may have a larger number of pixels than the number of pixels in each of the plurality of to-be-displayed images.

The reference-specific image may be an image formed by integrating a plurality of captured images. Here, each captured image is an image obtained through an image capturing operation. The plurality of captured images may be obtained through pan, tilt, and zoom operations, or may be obtained from a plurality of cameras. The reference-specific image may be an image obtained by integration of a plurality of captured images using image capture information on each captured image or feature points in each captured image.

The obtaining unit 71 may obtain a reference-specific image before the initial to-be-displayed image in the coding order among the plurality of to-be-displayed images forming the video is encoded. Similarly, the obtaining unit 81 may obtain a reference-specific image before the initial to-be-displayed image in the decoding order among the plurality of to-be-displayed images forming the video is decoded.

The obtaining units 71 and 81 may obtain part or all of a reference-specific image by receiving part or all of a reference-specific image from the image management apparatus 90. The encoding unit 72 may encode one or more to-be-displayed images by referring to the reference-specific image, part or all of which has been obtained. The decoding unit 82 may decode one or more to-be-displayed images by referring to the reference-specific image, part or all of which has been obtained.

The obtaining units 71 and 81 may obtain, as a reference-specific image, each of a plurality of reference-specific images including a first reference-specific image corresponding to a first image capture condition and a second reference-specific image corresponding to a second image capture condition. The obtaining units 71 and 81 may selectively obtain a plurality of reference-specific images in accordance with the image capture condition of the video. Examples of the image capture condition include the time of day at which the video was captured, and the weather condition or season in which the video was captured.

For example, if the image capture condition of the video is the first image capture condition, the obtaining units 71 and 81 may obtain the first reference-specific image. In this case, the encoding unit 72 may encode one or more to-be-displayed images by referring to the first reference-specific image as a reference-specific image. The decoding unit 82 may decode one or more to-be-displayed images by referring to the first reference-specific image as a reference-specific image.

For example, if the image capture condition of the video is the second image capture condition, the obtaining units 71 and 81 may obtain the second reference-specific image. In this case, the encoding unit 72 may encode one or more to-be-displayed images by referring to the second reference-specific image as a reference-specific image. The decoding unit 82 may decode one or more to-be-displayed images by referring to the second reference-specific image as a reference-specific image.

The obtaining units 71 and 81 may update the reference-specific image by using one or more reconfigured images among a plurality of reconfigured images of the plurality of to-be-displayed images. The encoding unit 72 may encode one or more to-be-displayed images by referring to the updated reference-specific image. The decoding unit 82 may decode one or more to-be-displayed images by referring to the updated reference-specific image.

When encoding an image to be encoded among the one or more to-be-displayed images, the encoding unit 72 may transform the reference-specific image so that the reference-specific image corresponds to the image to be encoded, and may refer to the transformed reference-specific image as a reference image. When decoding an image to be decoded among the one or more to-be-displayed images, the decoding unit 82 may transform the reference-specific image so that the reference-specific image corresponds to the image to be decoded, and may refer to the transformed reference-specific image as a reference image. The reference-specific image may be transformed using projective transformation, luminance transformation, or scaling.

The encoding unit 72 may perform scaling of the reference-specific image so that the size of the subject in the reference-specific image corresponds to the size of the subject in the image to be encoded, and may refer to the reference-specific image subjected to scaling as a reference image. The decoding unit 82 may perform scaling of the reference-specific image so that the size of the subject in the reference-specific image corresponds to the size of the subject in the image to be decoded, and may refer to the reference-specific image subjected to scaling as a reference image.

The encoding unit 72 may perform scaling of the reference-specific image by using image capture information on each of the reference-specific image and the image to be encoded or by using the positions of feature points in each of the reference-specific image and the image to be encoded. The decoding unit 82 may perform scaling of the reference-specific image by using image capture information on each of the reference-specific image and the image to be decoded or by using the positions of feature points in each of the reference-specific image and the image to be decoded. The decoding unit 82 may estimate the positions of feature points in the image to be decoded from a decoded image.

The encoding unit 72 and the decoding unit 82 may perform scaling of the reference-specific image in accordance with the precision of motion vectors used in inter prediction.

The encoding unit 72 may encode a transform parameter. The decoding unit 82 may decode a transform parameter. The transform parameter is a parameter used to transform a reference-specific image. The transform parameter may include a scaling ratio.

The encoding unit 72 may encode an overall vector. The decoding unit 82 may decode an overall vector. The overall vector is a vector indicating the position of an area in the reference-specific image which corresponds to the image to be encoded among one or more to-be-displayed images.

The encoding unit 72 may calculate the overall vector by using image capture information on each of the reference-specific image and the image to be encoded or by using the positions of feature points in each of the reference-specific image and the image to be encoded, and may encode the calculated overall vector. The decoding unit 82 may decode the overall vector calculated and encoded using the image capture information or the positions of the feature points.

The encoding unit 72 may encode one or more to-be-displayed images, and may generate a coded sequence including the one or more to-be-displayed images, separately from a coded sequence including a reference-specific image. The decoding unit 82 may decode the one or more to-be-displayed images included in the coded sequence different from the coded sequence including the reference-specific image.

The encoding unit 72 may encode the reference-specific image as a non-display image. The decoding unit 82 may decode the reference-specific image encoded as a non-display image. In other words, the decoding unit 82 may decode the non-display image as a reference-specific image.

The image coding apparatus 70, the image decoding apparatus 80, and the image management apparatus 90 may be connected to one another via a communication network.

The image processing system 12 and the image management apparatus 90, described above, may be represented as an image distribution system and an image distribution apparatus, respectively. The image management apparatus 90 may be included in the image coding apparatus 70, or may be included in the image decoding apparatus 80. Further, the image processing system 12 and the like described above are suitable for use in, in particular, a system that processes video with small changes in the background, and is suitable for use in, for example, a security camera system or a fixed-point observation camera system.

In each of the embodiments described above, individual elements are implemented by circuits each including, for example, a microprocessing unit (MPU) and a memory. Processes executed by the individual elements may be executed by software (program). The software is recorded on a recording medium such as a ROM. The software may be, for example, downloaded and distributed, or may be recorded on a recording medium such as a CD-ROM and distributed. It will be understood that individual elements may also be implemented by hardware (dedicated circuitry).

That is, in each of the embodiments described above, individual elements may be implemented with dedicated hardware, or may be implemented by execution of a software program suitable for the elements. The individual elements may also be implemented as a result of a program execution unit such as a central processing unit (CPU) or a processor reading and executing a software program recorded on a recording medium such as a hard disk or a semiconductor memory.

In other words, the image coding apparatus, the image decoding apparatus, and the like include processing circuitry and storage electrically connected to the processing circuitry (i.e., accessible by the processing circuitry). The processing circuitry includes at least either dedicated hardware or the program execution unit, and executes processing using the storage. In a case where the processing circuitry includes the program execution unit, the storage stores a software program to be executed by the program execution unit.

The software for implementing the image coding apparatus, the image decoding apparatus, and the like according to the embodiments described above is a program as follows.

The program causes a computer to execute an image coding method which encodes a plurality of to-be-displayed images forming video by using inter prediction, the image coding method including an obtaining step of obtaining a reference-specific image, the reference-specific image being an image different from the plurality of to-be-displayed images or different from a plurality of reconfigured images obtained by reconfiguration of the plurality of to-be-displayed images and being an image used as an image that is specific to reference for the inter prediction; and an encoding step of encoding one or more to-be-displayed images among the plurality of to-be-displayed images by referring to the reference-specific image as a reference image for the inter prediction.

The program may also cause a computer to execute an image decoding method which decodes a plurality of to-be-displayed images forming video by using inter prediction, the image decoding method including an obtaining step of obtaining a reference-specific image, the reference-specific image being an image different from the plurality of to-be-displayed images or different from a plurality of reconfigured images obtained by reconfiguration of the plurality of to-be-displayed images and being an image used as an image that is specific to reference for the inter prediction; and a decoding step of decoding one or more to-be-displayed images among the plurality of to-be-displayed images by referring to the reference-specific image as a reference image for the inter prediction.

Furthermore, as described above, the individual elements may be circuits. The circuits may form a single circuit as a whole, or may be separate circuits. The individual elements may be implemented with a general-purpose processor, or may be implemented with dedicated processors.

Furthermore, a process executed by a specific element may be executed by another element. The order in which processes are executed may be changed, or a plurality of processes may be executed in parallel. An image coding/decoding apparatus may include an image coding apparatus and an image decoding apparatus.

Furthermore, a process explained in each of the embodiments described above may be executed as a centralized process executable by a single apparatus (system), or may be executed as a distributed process executable by a plurality of apparatuses. A single computer or a plurality of computers may execute the program described above. That is, the program may be executed using a centralized process or a distributed process.

While an image coding apparatus and an image decoding apparatus according to one or a plurality of aspects have been described with respect to some embodiments of the present disclosure, the present disclosure is not limited to such embodiments. Embodiments to which various modifications conceivable by a person skilled in the art are made and embodiments that are made by using combinations of elements in different embodiments may also fall within the scope of the one or plurality of aspects so long as such embodiments do not depart from the spirit of the present disclosure.

Fourth Embodiment

The processes described in each of the first to third embodiments above can be implemented easily in a stand-alone computer system by recording a program for implementing the configuration of a video coding method (image coding method) or video decoding method (image decoding method) described in the embodiment on a storage medium. The storage medium may be any given type of medium capable of storing the program, such as a magnetic disk, an optical disc, a magneto-optical disk, an integrated circuit (IC) card, or a semiconductor memory.

Now, exemplary applications of the video coding method (image coding method) or the video decoding method (image decoding method) described in each of the first to third embodiments and systems using them will be further described. The systems include an image coding/decoding apparatus which includes an image coding apparatus that employs the image coding method and an image decoding apparatus that employs the image decoding method. Other configurations of the systems can be changed as appropriate in accordance with the circumstances.

Figure 23:
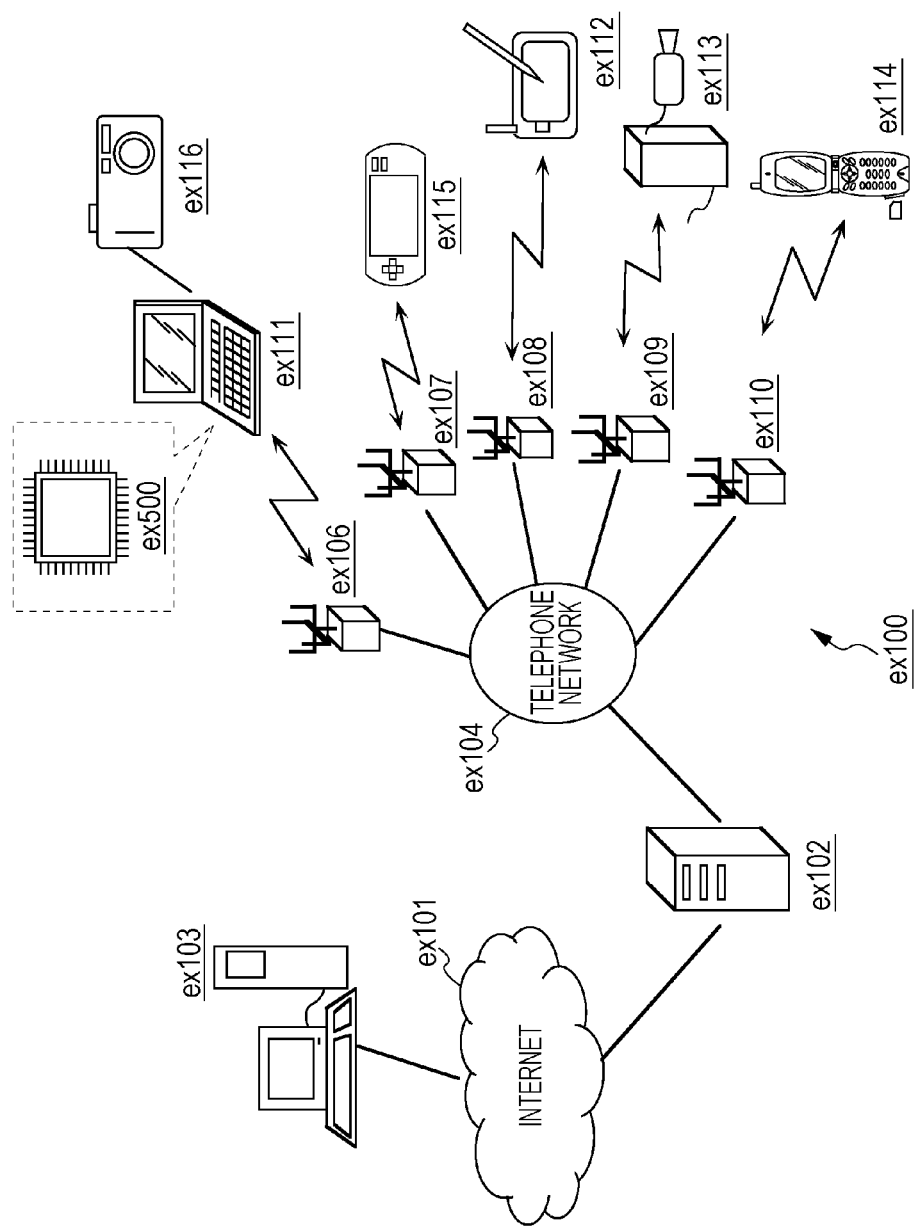
FIG. 23 is a diagram illustrating the overall configuration of a content providing system that implements content distribution services.

FIG. 23 is a diagram illustrating an overall configuration of a content providing system ex100 that implements content distribution services. An area in which communication services are provided is divided into cells of a desired size. Base stations ex106, ex107, ex108, ex109, and ex110, which are fixed wireless stations, are installed in the respective cells.

In this content providing system ex100, various devices, such as a computer ex111, a personal digital assistant (PDA) ex112, a camera ex113, a mobile phone ex114, and a game machine ex115, are connected to Internet ex101 via an Internet service provider ex102, a telephone network ex104, and the base stations ex106 to ex110.

Note that the configuration of the content providing system ex100 is not limited to the configuration illustrated in FIG. 23, and any given combination of the elements may be connected. Also, the individual devices may be directly connected to the telephone network ex104 instead of via the base stations ex106 to ex110 which are fixed wireless stations. Alternatively, the individual devices may be directly interconnected via near field communication or the like.

The camera ex113 is a device capable of capturing moving images, such as a digital camcorder. A camera ex116 is a device capable of capturing still images and moving images, such as a digital camera. Also, the mobile phone ex114 may be any of a mobile phone based on the GSM (registered trademark) (Global System for Mobile Communications) scheme, CDMA (Code Division Multiple Access) scheme, W-CDMA (Wideband-Code Division Multiple Access) scheme, LTE (Long Term Evolution) scheme, or HSPA (High Speed Packet Access) scheme; a PHS (Personal Handyphone System); and so forth.

In the content providing system ex100, the camera ex113 or the like is connected to a streaming server ex103 via the base station ex109 and the telephone network ex104. In this way, live streaming is implemented. During live streaming, the coding process is performed on content (for example, video of a music event) obtained by the user using the camera ex113 in a manner as described in each of the above-described embodiments (that is, the camera ex113 functions as an image coding apparatus according to one aspect of the present disclosure) and the resulting content is transmitted to the streaming server ex103. The streaming server ex103 in turn distributes the received content as a stream to a client that has made a request. Examples of the client include the computer ex111, the PDA ex112, the camera ex113, the mobile phone ex114, and the game machine ex115 capable of decoding the data that has undergone the coding process. Each device that has received the distributed data performs the decoding process on the received data to reproduce the data (that is, the device functions as an image decoding apparatus according to one aspect of the present disclosure).

Note that the coding process may be performed on the obtained data by the camera ex113, by the streaming server ex103 that performs a data transmission process, or by both of them on a processing-sharing basis. Similarly, the decoding process may be performed on the distributed data by the client, by the streaming server ex103, or by both of them on a processing-sharing basis. Also, in addition to still and/or moving image data obtained by the camera ex113, still and/or moving image data obtained by the camera ex116 may be transmitted to the streaming server ex103 via the computer ex111. In this case, the coding process may be performed by any of the camera ex116, the computer ex111, and the streaming server ex103, or by all of them on a processing-sharing basis.

These coding and decoding processes are performed in general by a large-scale integration circuit or LSI ex500 included in the computer ex111 or each device. The LSI ex500 may be formed as a single chip or a plurality of chips. Alternatively, software for video coding/decoding may be recorded on a recording medium (such as a CD-ROM, a flexible disk, or a hard disk) that is readable by the computer ex111 or the like, and the coding and decoding processes may be performed using the software. Further, in the case where the mobile phone ex114 is equipped with a camera, moving image data obtained with the camera may be transmitted. This moving image data is data that has been coded by the LSI ex500 included in the mobile phone ex114.

Also, the streaming server ex103 may be constituted by a plurality of servers or a plurality of computers that process, record, and distribute data in a distributed manner.

In the above-described manner, the content providing system ex100 allows the client to receive and reproduce coded data. Accordingly, the content providing system ex100 allows the client to receive, decode, and reproduce information transmitted by a user in real time, and thus allows a user not having a special right or equipment to implement personal broadcasting.

Figure 24:
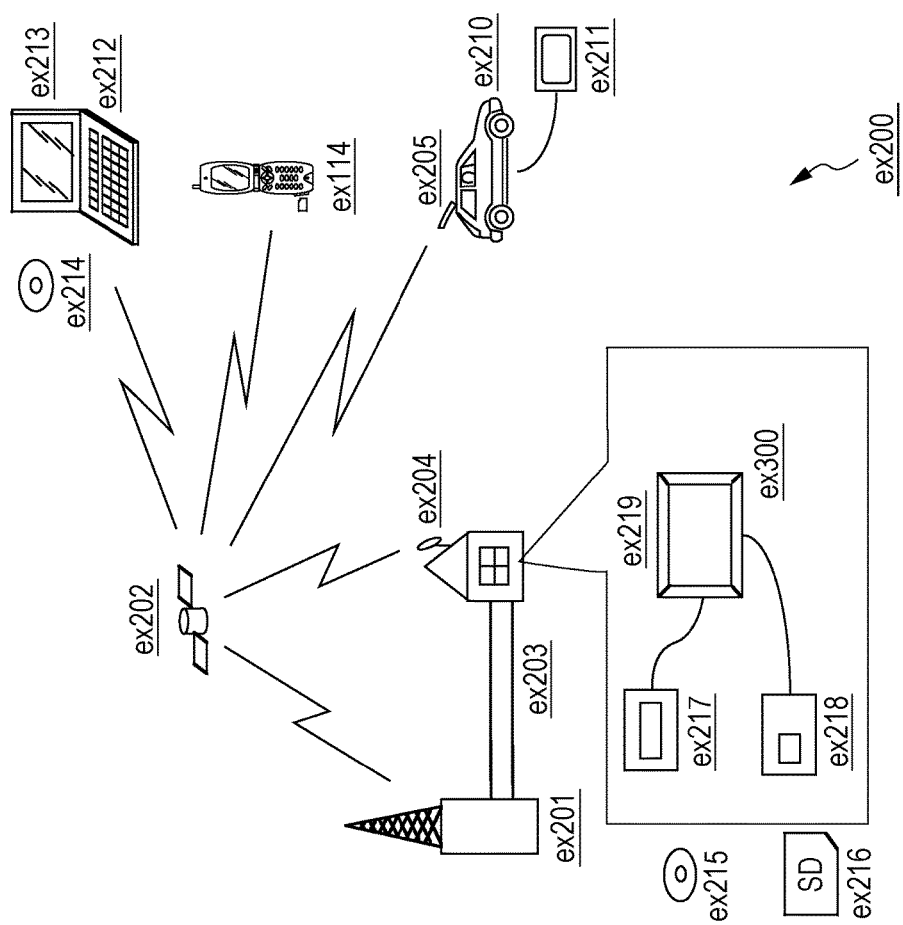
FIG. 24 is a diagram illustrating the overall configuration of a digital broadcasting system.

In addition to the example of the content providing system ex100, at least one of the video coding apparatus (image coding apparatus) and the video decoding apparatus (image decoding apparatus) according to each of the above-described embodiments can be incorporated in a digital broadcasting system ex200 as illustrated in FIG. 24. Specifically, a broadcasting station ex201 transmits a radio wave of multiplexed data obtained by multiplexing video data, music data, and the like, via communication to a broadcasting satellite ex202. This video data is data coded using the video coding method described in each of the above-described embodiments (that is, data coded by the image coding apparatus according to one aspect of the present disclosure). Upon receipt of this data, the broadcasting satellite ex202 transmits a broadcasting radio wave, and a home antenna ex204 capable of receiving satellite broadcasting receives this radio wave. An apparatus such as a television (receiver) ex300 or a set top box (STB) ex217 decodes and reproduces the received multiplexed data (that is, the apparatus functions as the image decoding apparatus according to one aspect of the present disclosure).

Also, the video decoding apparatus or the video coding apparatus described in each of the above-described embodiments can be implemented in a reader/recorder ex218 that reads and decodes the multiplexed data recorded on a recording medium ex215 such as a DVD or a Blu-ray Disc (BD); or that codes a video signal and further multiplexes a music signal with the video signal depending on circumstances, and writes the resulting signal on the recording medium ex215. In this case, the reproduced video signal is displayed on a monitor ex219, and the video signal can be reproduced by another apparatus or system using the recording medium ex215 having the multiplexed data recorded thereon. Alternatively, the video decoding apparatus may be implemented in the set top box ex217 connected to a cable ex203 for cable television or the home antenna ex204 for satellite/terrestrial broadcasting, and the video signal may be displayed on the monitor ex219 of the television ex300. At this time, the video decoding apparatus may be incorporated into the television ex300 instead of the set top box ex217.

Figure 25:
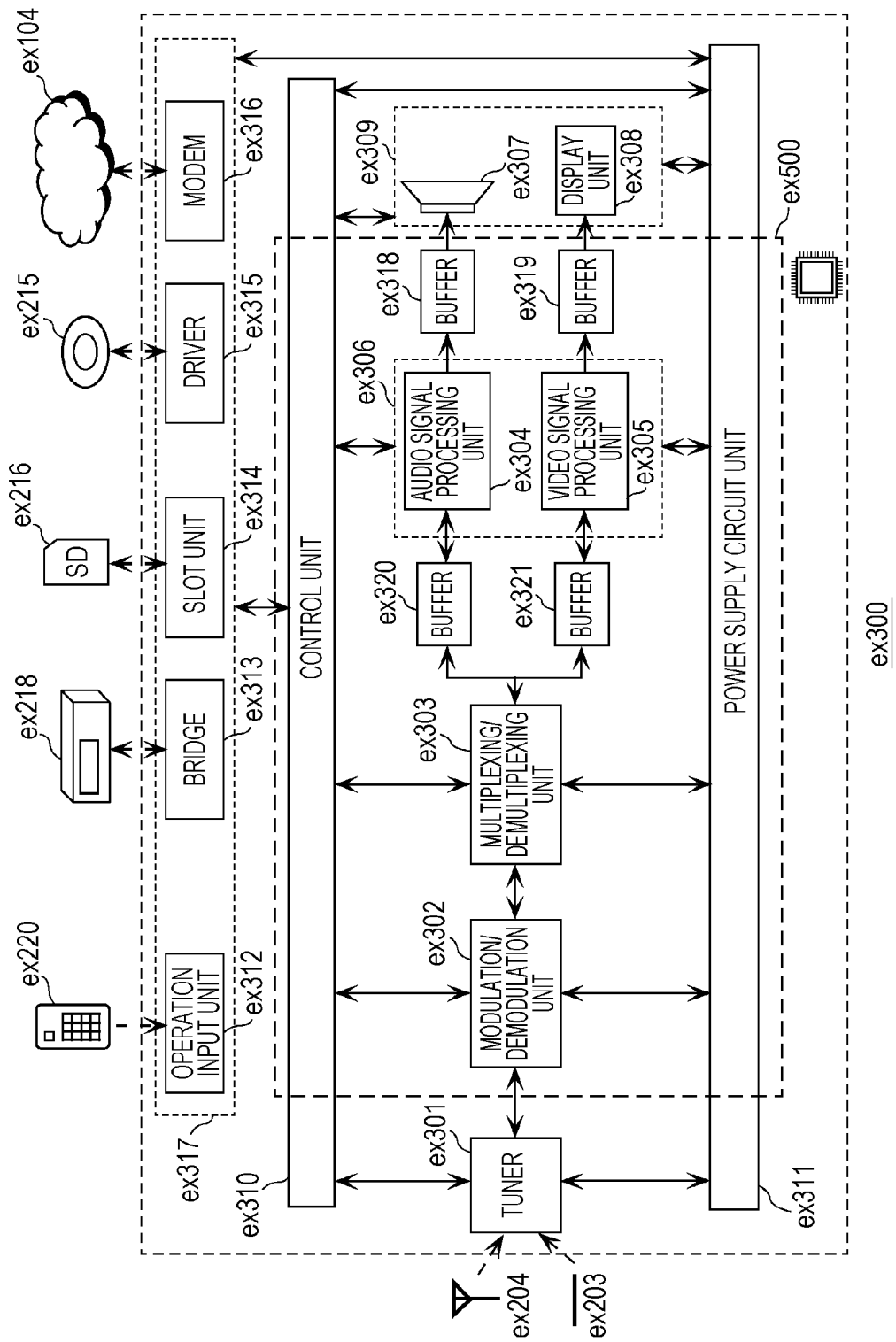
FIG. 25 is a block diagram illustrating an example of a configuration of a television.

FIG. 25 is a diagram illustrating the television (receiver) ex300 that employs the video decoding method and the video coding method described in each of the embodiments above. The television ex300 includes a tuner ex301 that obtains or outputs, via the antenna ex204 or the cable ex203 that receives broadcasting, multiplexed data in which video data and audio data are multiplexed together; a modulation/demodulation unit ex302 that performs demodulation on the received multiplexed data or modulation on multiplexed data to be transmitted to outside; and a multiplexing/demultiplexing unit ex303 that demultiplexes the demodulated multiplexed data into video data and audio data, or multiplexes video data and audio data that have been coded by a signal processing unit ex306.

The television ex300 also includes the signal processing unit ex306 and an output unit ex309. The signal processing unit ex306 includes an audio signal processing unit ex304 that decodes or codes audio data, and a video signal processing unit ex305 that decodes or codes video data (the video signal processing unit ex305 functions as the image coding apparatus or the image decoding apparatus according to one aspect of the present disclosure). The output unit ex309 includes a speaker ex307 that outputs the decoded audio signal, and a display unit ex308, such as a display, that displays the decoded video signal. The television ex300 further includes an interface unit ex317 which includes an operation input unit ex312 that accepts input of a user operation. The television ex300 further includes a control unit ex310 that controls the individual units in an integrated manner, and a power supply circuit unit ex311 that supplies electric power to the individual units. The interface unit ex317 may include a bridge ex313 to be connected to an external device, such as the reader/recorder ex218; a slot unit ex314 that enables connection of a recording medium ex216 such as a Secure Digital (SD) card; a driver ex315 for connection to the external recording medium ex215, such as a hard disk; and a modem ex316 for connection to the telephone network ex104 as well as the operation input unit ex312. Note that the recording medium ex216 is capable of electrically storing information by using a nonvolatile/volatile semiconductor memory included therein. The individual units of the television ex300 are connected to one another via a synchronization bus.

First, a configuration that allows the television ex300 to decode and reproduce multiplexed data obtained from outside with the antenna ex204 or the like will be described. The television ex300 receives a user operation from a remote control ex220 or the like. Based on control performed by the control unit ex310 including a CPU or the like, the multiplexing/demultiplexing unit ex303 demultiplexes multiplexed data that has been demodulated by the modulation/demodulation unit ex302. Further, in the television ex300, the audio signal processing unit ex304 decodes the separated audio data and the video signal processing unit ex305 decodes the separated video data by using the image decoding method described in each of the above embodiments. Further, the decoded audio signal and video signal are output to outside from the output unit ex309. When the audio signal and the video signal are output, these signals may be temporarily stored in buffers ex318 and ex319 or the like so that they are reproduced in synchronization with each other. Also, the television ex300 may read multiplexed data from the recording media ex215 and ex216 such as a magnetic/optical disc and an SD card as well as from broadcasting. Next, a configuration that allows the television ex300 to code an audio signal and a video signal and to transmit the resulting signals to outside or write the resulting signals on a recording medium or the like will be described. The television ex300 receives a user operation from the remote control ex220 or the like. Based on control performed by the control unit ex310, the audio signal processing unit ex304 codes the audio signal, and the video signal processing unit ex305 codes the video signal by using the image coding method described in each of the above embodiments. The coded audio signal and video signal are multiplexed by the multiplexing/demultiplexing unit ex303 and the resulting multiplexed signal is output to outside. When the audio signal and the video signal are multiplexed, these signals may be temporarily stored in buffers ex320 and ex321 or the like so that they are synchronized with each other. Note that a plurality of buffers may be provided as illustrated as the buffers ex318, ex319, ex320, and ex321; or one or more buffers may be shared. Further, in addition to the illustrated buffers, for example, data may be stored in a buffer that serves as a buffering member for avoiding an overflow or underflow in the system between the modulation/demodulation unit ex302 and the multiplexing/demultiplexing unit ex303 or the like.

The television ex300 may also include a configuration for receiving audio/video input of a microphone or a camera in addition to the configuration for obtaining audio data and video data from broadcasting, a recording medium, or the like; and may perform the coding process on the data obtained therefrom. Although the television ex300 has been described as the configuration capable of performing the above-described coding process, multiplexing, and outputting to outside, the television ex300 may be a configuration incapable of performing these processes and only capable of the reception, decoding process, and outputting to outside.

In the case where multiplexed data is read from and written to a recording medium by the reader/recorder ex218, the decoding process or the coding process may be performed by the television ex300, by the reader/recorder ex218, or by both the television ex300 and the reader/recorder ex218 on a processing-sharing basis.

Figure 26:
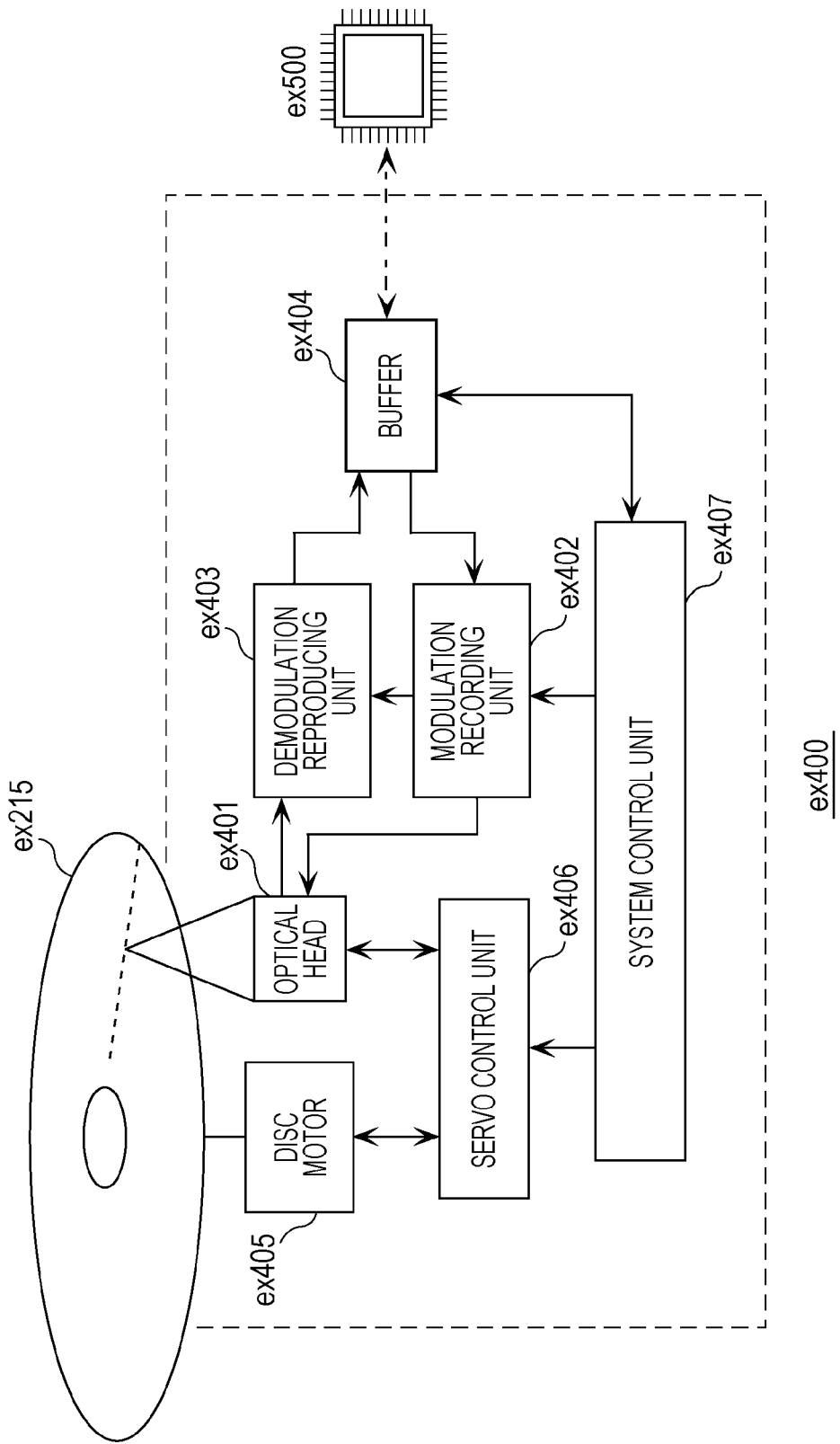
FIG. 26 is a block diagram illustrating an example of a configuration of an information reproducing/recording unit that reads information from and writes information to a recording medium which is an optical disc.

FIG. 26 illustrates an example of a configuration of an information reproducing/recording unit ex400 in the case of reading data from and writing data to an optical disc. The information reproducing/recording unit ex400 includes an optical head ex401, a modulation recording unit ex402, a demodulation reproducing unit ex403, a buffer ex404, a disc motor ex405, a servo control unit ex406, and a system control unit ex407. The optical head ex401 irradiates a recording surface of the recording medium ex215, which is an optical disc, with a laser spot to write information thereon; and detects reflected light from the recording surface of the recording medium ex215 to read information. The modulation recording unit ex402 electrically drives a semiconductor laser included in the optical head ex401 to modulate a laser beam in accordance with to-be-recorded data. The demodulation reproducing unit ex403 amplifies a reproduced signal which is obtained by electrically detecting reflected light from the recording surface by a photodetector included in the optical head ex401, separates and demodulates signal components recorded on the recording medium ex215, and reproduces necessary information. The buffer ex404 temporarily stores information to be recorded on the recording medium ex215 and information reproduced from the recording medium ex215. The disc motor ex405 rotates the recording medium ex215. The servo control unit ex406 moves the optical head ex401 to a certain information track while controlling rotational driving of the disc motor ex405 to perform a laser spot tracking process. The system control unit ex407 controls the information reproducing/recording unit ex400. The above-described reading and writing processes are implemented as a result of the system control unit ex407 performing recording/reproduction of information via the optical head ex401 while causing the modulation recording unit ex402, the demodulation reproducing unit ex403, and the servo control unit ex406 to operate in cooperation with one another and using various pieces of information held in the buffer ex404 and generating/adding new information as needed. The system control unit ex407 includes, for example, a microprocessor and performs these processes by executing a read/write program.

Although the optical head ex401 that irradiates the recording surface with a laser spot has been described above, the optical head ex401 may include a configuration for performing high-density recording using near field light.

Figure 27:
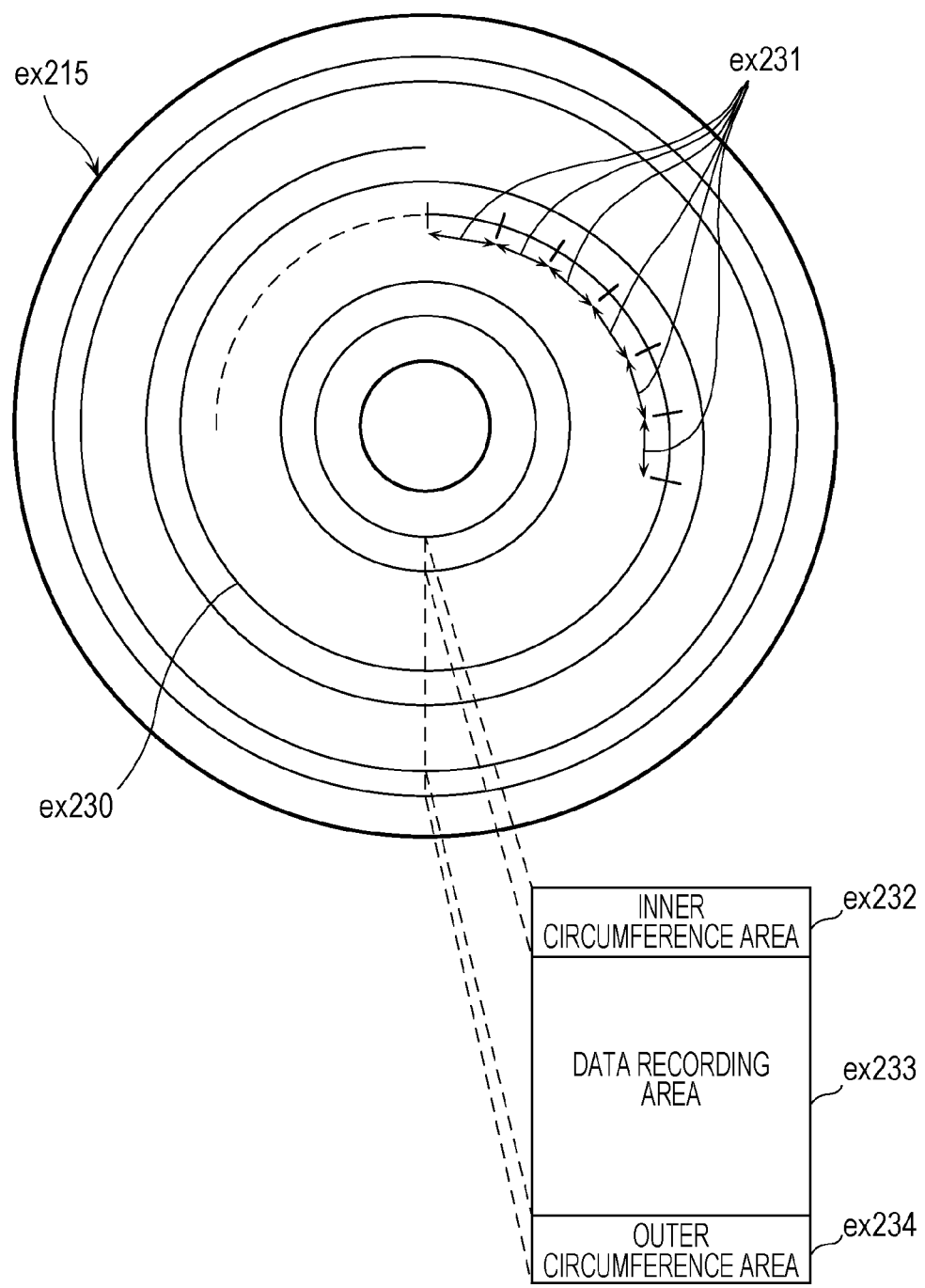
FIG. 27 is a diagram illustrating an example of a structure of an optical disc recording medium.

FIG. 27 is a schematic diagram of the recording medium ex215 which is an optical disc. On the recording surface of the recording medium ex215, a guide groove (groove) is spirally formed. In an information track ex230, address information that represents an absolute position on the disc is pre-recorded by a change in the shape of the groove. This address information includes information identifying positions of recording blocks ex231 which are units in which data is recorded. A recording/reproducing apparatus can identify a recording block by reproducing the information track ex230 and reading the address information. Also, the recording medium ex215 includes a data recording area ex233, an inner circumference area ex232, and an outer circumference area ex234. The data recording area ex233 is an area used for recording user data. The inner circumference area ex232 and the outer circumference area ex234 that are located on the inner side and the outer side of the data recording area ex233, respectively, are used for purposes other than recording of user data. The information reproducing/recording unit ex400 performs reading/writing of coded audio data, coded video data, or multiplexed data of these pieces of data on the data recording area ex233 of the recording medium ex215 thus configured.

The description has been given using a single-layer optical disc such as a DVD or BD by way of example above, the optical disc used is not limited to such a disc and may be a multi-layered optical disc for which recording can be performed on part other than the surface. Alternatively, the optical disc used may be an optical disc on which multidimensional recording/reproduction can be performed by recording information at the same position of the disc using light of various waveforms different from one another, by recording information on different layers at various angles, or the like.

In addition, in the digital broadcasting system ex200, data may be received by a vehicle ex210 equipped with an antenna ex205 from the broadcasting satellite ex202 or the like and a moving image may be reproduced on a display device of a car navigation system ex211 mounted on the vehicle ex210. Note that the configuration illustrated in FIG. 25 additionally including a global positioning system (GPS) reception unit is conceivable as the configuration of the car navigation system ex211, and the same applies to the computer ex111, the mobile phone ex114, or the like.

Figure 28A:
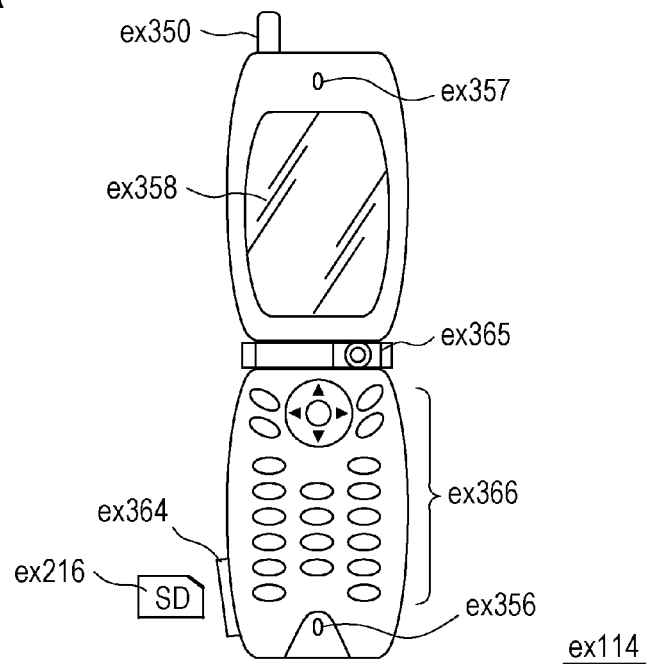
FIG. 28A is a diagram illustrating an example of a mobile phone.

FIG. 28A is a diagram illustrating the mobile phone ex114 that employs the video decoding method and the video coding method described in the above embodiments. The mobile phone ex114 includes an antenna ex350 that transmits and receives a radio wave to and from the base station ex110; a camera unit ex365 capable of capturing video and still images; and a display unit ex358, such as a liquid crystal display, that displays the video captured by the camera unit ex365 and data obtained by decoding video or the like received with the antenna ex350. The mobile phone ex114 further includes a body including an operation key unit ex366; an audio output unit ex357 such as a speaker for outputting audio; an audio input unit ex356 such as a microphone for inputting audio; a memory unit ex367 that stores coded data or decoded data of captured video, captured still images, recorded audio, received video, received still images, or received emails; and a slot unit ex364 which is an interface to a recording medium which similarly stores data thereon.

Figure 28B:
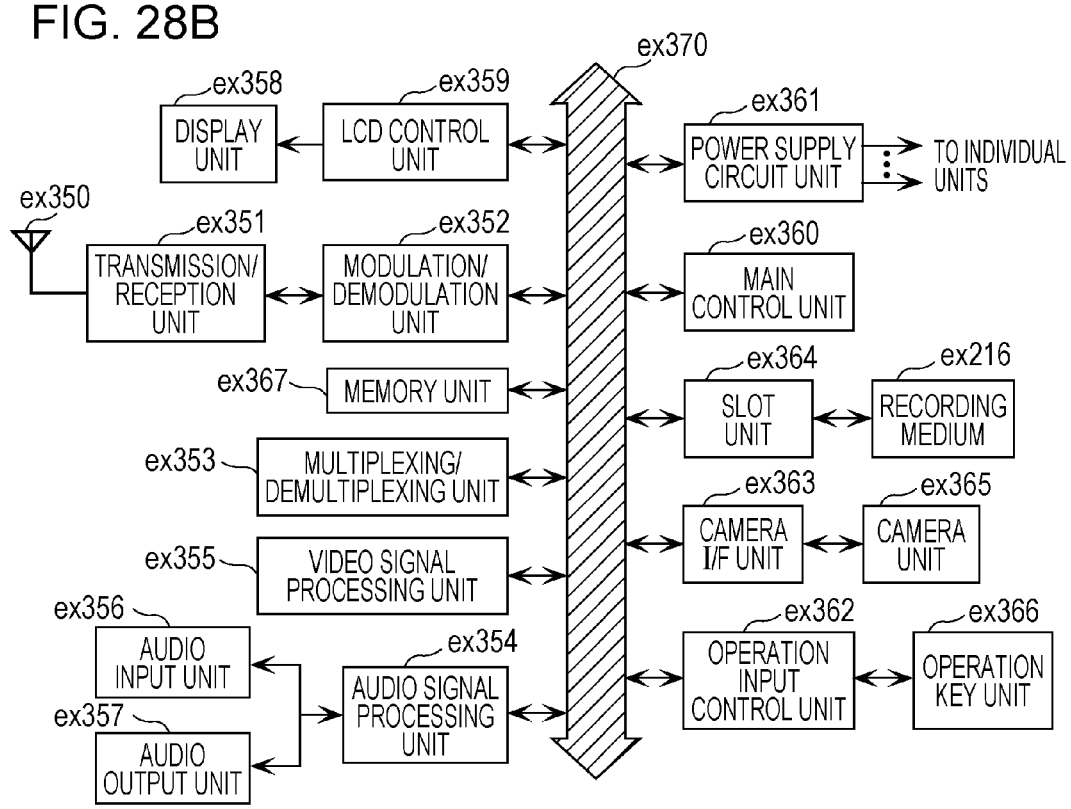
FIG. 28B is a block diagram illustrating an example of a configuration of the mobile phone.

Further, an example of a configuration of the mobile phone ex114 will be described with reference to FIG. 28B. The mobile phone ex114 includes a main control unit ex360 that controls individual units of the body which includes the display unit ex358 and the operation key unit ex366 in an integrated manner. The mobile phone ex114 also includes a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367 which are connected to the main control unit ex360 via a bus ex370.

When an on-hook/power key is turned on through a user operation, the power supply circuit unit ex361 supplies electric power to individual units from a battery pack to activate the mobile phone ex114 into an operable state.

In the mobile phone ex114, in a voice call mode, the audio signal processing unit ex354 converts an audio signal obtained by the audio input unit ex356 into a digital audio signal, the modulation/demodulation unit ex352 performs spread spectrum processing on this digital audio signal, and a transmission/reception unit ex351 performs digital-to-analog conversion processing and frequency conversion processing on this signal and then transmits the resulting signal via the antenna ex350 in accordance with control performed by the main control unit ex360 which includes a CPU, a ROM, and a random access memory (RAM). Also, in the mobile phone ex114, in the voice call mode, the transmission/reception unit ex351 amplifies reception data received via the antenna ex350 and performs frequency conversion processing and analog-to-digital conversion processing, the modulation/demodulation unit ex352 performs spread spectrum processing on the resulting signal, the audio signal processing unit ex354 converts the resulting signal into an analog audio signal. The analog audio signal is then output from the audio output unit ex357.

In the case where an email is transmitted in a data communication mode, text data of the email input through operation of the operation key unit ex366 of the body or the like is sent to the main control unit ex360 via the operation input control unit ex362. The main control unit ex360 performs control such that the modulation/demodulation unit ex352 performs spread spectrum processing on the text data and the transmission/reception unit ex351 performs digital-to-analog conversion processing and frequency conversion processing on the text data and then transmits the resulting text data to the base station ex110 via the antenna ex350. In the case of receiving an email, substantially the opposite processing is performed on the received data, and the resulting text data is output to the display unit ex358.

In the case where video, a still image, or a combination of video and audio are transmitted in the data communication mode, the video signal processing unit ex355 compresses and codes a video signal supplied from the camera unit ex365 by using the video coding method described in each of the above embodiments (that is, the video signal processing unit ex355 functions as the image coding apparatus according to one aspect of the present disclosure), and sends the coded video data to the multiplexing/demultiplexing unit ex353. Also, the audio signal processing unit ex354 codes an audio signal obtained by the audio input unit ex356 while the video, still image, or the like is being captured by the camera unit ex365, and sends the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354 in accordance with a certain scheme. The modulation/demodulation unit (modulation/demodulation circuit unit) ex352 performs spread spectrum processing on the resulting multiplexed data. The transmission/reception unit ex351 performs digital-to-analog conversion processing and frequency conversion processing on the multiplexed data, and then transmits the resulting data via the antenna ex350.

In the case of receiving data of a moving image file linked to a website or the like or an email attached with video or audio in the data communication mode, the multiplexing/demultiplexing unit ex353 demultiplexes multiplexed data into a bitstream of video data and a bitstream of audio data in order to decode the multiplexed data received via the antenna ex350. The multiplexing/demultiplexing unit ex353 supplies the coded video data to the video signal processing unit ex355 and the coded audio data to the audio signal processing unit ex354 via the synchronization bus ex370. The video signal processing unit ex355 performs decoding using a video decoding method corresponding to the video coding method described in each of the above embodiments to decode the video signal (that is, the video signal processing unit ex355 functions as the image decoding apparatus according to one aspect of the present disclosure). Then, for example, video or still image included in the moving image file linked to the website is displayed on the display unit ex358 via the LCD control unit ex359. Also, the audio signal processing unit ex354 decodes the audio signal, and the resulting audio is output by the audio output unit ex357.

Like the television ex300, three implementation forms, that is, a transmission/reception terminal including both an encoder and a decoder, a transmission terminal only including an encoder, and a reception terminal only including a decoder, are conceivable for a terminal such as the mobile phone ex114. Further, the case has been described in which multiplexed data in which video data, audio data, and so forth are multiplexed is received and transmitted in the digital broadcasting system ex200; however, the multiplexed data may be data in which text data related to the video is multiplexed other than audio data or video data alone may be used instead of the multiplexed data.

As described above, the video coding method or the video decoding method described in each of the above embodiments is applicable to any of the aforementioned devices and systems. In such a way, advantages described in each of the above embodiments can be obtained.

Also, the present disclosure is not limited to the embodiments above, and various modifications and corrections can be made without departing from the scope of the present disclosure.

Fifth Embodiment

Video data can also be generated by switching between the video coding method or apparatus described in each of the above embodiments and a video coding method or apparatus based on a different standard, such as MPEG-2, MPEG-4 AVC, or VC-1 as appropriate.

In the case where a plurality of pieces of video data based on different standards are generated, a decoding method corresponding to each of the standards needs to be selected at the time of decoding. However, because which standard the to-be-decoded video data is based on is not identifiable, it is challenging to select an appropriate decoding method.

To deal with such a challenge, multiplexed data in which audio data or the like is multiplexed with video data is configured to include identification information that indicates which standard the video data is based on. A specific structure of multiplexed data including video data that is generated using the video coding method or apparatus described in each of the above embodiments will be described below. Multiplexed data is a digital stream in the MPEG-2 transport stream formant.

FIG. 29 is a diagram illustrating a structure of multiplexed data. As illustrated in FIG. 29, multiplexed data is obtained by multiplexing one or more of a video stream, an audio stream, a presentation graphics stream (PG), and an interactive graphics stream (IG). The video stream represents a main video and a sub video of a movie. The audio stream represents a main audio part of the movie and sub audio to be mixed with the main audio. The presentation graphics stream represents the subtitle of the movie. Here, the main video refers to a video usually displayed on a window, whereas the sub video refers to a video displayed within the main video as a small window. The interactive graphics stream represents a dialog window created by placing graphical user interface (GUI) components on the window. The video stream is coded using the video coding method or apparatus described in each of the above embodiments and using the video coding method or apparatus compliant with an existing standard, such as MPEG-2, MPEG-4 AVC, or VC-1. The audio stream is coded using a standard, such as Dolby AC-3 (Audio Code number 3), Dolby Digital Plus, MLP (Meridian Lossless Packing), DTS (Digital Theater Systems), DTS-HD, or linear PCM (Pulse Code Modulation).

Each stream included in multiplexed data is identified by a packet identifier (PID). For example, a video stream to be used as video of a movie is assigned 0x1011. An audio stream is assigned any one of 0x1100 to 0x111F. A presentation graphics stream is assigned any one of 0x1200 to 0x121F. An interactive graphics stream is assigned any one of 0x1400 to 0x141F. A video stream to be used as sub video of the movie is assigned any one of 0x1B00 to 0x1B1F. An audio stream to be used as sub audio to be mixed with main audio is assigned any one of 0x1A00 to 0x1A1F.

Figure 30:
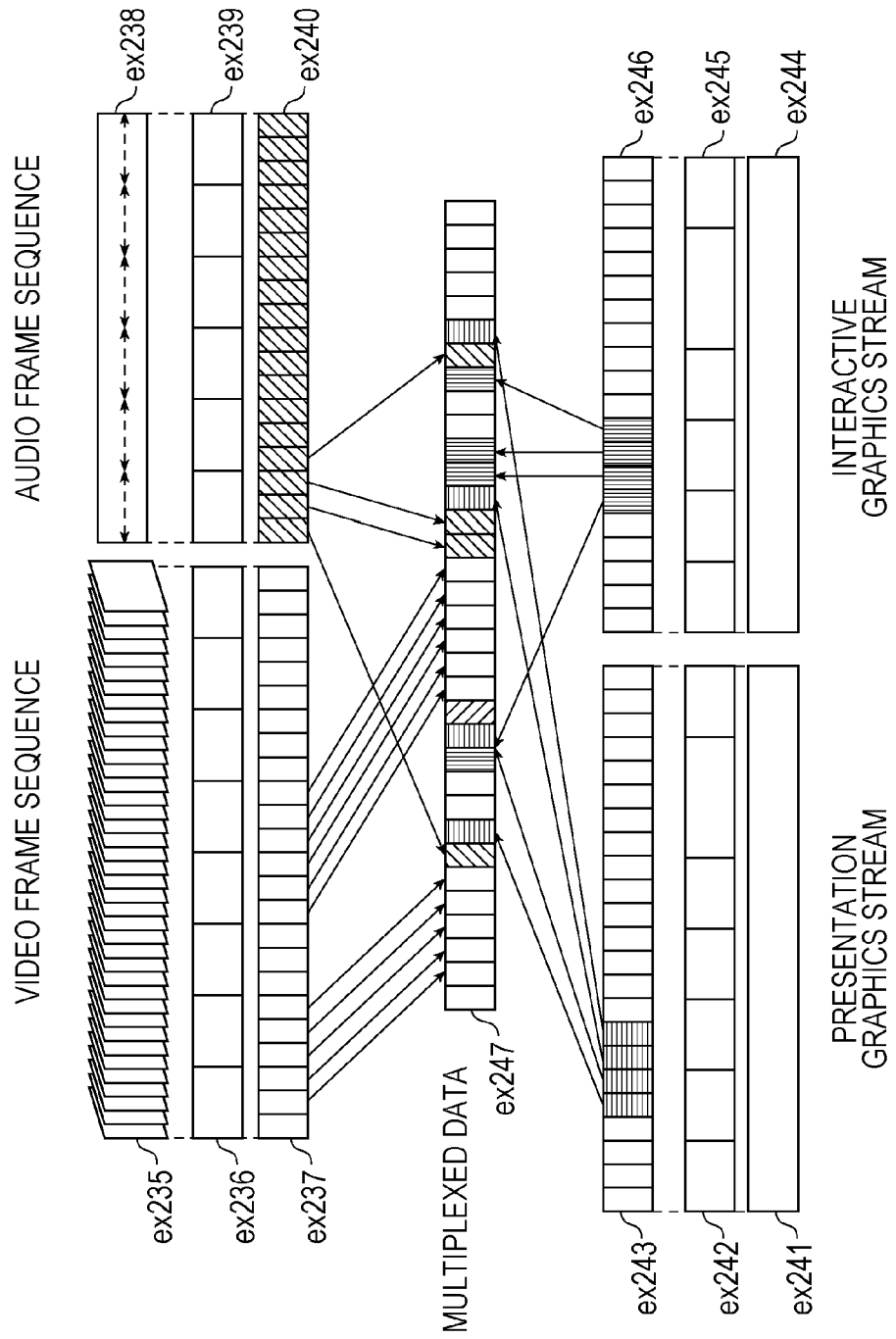
FIG. 30 is a diagram schematically illustrating how individual streams are multiplexed into multiplexed data.

FIG. 30 is a diagram schematically illustrating how individual streams are multiplexed into multiplexed data. A video stream ex235 made up of a plurality of video frames and an audio stream ex238 made up of a plurality of audio frames are converted into packetized elementary stream (PES) packet sequences ex236 and ex239, and then into transport stream (TS) packets ex237 and ex240, respectively. Likewise, data of a presentation graphics stream ex241 and data of an interactive graphics stream ex244 are converted into PES packet sequences ex242 and ex245, and further into TS packets ex243 and ex246, respectively. Multiplexed data ex247 is formed by multiplexing these TS packets into one stream.

Figure 31:
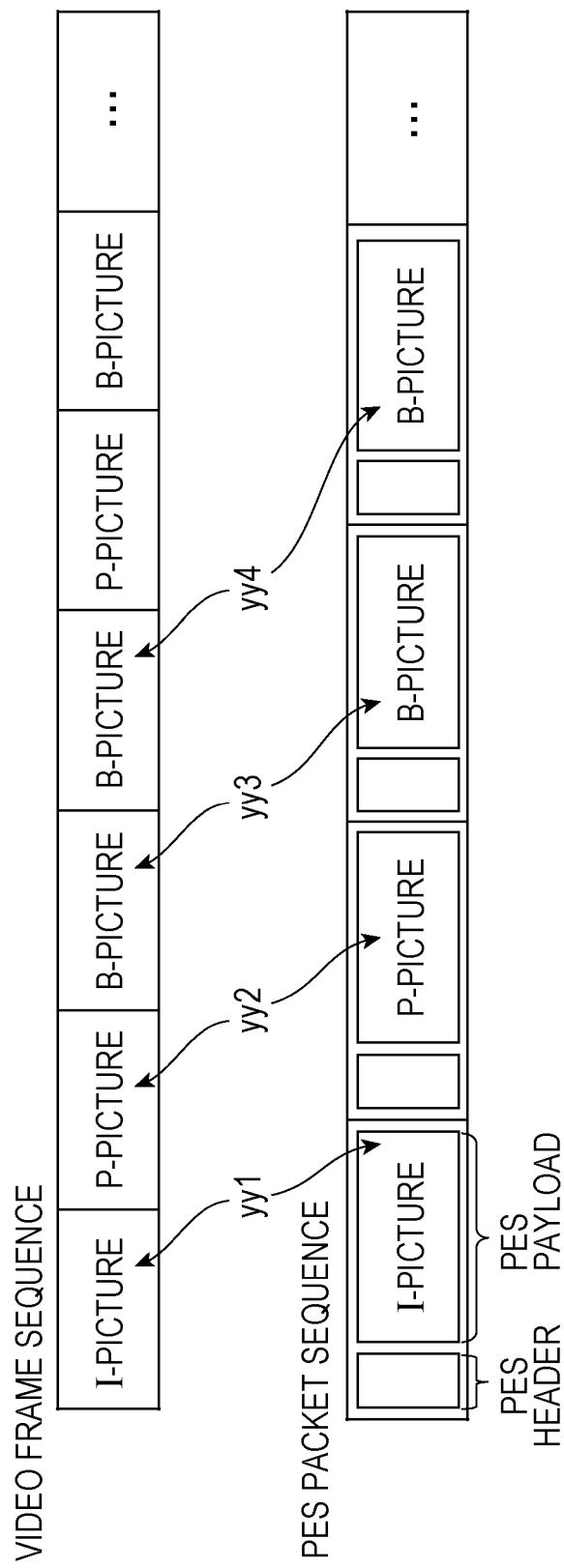
FIG. 31 is a diagram illustrating how a video stream is stored in a packetized elementary stream (PES) packet sequence in a more detailed manner.

FIG. 31 illustrates how a video stream is stored in a PES packet sequence in detail. The upper row in FIG. 31 illustrates a video frame sequence of the video stream. The lower row illustrates a PES packet sequence. As denoted by arrows yy1, yy2, yy3, and yy4 in FIG. 31, I (intra)-pictures, B (bidirectional)-pictures, and P (predicted)-pictures which are a plurality of video presentation units in a video stream are separated on a picture-by-picture basis, and are stored in the payload of respective PES packets. Each PES packet includes a PES header in which presentation time stamp (PTS) that represents display time of the picture and decoding time stamp (DTS) that represents decoding time of the picture are stored.

Figure 32:
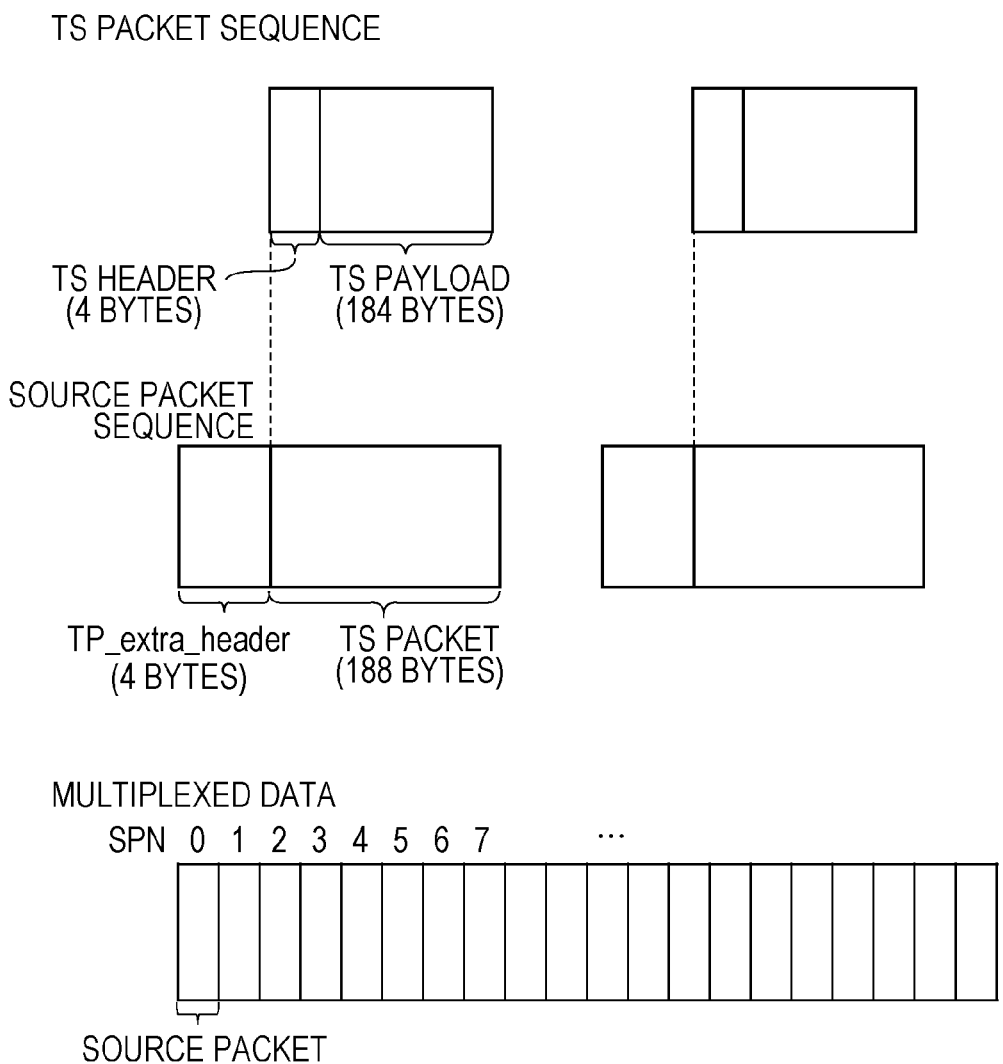
FIG. 32 is a diagram illustrating structures of a transport stream (TS) packet and a source packet in multiplexed data.

FIG. 32 illustrates the format of TS packets which are ultimately written in multiplexed data. A TS packet is a 188-byte fixed-length packet made up of a 4-byte TS header which includes information such as PID for identifying a stream, and a 184-byte TS payload which stores data. A PES packet is divided into portions, and these portions are stored in respective TS payloads. In the case of BD-ROM, a TS packet is attached with a 4-byte TP_Extra_Header to form a 192-byte source packet, and the source packet is written in the multiplexed data. The TP_Extra_Header includes information such as ATS (Arrival_Time_Stamp). The ATS represents the transfer start time at which transfer of the TS packet to a PID filter of a decoder is to be started. As illustrated by the lowest row in FIG. 32, source packets are arranged in the multiplexed data. The number that is incremented from the start of the multiplexed data is called SPN (Source Packet Number).

TS packets included in the multiplexed data include a program association table (PAT), a program map table (PMT), and a program clock reference (PCR) in addition to individual streams of video, audio, subtitle, and so forth. The PAT represents the PID of the PMT used in the multiplexed data, and 0 is registered as the PID of the PAT. The PMT includes PIDs of individual streams of video, audio, subtitle, and so forth included in the multiplexed data; pieces of attribute information of the streams corresponding to the individual PIDs; and various descriptors regarding the multiplexed data. Examples of the descriptors include copy control information that indicates whether or not copying of the multiplexed data is permitted. The PCR includes information regarding system time clock (STC) time corresponding to the ATS at which the PCR packet is transferred to a decoder in order to achieve synchronization between arrival time clock (ATC) which is the time axis for ATS and system time clock (STC) which is the time axis for PTS and DTS.

Figure 33:
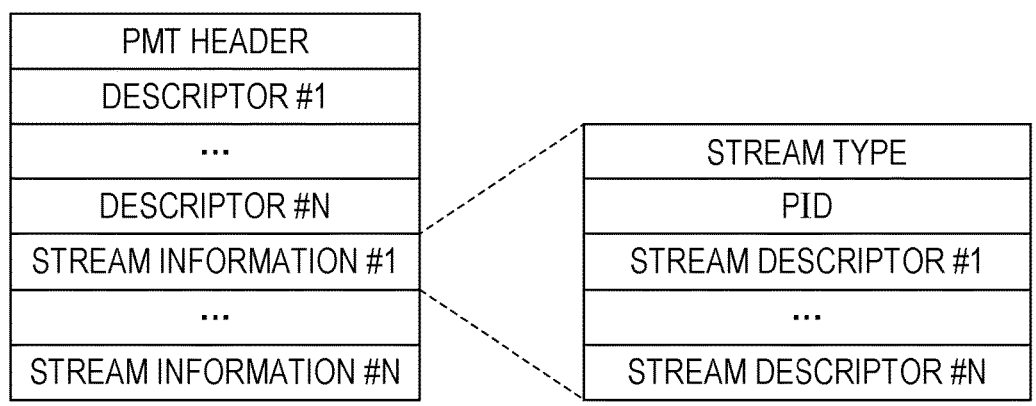
FIG. 33 is a diagram illustrating a data structure of a program map table (PMT)

FIG. 33 is a diagram that describes the data structure of the PMT in detail. At the start of the PMT, a PMT header which describes the length of data included in the PMT is placed. The PMT header is followed by a plurality of descriptors regarding the multiplexed data. The copy control information and so forth are described as the descriptors. The descriptors are followed by a plurality of pieces of stream information regarding individual streams included in the multiplexed data. The stream information is made up of a stream type for identifying the compression codec of the stream or the like, the PID of the stream, and stream descriptors that describe the attribute information (such as a frame rate and an aspect ratio) of the stream. The PMT includes as many stream descriptors as the number of streams included in the multiplexed data.

In the case where the multiplexed data is recorded on a recording medium or the like, the multiplexed data is recorded together with a multiplexed data information file.

Figure 34:
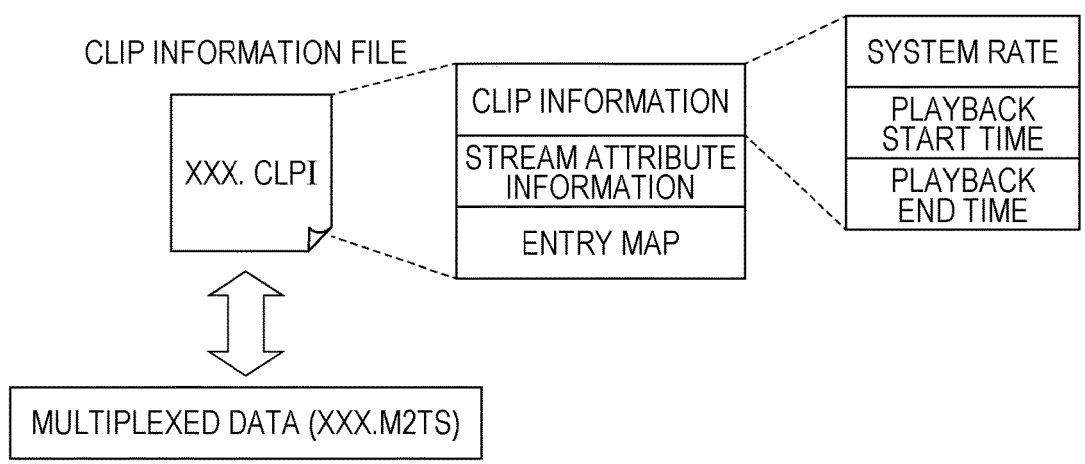
FIG. 34 is a diagram illustrating an internal structure of multiplexed data information.

As illustrated in FIG. 34, a multiplexed data information file (clip information file) contains management information of the multiplexed data, has one-to-one correspondence with the multiplexed data, and is made up of multiplexed data information (clip information), stream attribute information, and an entry map.

The multiplexed data information (clip information) is made up of the system rate, the playback start time, and the playback end time as illustrated in FIG. 34. The system rate represents the maximum transfer rate at which the multiplexed data is transferred to the PID filter of a system target decoder (described later). Intervals of the ATS included in the multiplexed data are set to be lower than or equal to the system rate. The playback start time represents the PTS of the first video frame of the multiplexed data. As the playback end time, a result obtained by adding a playback duration of one frame to the PTS of the last video frame of the multiplexed data is set.

For each PID, attribute information of a corresponding stream included in the multiplexed data is registered in the stream attribute information as illustrated in FIG. 35. The attribute information has different pieces of information for the video stream, the audio stream, the presentation graphics stream, and the interactive graphics stream. Video stream attribute information includes pieces of information such as those regarding a compression codec used to compress the video stream, a resolution of individual picture data of the video stream, an aspect ratio, and a frame rate. Audio stream attribute information includes pieces of information such as those regarding a compression codec used to compress the audio stream, the number of channels included in the audio stream, a supported language, and a sampling frequency. These pieces of information are used in initialization of the decoder before a player performs reproduction, for example.

In the fifth embodiment, the stream type contained in the PMT is used among the multiplexed data. Also, in the case where the multiplexed data is recorded on a recording medium, the video stream attribute information contained in the multiplexed data information is used. Specifically, the video coding method or apparatus described in each of the above embodiments includes a step or unit for setting unique information which indicates whether or not this video data has been generated by the video coding method or apparatus described in each of the above embodiments, in the stream type contained in the PMT or the video stream attribute information. With this configuration, video data generated using the video coding method or apparatus described in each of the above embodiments and video data based on another standard can be distinguished from each other.

Figure 36:
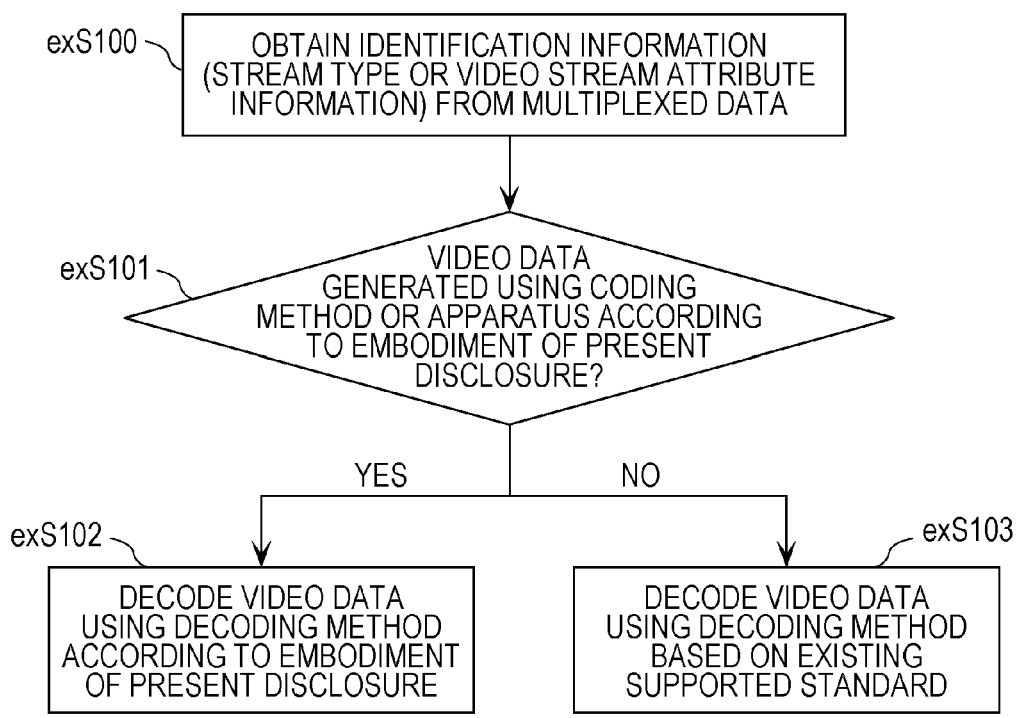
FIG. 36 is a diagram illustrating steps for identifying video data.

FIG. 36 illustrates steps included in a video decoding method in accordance with the fifth embodiment. In step exS100, the stream type contained in the PMT or the video stream attribute information contained in the multiplexed data information is obtained from the multiplexed data. Then, in step exS101, it is determined whether or not the stream type or the video stream attribute information indicates that this multiplexed data is data that has been generated using the video coding method or apparatus described in each of the above embodiments. If it is determined from the stream type or the video stream attribute information that this multiplexed data has been generated using the video coding method or apparatus described in each of the above embodiments, decoding is performed using the video decoding method described in each of the above embodiments in step exS102. If the stream type or the video stream attribute information indicates that the multiplexed data is based on an existing standard, such as MPEG-2, MPEG-4 AVC, or VC-1, decoding is performed using a video decoding method based on the existing standard in step exS103.

By setting a new unique value in the steam type or the video stream attribute information in this way, it can be determined whether or not decoding can be performed using the video decoding method or apparatus described in each of the above embodiments at the time of decoding. Accordingly, even in the case where multiplexed data based on a different standard is input, an appropriate decoding method or apparatus can be selected, and thus decoding can be performed without causing an error. Also, the video coding method or apparatus or the video decoding method or apparatus described in the fifth embodiment is applicable to any of the aforementioned devices and systems.

Sixth Embodiment

Figure 37:
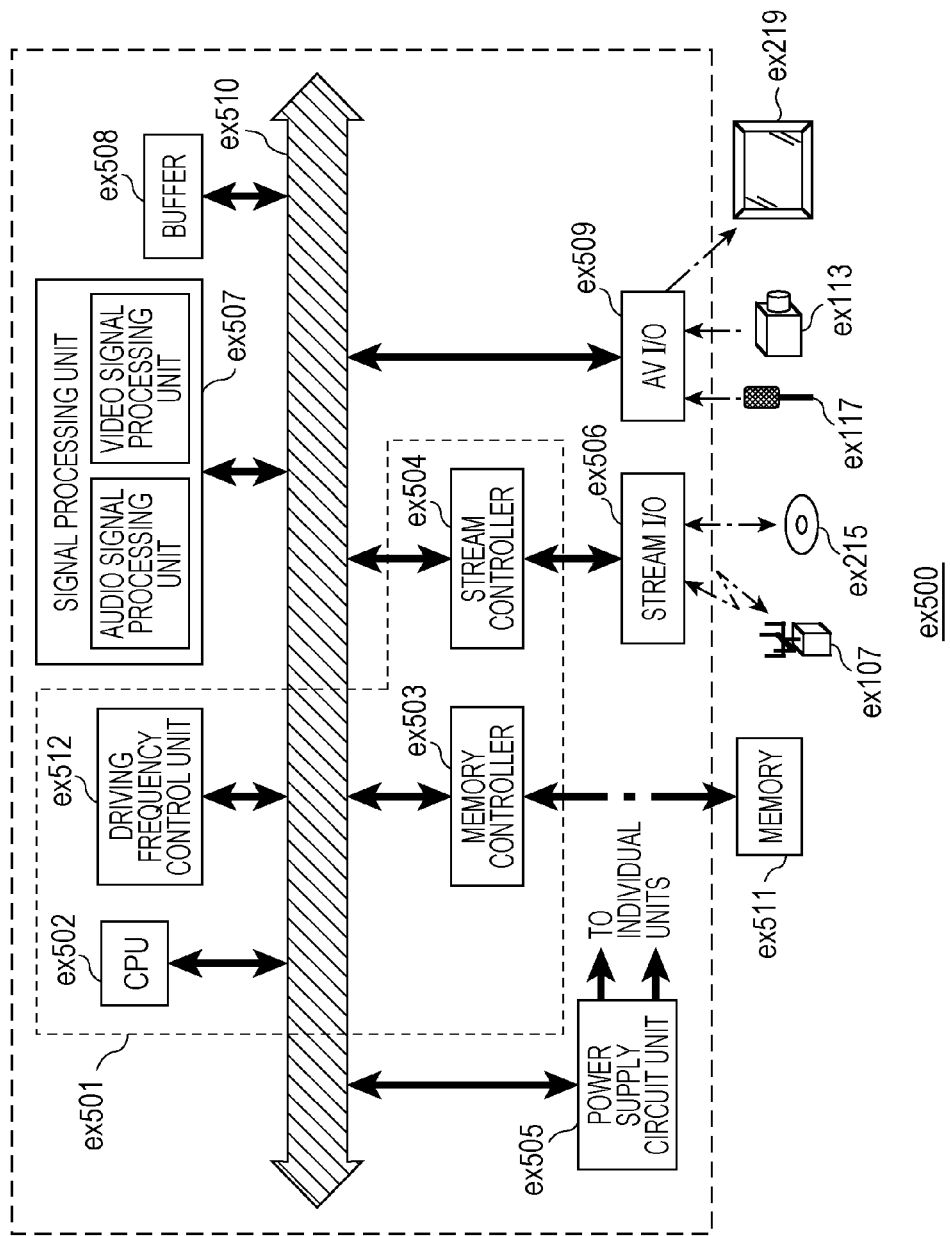
FIG. 37 is a block diagram illustrating an example of a configuration of an integrated circuit that implements a video coding method and a video decoding method according to each of the embodiments.

The video coding method and apparatus and the video decoding method and apparatus described in each of the above embodiments are typically implemented using an LSI which is an integrated circuit. FIG. 37 illustrates an example of a configuration of the LSI ex500 which is formed as one chip. The LSI ex500 includes a control unit ex501, a CPU ex502, a memory controller ex503, a stream controller ex504, a power supply circuit unit ex505, a stream input/output (I/O) ex506, a signal processing unit ex507, a buffer ex508, and an audio/video (AV) I/O ex509, which are connected to one another via a bus ex510. Upon power-on, the power supply circuit unit ex505 supplies electric power to the individual units to activate the individual units into an operable state.

For example, in the case of performing a coding process, the LSI ex500 receives an AV signal from a microphone ex117, the camera ex113, or the like via the AV I/O ex509 in accordance with control performed by the control unit ex501 which includes the CPU ex502, the memory controller ex503, the stream controller ex504, and a driving frequency control unit ex512. The input AV signal is temporarily stored in an external memory ex511, such as a synchronous dynamic random access memory (SDRAM). In accordance with control performed by the control unit ex501, the stored data is divided into a plurality of portions in accordance with an amount of processing or a processing speed, and the plurality of portions are sent to the signal processing unit ex507. Then, the signal processing unit ex507 codes the audio signal and/or the video signal. The coding process performed on the video signal here is the coding process described in each of the above embodiments. The signal processing unit ex507 performs processing such as multiplexing of the coded audio data and the coded video data depending on circumstances, and outputs the multiplexed data to outside via the stream I/O ex506. This output multiplexed data is transmitted to the base station ex107 or written to the recording medium ex215. Note that the audio data and the video data may be temporarily stored in the buffer ex508 at the time of multiplexing so that these pieces of data are synchronized with each other.

Note that although the memory ex511 has been described as a device provided outside the LSI ex500 above, the memory ex511 may be included in the LSI ex500. The number of buffers ex508 is not limited to one and the LSI ex500 may include a plurality of buffers. Also, the LSI ex500 may be formed as a single chip or a plurality of chips.

Although the control unit ex501 includes the CPU ex502, the memory controller ex503, the stream controller ex504, and the driving frequency control unit ex512 above, the configuration of the control unit ex501 is not limited to this one. For example, the signal processing unit ex507 may further include a CPU. By providing a CPU within the signal processing unit ex507, the processing speed can be further improved. Alternatively, the CPU ex502 may include the signal processing unit ex507 or, for example, an audio signal processing unit which is part of the signal processing unit ex507. In such a case, the control unit ex501 includes the CPU ex502 which includes the signal processing unit ex507 or part of the signal processing unit ex507.

Note that the term "LSI" is used here; however, the configuration may be referred to as an IC, a system LSI, a super LSI, or an ultra LSI depending on the degree of integration.

Also, the circuit integration technique is not limited to LSI, and circuit integration may be implemented using a dedicated circuit or general-purpose processor. A field programmable gate array (FPGA) that is programmable after manufacturing of an LSI or a reconfigurable processor in which connections and settings of circuit cells within the LSI are reconfigurable may be used. Such a programmable logic device can execute the video coding method or the video decoding method described in each of the above embodiments typically by loading or reading from a memory or the like a program constituting software or firmware.

Furthermore, if an advance in the semiconductor technology or another related technology yields a circuit integration technology that may substitute for LSI, the functional blocks may be integrated using such a technology obviously. Adaptation of the biotechnology may be possible.

Seventh Embodiment

It is considered that an amount of processing increases in the case of decoding video data generated using the video coding method or apparatus described in each of the above embodiments, compared with the case of decoding video data based on an existing standard, such as MPEG-2, MPEG-4 AVC, or VC-1. Accordingly, in the LSI ex500, a higher driving frequency needs to be set in the CPU ex502 than that used when video data based on an existing standard is decoded. However, making the driving frequency higher undesirably increases power consumption.

Figure 38:
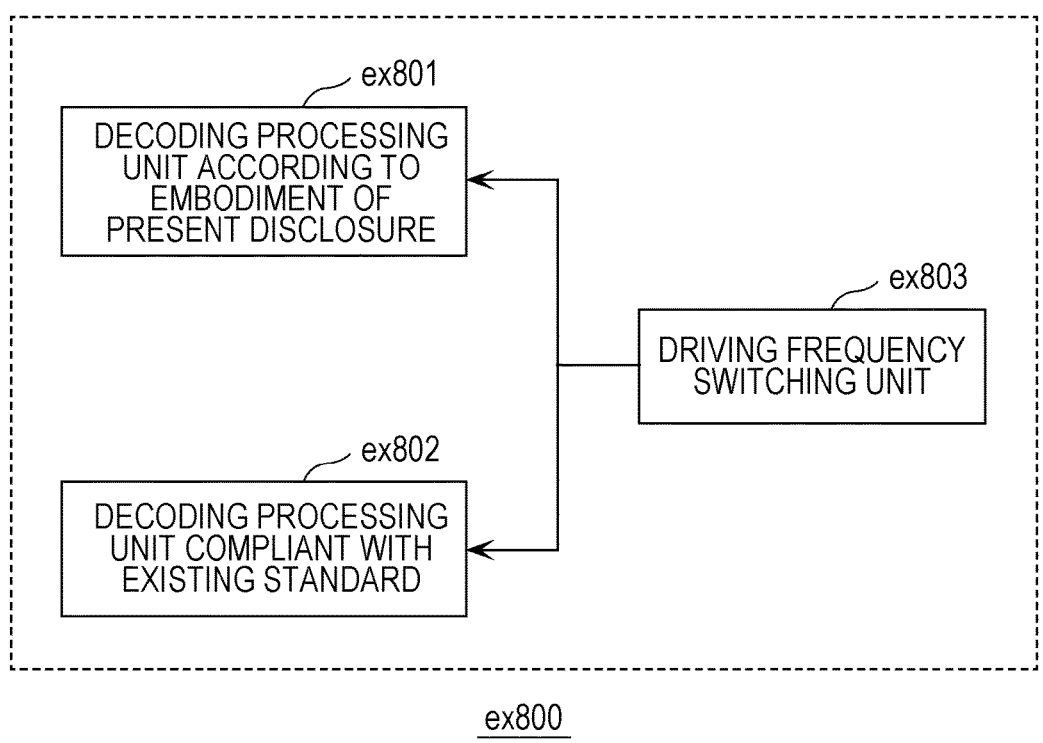
FIG. 38 is a diagram illustrating a configuration for switching between driving frequencies.

To address this issue, the video decoding apparatus, such as the television ex300 or the LSI ex500, is configured to identify a standard which video data is based on, and to switch between the driving frequencies in accordance with the standard. FIG. 38 illustrates a configuration ex800 in accordance with the seventh embodiment. A driving frequency switching unit ex803 sets the driving frequency high in the case where video data is data that has been generated using the video coding method or apparatus described in each of the above embodiments. The driving frequency switching unit ex803 also instructs a decoding processing unit ex801 which executes the video decoding method described in each of the above embodiments to decode the video data. On the other hand, in the case where the video data is data based on an existing standard, the driving frequency switching unit ex803 sets the driving frequency lower than that of the case where the video data is data that has been generated using the video coding method or apparatus described in each of the above embodiments. Then, the driving frequency switching unit ex803 instructs a decoding processing unit ex802 compliant with the existing standard to decode the video data.

More specifically, the driving frequency switching unit ex803 includes the CPU ex502 and the driving frequency control unit ex512 illustrated in FIG. 37. The decoding processing unit ex801 that executes the video decoding method described in each of the above embodiments and the decoding processing unit ex802 compliant with an existing standard correspond to the signal processing unit ex507 illustrated in FIG. 37. The CPU ex502 identifies a standard which video data is based on. Then, based on a signal from the CPU ex502, the driving frequency control unit ex512 sets the driving frequency. Also, based on a signal from the CPU ex502, the signal processing unit ex507 decodes the video data. Here, the use of the identification information described in the fifth embodiment, for example, in identification of the video data is conceivable. The identification information is not limited to the one described in the fifth embodiment and may be any type of information with which a standard which the video data is based on is identifiable. For example, in the case where a standard which video data is based on is identifiable on the basis of an external signal that identifies whether the video data is used for the television or for a disc, the identification can be made on the basis of such an external signal. It is also conceivable to select the driving frequency of the CPU ex502 in accordance with a lookup table in which the standard for the video data and the driving frequency are associated with each other as illustrated in FIG. 40, for example. The lookup table is stored in the buffer ex508 or an internal memory of the LSI ex500, and the CPU ex502 refers to this lookup table. In this way, the driving frequency can be selected.

Figure 39:
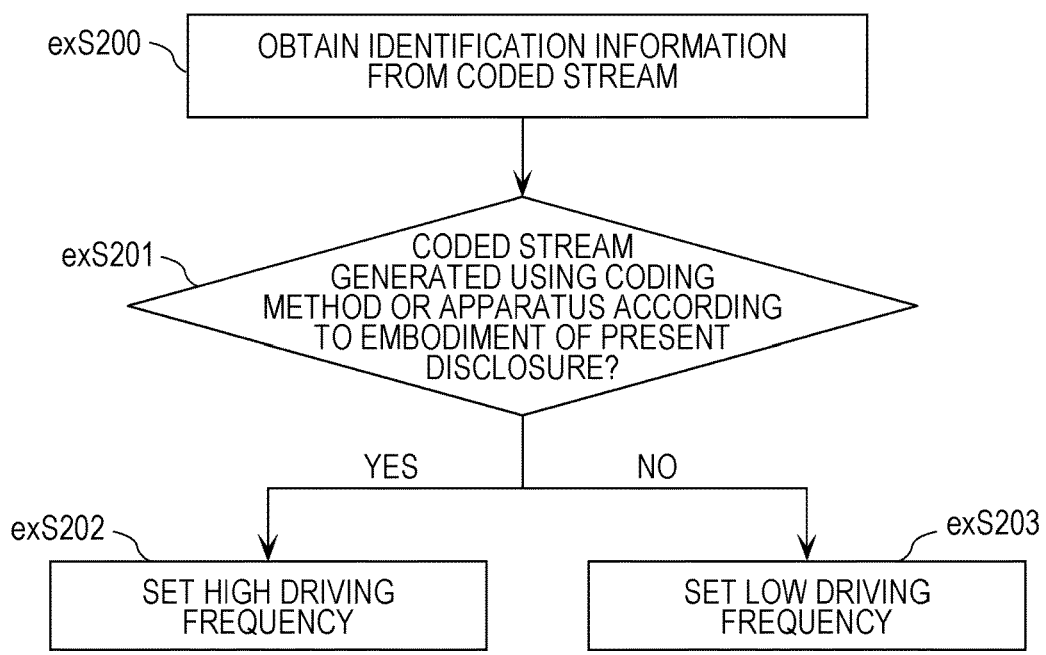
FIG. 39 is a diagram illustrating steps for identifying video data and switching between driving frequencies.

FIG. 39 illustrates steps for performing the method according to the seventh embodiment. First, in step exS200, the signal processing unit ex507 obtains identification information from multiplexed data. Then, in step exS201, based on the identification information, the CPU ex502 identifies whether or not video data is video data that has been generated using the video coding method or apparatus described in each of the above embodiments. If the video data is video data that has been generated using the video coding method or apparatus described in each of the above embodiments, the CPU ex502 sends a signal for setting a high driving frequency to the driving frequency control unit ex512 in step exS202. Then, the driving frequency control unit ex512 sets a high driving frequency. On the other hand, if the identification information indicates that the video data is video data based on an existing standard, such as MPEG-2, MPEG-4 AVC, or VC-1, the CPU ex502 sends a signal for setting a low driving frequency to the driving frequency control unit ex512 in step exS203. Then, the driving frequency control unit ex512 sets a lower driving frequency than that used when the video data is video data that has been generated using the video coding method or apparatus described in each of the above embodiments.

Further, by changing a voltage supplied to the LSI ex500 or an apparatus including the LSI ex500 in conjunction with switching of the driving frequency, the power-saving effect can be further increased. For example, it is conceivable that in the case where a low driving frequency is set, a voltage supplied to the LSI ex500 or an apparatus including the LSI ex500 is set to be lower in response to this setting than that of the case where a high driving frequency is set.

It is sufficient that the driving frequency is set to be higher in the case where an amount of decoding processing is large and set to be lower in the case where an amount of decoding processing is small. Accordingly, the driving frequency setting method is not limited to the above-described setting method. For example, in the case where an amount of processing for decoding video data based on the MPEG-4 AVC standard is larger than an amount of processing for decoding video data generated using the video coding method or apparatus described in each of the above embodiments, settings of the driving frequency can be made opposite to the settings of the above-described case.

Further, the driving frequency setting method is not limited to a configuration for setting the driving frequency low. For example, in the case where the identification information indicates that the video data is video data that has been generated using the video coding method or apparatus described in each of the above embodiments, a voltage supplied to the LSI ex500 or an apparatus including the LSI ex500 may be set to be high. In the case where the identification information indicates that the video data is video data based on an existing standard, such as MPEG-2, MPEG-4 AVC, or VC-1, a voltage supplied to the LSI ex500 or an apparatus including the LSI ex500 may be set to be low. Alternatively, in another example, in the case where the identification information indicates that the video data is video data that has been generated using the video coding method or apparatus described in each of the above embodiments, driving of the CPU ex502 is not stopped. In the case where the identification information indicates that the video data is video data based on an existing standard, such as MPEG-2, MPEG-4 AVC, or VC-1, driving of the CPU ex502 may be temporarily stopped because there is a surplus of capacity relative to the processing load. When there is a surplus of capacity relative to the processing load in the case where the identification information indicates that the video data is video data that has been generated using the video coding method or apparatus described in each of the above embodiments, driving of the CPU ex502 may be temporarily stopped. In this case, a period over which the CPU ex502 is stopped may be set to be shorter than that of the case where the identification information indicates that the video data is video data based on an existing standard, such as MPEG-2, MPEG-4 AVC, or VC-1.

By switching between the driving frequencies in accordance with the standard which the video data is based on in this manner, electric power can be saved. Also, in the case where the LSI ex500 or an apparatus including the LSI ex500 is driven with a battery, the battery can be made last longer as a result of power-saving.

Eighth Embodiment

A plurality of pieces of video data based on different standards are sometimes input to the aforementioned devices and systems, such as the television ex300 and the mobile phone ex114. In order to enable decoding even in the case where a plurality of pieces of video data based on different standards are input, the signal processing unit ex507 of the LSI ex500 needs to support the plurality of standards. However, the use of the signal processing units ex507 for the respective standards undesirably makes the circuit scale of the LSI ex500 larger and increases the cost.

Figure 41A:
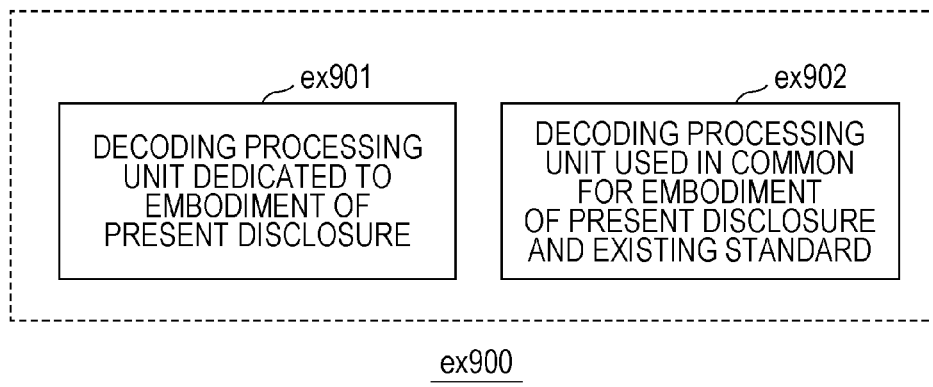
FIG. 41A is a diagram illustrating an example of a configuration that enables sharing of modules among signal processing units.

To address this issue, a decoding processing unit that executes the video decoding method described in each of the above embodiments and a decoding processing unit compliant with an existing standard, such as MPEG-2, MPEG-4 AVC, or VC-1, share some of their components. FIG. 41A illustrates an example of this configuration ex900. For example, the video decoding method described in each of the above embodiments and the video decoding method compliant with the MPEG-4 AVC standard share some of contents of processing, such as entropy decoding, inverse quantization, deblocking filtering, and motion compensation. Accordingly, the following configuration is conceivable. For the shared processing contents, a decoding processing unit ex902 compliant with the MPEG-4 AVC standard in used in common. For other processing contents that are not compliant with the MPEG-4 AVC standard and are unique to an aspect of the present disclosure, a dedicated decoding processing unit ex901 may be used. In particular, an aspect of the present disclosure includes a feature in inter prediction. Thus, for example, the dedicated decoding processing unit ex901 may be used for inter prediction and the decoding processing unit ex902 may be used in common for any of or all of entropy decoding, deblocking filtering, and inverse quantization. Alternatively, as for sharing of the decoding processing unit, a configuration may be used in which a decoding processing unit that executes the video decoding method described in each of the above embodiments is used for the common processing contents and a dedicated decoding processing unit is used for processing contents unique to the MPEG-4 AVC standard.

Figure 41B:
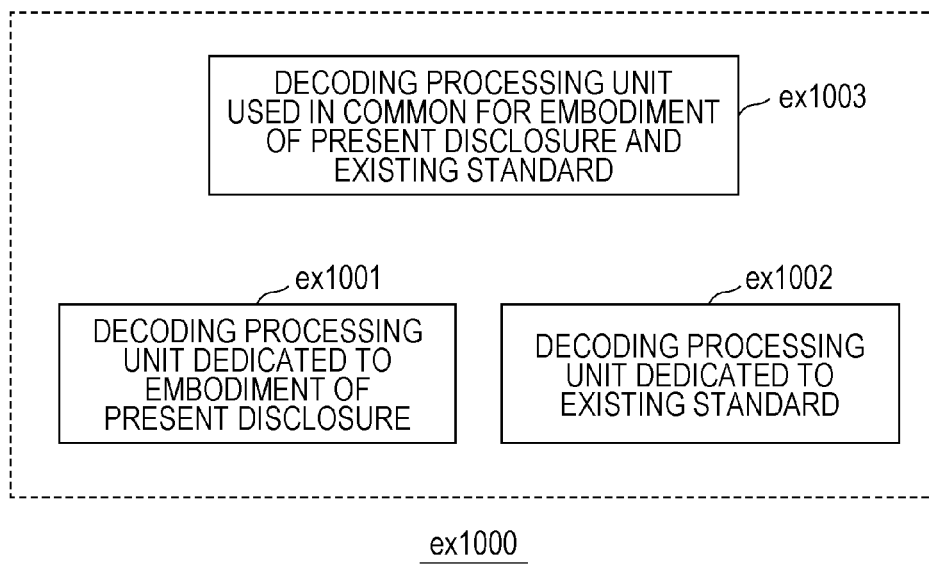
FIG. 41B is a diagram illustrating another example of a configuration that enables sharing of modules among signal processing units.

FIG. 41B illustrates another example ex1000 that implements sharing of part of processing. In this example, a dedicated decoding processing unit ex1001 that handles processing contents unique to an aspect of the present disclosure, a dedicated decoding processing unit ex1002 that handles processing contents unique to an existing standard, and a shared decoding processing unit ex1003 that handles processing contents that are common to the video decoding method according to the aspect of the present disclosure and the video decoding method according to the existing standard are used. Here, the dedicated decoding processing units ex1001 and ex1002 are not necessarily specialized for the processing contents unique to the aspect of the present disclosure and the existing standard, respectively, and may be also capable of executing other general processing. Also, the configuration according to the eighth embodiment can be implemented using the LSI ex500.

By sharing a decoding processing unit for processing contents that are common to the video decoding method according to an aspect of the present disclosure and the video decoding method according to an existing standard, the circuit scale and cost of the LSI ex500 can be reduced.

The embodiments of the present disclosure are available for use in, for example, a television receiver, a digital video recorder, a car navigation system, a mobile phone, a digital camera, a digital camcorder, a security camera system, a fixed-point observation camera system, or a content distribution system.

What is claimed is:

1. An image coding apparatus including an encoder and a memory, the encoder executing operations comprising:
   obtaining a reference-specific image from storage accessible by the encoder, the reference-specific image being not displayed and being referenced from one or more other images to be displayed;
   storing the reference-specific image in the memory; and
   encoding one or more to-be-displayed images by referring to the reference-specific image,
   wherein the obtaining, as the reference-specific image, includes a reference-specific image having a larger size than each of the plurality of to-be-displayed images, and
   wherein the reference-specific image obtained in the obtaining is formed by integrating a plurality of captured images, which are a plurality of images obtained through an image capturing operation.

2. The image coding apparatus according to claim 1,
wherein obtaining the reference-specific image is performed before an initial to-be-displayed image being encoded in coding order among the plurality of to-be-displayed images.

3. The image coding apparatus according to claim 2,
wherein obtaining part or all of the reference-specific image includes by receiving part or all of the reference-specific image from an image management apparatus, and
encoding the one or more to-be-displayed images by referring to the reference-specific image, part or all of which has been obtained.

4. The image coding apparatus according to claim 3,
wherein obtaining, as the reference-specific image, each of a plurality of reference-specific images includes a first reference-specific image corresponding to a first image capture condition and a second reference-specific image corresponding to a second image capture condition, and
encoding the one or more to-be-displayed images is performed by referring to the first reference-specific image as the reference-specific image in a case where the video has been captured in the first image capture condition, or
encoding the one or more to-be-displayed images is performed by referring to the second reference-specific image as the reference-specific image in a case where the video has been captured in the second image capture condition.

5. The image coding apparatus according to claim 4,
wherein the encoder executes operations further comprising updating the reference-specific image by using one or more reconfigured images among the plurality of reconfigured images obtained by reconfiguration of the plurality of to-be-displayed images, and
encoding the one or more to-be-displayed images by referring to the updated reference-specific image.

6. The image coding apparatus according to claim 5,
wherein, before encoding an image to be encoded among the one or more to-be-displayed images, the encoder executes operations further comprising transforming the reference-specific image to a transformed reference-specific image, the transformed reference-specific image corresponding to the image to be encoded, the image referring to the transformed reference-specific image as the reference image.

7. The image coding apparatus according to claim 6,
wherein the transforming includes scaling the reference-specific image to the transformed reference-specific image, a size of a subject in the transformed reference-specific image corresponding to a size of a subject in the image to be encoded.

8. The image coding apparatus according to claim 7,
wherein the transforming includes scaling of the reference-specific image to the transformed reference-specific image, by using image capture information on each of the reference-specific image and the image to be encoded, or by using a position of a feature point in each of the reference-specific image and the image to be encoded.

9. The image coding apparatus according to claim 8,
wherein in the transforming includes scaling of the reference-specific image to the transformed reference-specific image in accordance with precision of motion vectors used in the inter prediction.

10. The image coding apparatus according to claim 9,
wherein the encoding includes encoding a transform parameter that is used in transforming the reference-specific image.

11. The image coding apparatus according to claim 10,
wherein the encoding includes encoding an overall vector indicating a position of an area in the reference-specific image which corresponds to an image to be encoded among the one or more to-be-displayed images.

12. The image coding apparatus according to claim 11,
wherein the encoder executes operations further comprising calculating the overall vector by using image capture information on each of the reference-specific image and the image to be encoded or by using a position of a feature point in each of the reference-specific image and the image to be encoded, and encoding the calculated overall vector.

13. The image coding apparatus according to claim 12,
wherein the encoding includes encoding the one or more to-be-displayed images, and generating a coded sequence including the one or more to-be-displayed images, separately from a coded sequence including the reference-specific image.

14. The image coding apparatus according to claim 13,
wherein the encoding includes encoding the reference-specific image as a non-display image.

15. An image decoding apparatus including a decoder and a memory, the decoder executing operations comprising:
obtaining a reference-specific image from storage accessible by the decoder, the reference-specific image being not displayed and being referenced from one or more other images to be displayed;
storing the reference-specific image in the memory; and
decoding one or more to-be-displayed images by referring to the reference-specific image,
wherein the obtaining, as the reference-specific image, includes a reference-specific image having a larger size than each of the plurality of to-be-displayed images, and
wherein the reference-specific image obtained in the obtaining is formed by integrating a plurality of captured images, which are a plurality of images obtained through an image capturing operation.

16. An image processing system which encodes and decodes, the image processing system comprising:
a controller operable to obtain a reference-specific image from accessible storage, the reference-specific image being not displayed and being referenced from one or more other images to be displayed;
an encoder operable to
obtain the reference-specific image from the controller, and
encode one or more to-be-displayed images by referring to the reference-specific image; and
a decoder operable to
obtain the reference-specific image from the controller, and
decode one or more to-be-displayed images by referring to the reference-specific image as a reference image for inter prediction,
wherein obtaining, as the reference-specific image, includes a reference-specific image having a larger size than each of the plurality of to-be-displayed images, and
wherein the reference-specific image obtained in the obtaining is formed by integrating a plurality of captured images, which are a plurality of images obtained through an image capturing operation.

17. An image coding method being executed by a processor, the image coding method comprising:
obtaining a reference-specific image, the reference-specific image being not displayed and being referenced from one or more other images to be displayed; and
encoding one or more to-be-displayed images by referring to the reference-specific image,
wherein the obtaining, as the reference-specific image, includes a reference-specific image having a larger size than each of the plurality of to-be-displayed image, and
wherein the reference-specific image obtained in the obtaining is formed by integrating a plurality of captured images, which are a plurality of images obtained through an image capturing operation.

18. An image decoding method being executed by a processor, the image decoding method comprising:
obtaining a reference-specific image, the reference-specific image being not displayed and being referenced from one or more other images to be displayed; and
decoding one or more to-be-displayed images by referring to the reference-specific image,
wherein the obtaining, as the reference-specific image, includes a reference-specific image having a larger size than each of the plurality of to-be-displayed images, and
wherein the reference-specific image obtained in the obtaining is formed by integrating a plurality of captured images, which are a plurality of images obtained through an image capturing operation.

* * * * *